United States Patent
Kautto Kiovula et al.

(10) Patent No.: US 7,313,766 B2
(45) Date of Patent: Dec. 25, 2007

(54) METHOD, SYSTEM AND APPARATUS FOR CONSTRUCTING FULLY PERSONALIZED AND CONTEXTUALIZED USER INTERFACES FOR TERMINALS IN MOBILE USE

(75) Inventors: Kaisa Kautto Kiovula, Espoo (FI); Marita Huhtaniemi, Helsinki (FI); Petri Lähdesmäki, Espoo (FI); Petri Mäenpää, Helsinki (FI)

(73) Assignee: NOKIA Corporation, Espoo (FI)

( * ) Notice: Subject to any disclaimer, the term of this patent is extended or adjusted under 35 U.S.C. 154(b) by 517 days.

(21) Appl. No.: 10/028,032

(22) Filed: Dec. 20, 2001

(65) Prior Publication Data

US 2003/0117432 A1 Jun. 26, 2003

(51) Int. Cl.
*G06F 15/00* (2006.01)
*G06F 13/00* (2006.01)

(52) U.S. Cl. ............ 715/853; 715/854; 715/851

(58) Field of Classification Search .......... 715/763, 715/765, 851–853, 854–855, 840, 829
See application file for complete search history.

(56) References Cited

U.S. PATENT DOCUMENTS

| | | | |
|---|---|---|---|
| 6,144,962 A * | 11/2000 | Weinberg et al. | 707/10 |
| 6,434,595 B1 | 8/2002 | Suzuki et al. | |
| 6,462,676 B1 * | 10/2002 | Koizumi | 340/995.1 |
| 6,499,026 B1 * | 12/2002 | Rivette et al. | 707/2 |
| 6,574,553 B1 * | 6/2003 | Beesley et al. | 701/209 |
| 6,678,611 B2 * | 1/2004 | Khavakh et al. | 701/210 |
| 6,732,331 B1 | 5/2004 | Alexander | |
| 6,735,518 B2 * | 5/2004 | Kim | 701/209 |
| 2005/0055639 A1 | 3/2005 | Fogg | |

OTHER PUBLICATIONS

Mind Mapping FAQ (http://web.archive.org/web/20001202121800/http://world.std.com/~emagic/mindmap.html), downloaded Aug. 22, 2005.
Mindmapper.com (http://www.mindmapper.com), downloaded Jun. 28, 2005.
Mindjet: Software for Visualizing and Managing Information (http://www.mindjet.com/us/), downloaded Jun. 28, 2005.
Alles über Mind Mapping (http://www.zmija.de/mindmap.htm), downloaded Jun. 28, 2005.
Superlearning: Mind Mapping: Mind Mapping Brain Links—Mind Mapping Works! (http://web.archive.org/web/20010606154437/http://www.tiac.net/users/seeker/brainlinks.html), downloaded Aug. 22, 2005.
Mind Tools—Career Training, Management Training, Leadership Skill and Career Coaching (http://www.mindtools.com/index.html), downloaded Jun. 28, 2005.

(Continued)

*Primary Examiner*—Cao (Kevin) Nguyen
(74) *Attorney, Agent, or Firm*—Morgan & Finnegan, L.L.P.

(57) ABSTRACT

A method, system and apparatus for enabling users to create customized user interfaces in accordance with their preferences. The user interface is structured as a node map, wherein nodes may be added to the node map in accordance with the user's needs. The nodes may be connected therebetween to define relationships between the different nodes. The nodes may have an attachment, an action, an application and/or the like associated therewith. The user may perform a variety of other functions to customize, alter or expand the information depicted on their user interface.

104 Claims, 70 Drawing Sheets

OTHER PUBLICATIONS

Mind Mapping am Computer (http://lernen-heute.de/mind_mapping_am_comter.html), downloaded Jun. 28, 2005.

memes.net—Mind Mapping (http://web.archive.org/web/20010629204944/http://www.memes.net/index/php?request=displaypage&NodeID=418), downloaded Aug. 22, 2005.

Banxia Decision Explorer Mind Mapping Comparison (http://www.banxia.com/demindmap.html), downloaded Jun. 28, 2005.

Graphics Software> Charts in the Yahoo! Directory (http://dir.yahoo.com/Business_and_Economy/Business_to Business/Computers/Software/Graphics/Charts/), downloaded Jun. 28, 2005.

Pétillant®: Découvrez le site expert de la carte heuristique (Mind Mapping) (http://www.petillant.com/), downloaded Jun. 28, 2005.

Pétillant®: Choisir un logiciel de Mind Mapping (http://www.petillant.com/mindmapping/logiciels.htm), downloaded Jun. 28, 2005.

Mayjjer Consulting: Min Mapping vs. Knowledge Mapping (http://web.archive.org/web/2001072322461/http://www.mayjjer.com/mind-mapping.html), downloaded Aug. 22, 2005.

Thread Index—Jul. 1999 (http://web.archive.org/web/20010304192734/lists.omnipotent.net/pilot/199907/), downloaded Aug. 22, 2005.

Google Web Directory—Reference> Knowledge Management> Knowledge Creation> . . . . (http://directory.google.com/Top/Reference/Knowledge_Management/Knowledge_Creation/Mind_Mapping/), downloaded Aug. 20, 2005.

Concept Mapping Homepage (http://users.edte.utwente.nl/lanzing/cm_home.htm), downloaded Aug. 20, 2005.

Mind Maps (http://tech.wwps.org/garrison/klehmann/mmc/mindmap.htm), downloaded Aug. 20, 2005.

Software for Creativity & Idea Generation (http://web.archive.org/web/20010620000838/http://members.ozemail.com.au/~caveman/Creative/Software/swindex/htm#m85), downloaded Aug. 22, 2005.

KmMapTools (http://www.voght.com/cgi-bin/pywiki?KmMapTools), downloaded Aug. 22, 2005.

Laboratory for Interactive Learning Technologies: Project Ideas (http://web.archive.org/web/20010417223835.lilt.ics.hawaii.edu/lilt/opportunities/students/project-ideas.htm), downloaded Aug. 22, 2005.

Open Directory—Computers: Software: Internet: Servers: Personalization (http://dmoz.org/Computers/Software/Internet/Servers/Personalization/), downloaded Aug. 20, 2005.

Collaboration—People Sharing Ideas Learn From Each Other (http://kmtool.net/), downloaded Aug. 20, 2005.

Knowledge Management Tools (HSERV 590A, Module 39) (http://courses.washington.edu/~hs590a/modules/39/kmtools39.html), downloaded Aug. 20, 2005.

Creativity Tools (http://web.archive.org/20010702115454/http://www.businesscreativitynetowrk.org.uk/tools.htm), downloaded Aug. 22, 2005.

Graphics Organizer Index (http://www.graphic.org/goindex.html), downloaded Aug. 20, 2005.

Concept Mapping/ Semantic Networking/Knowledge Representation Websites (http://www.sci.sdsu.edu/crmse/kfisher_knowrep.html), downloaded Aug. 20, 2005.

Mind Mapping Software—Mindmap Programme—Kreativitätssoftware / mindmap.ch (http://www.mindmap.ch.software.htm), downloaded Aug. 20, 2005.

U.S. Appl No. 10/739,600, filed Dec. 17, 2003, Kautto-Kiovula et al.

* cited by examiner

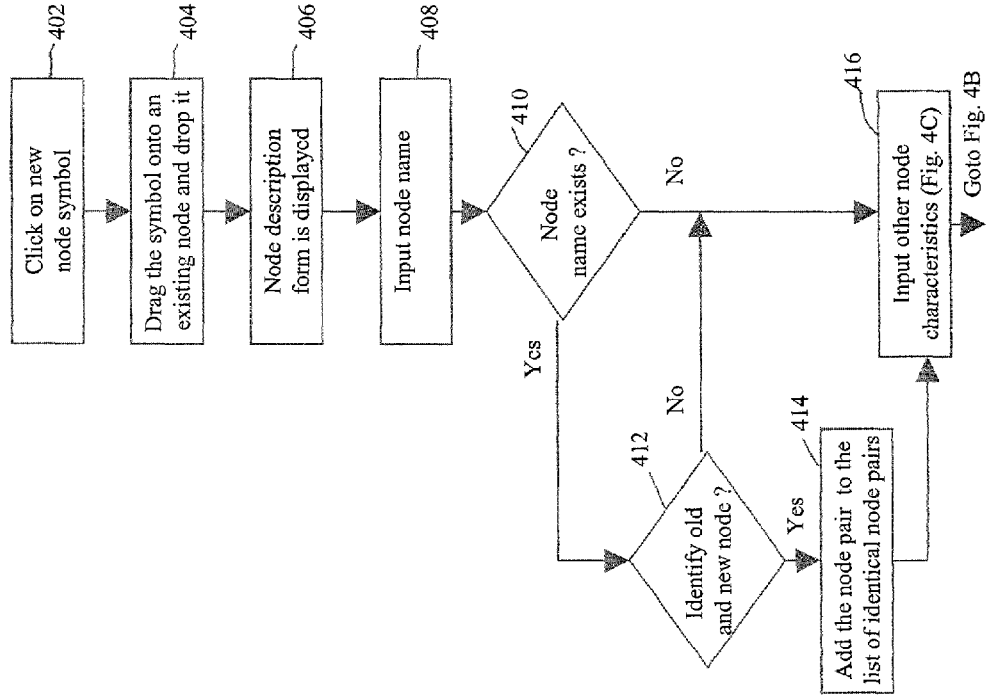
Figure 4A (Creating a new node & a new edge)

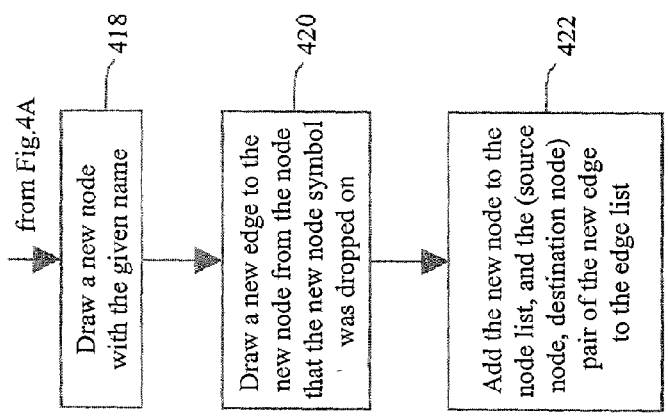
Figure 4B (Creating a new node & a new edge, cont'd)

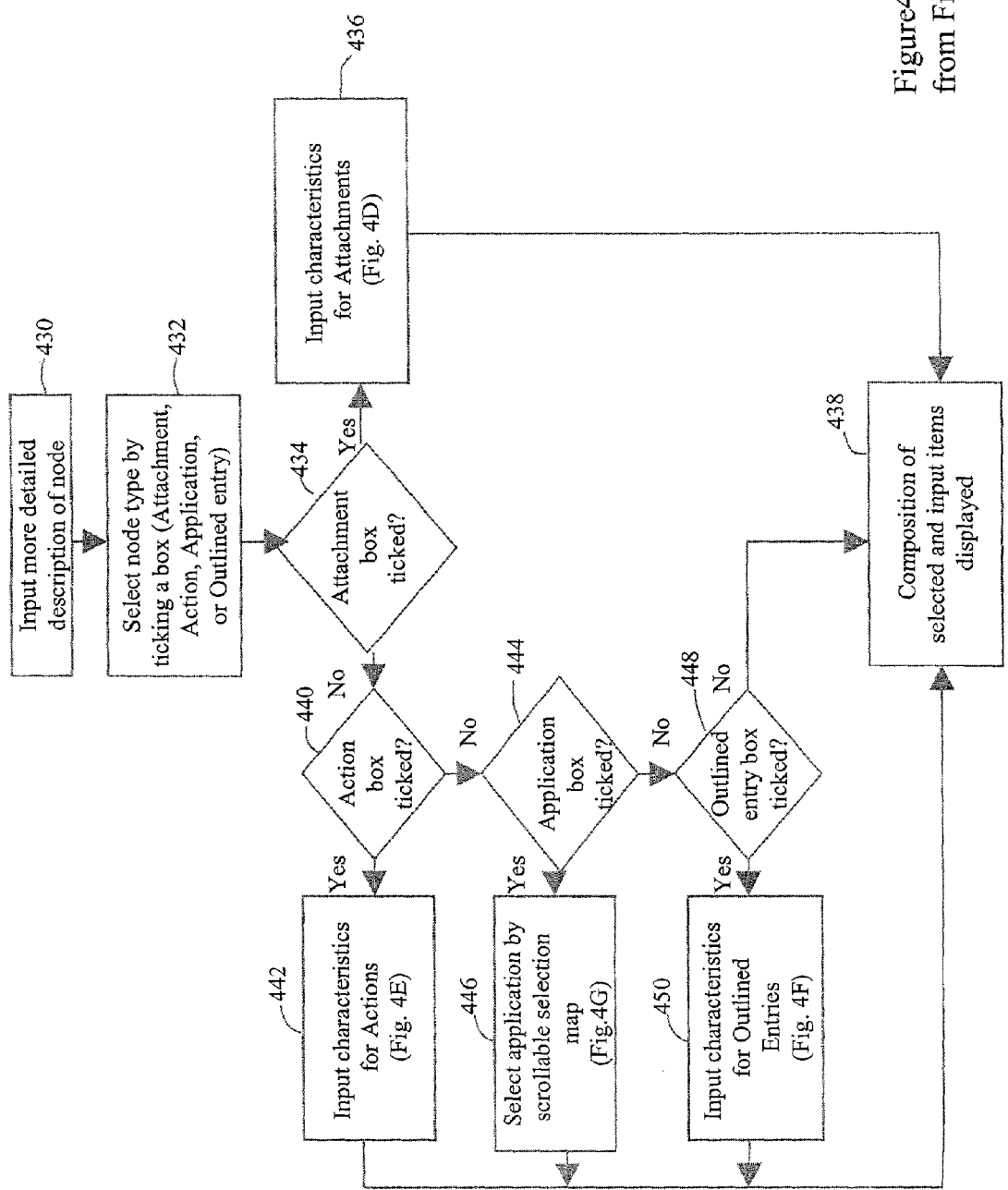
Figure 4C (Subroutine called from Fig. 4A)

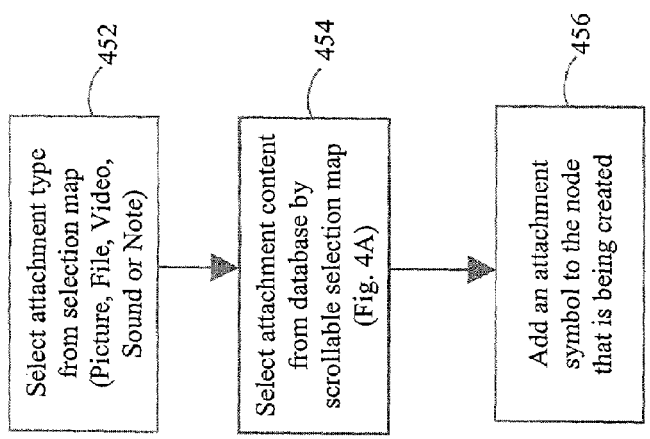
Figure 4D (Subroutine called from Fig. 4C)

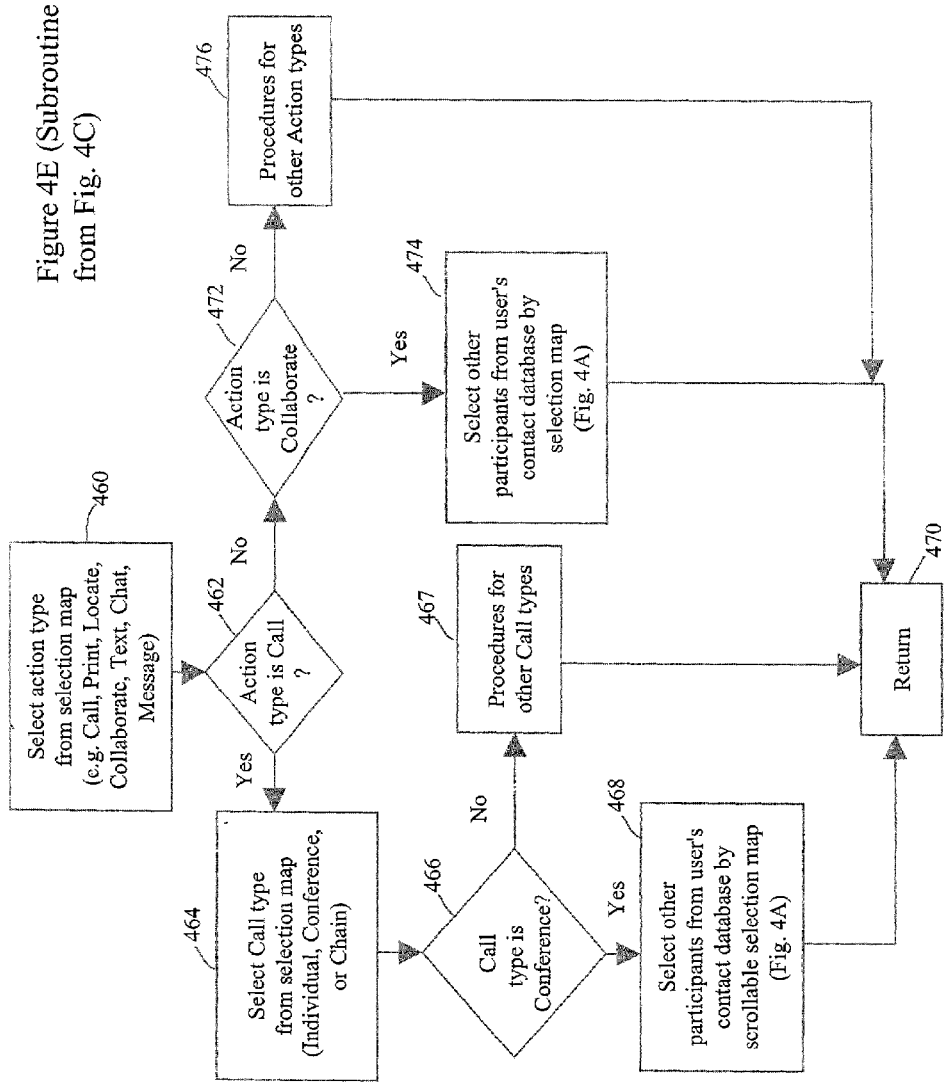

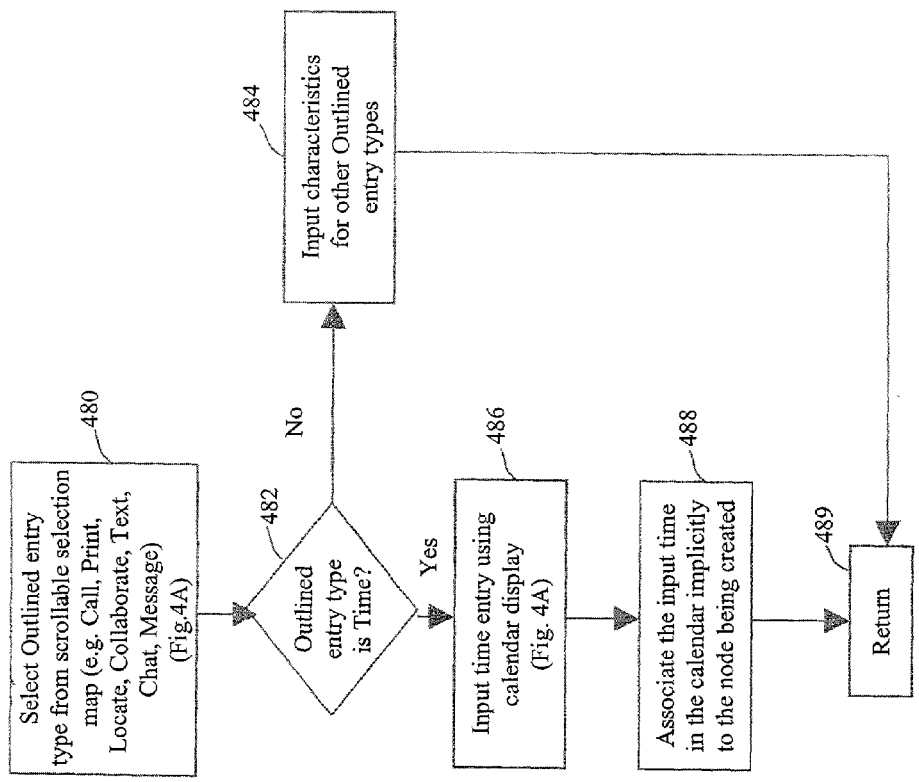
Figure 4F (Subroutine called from Fig. 4C)

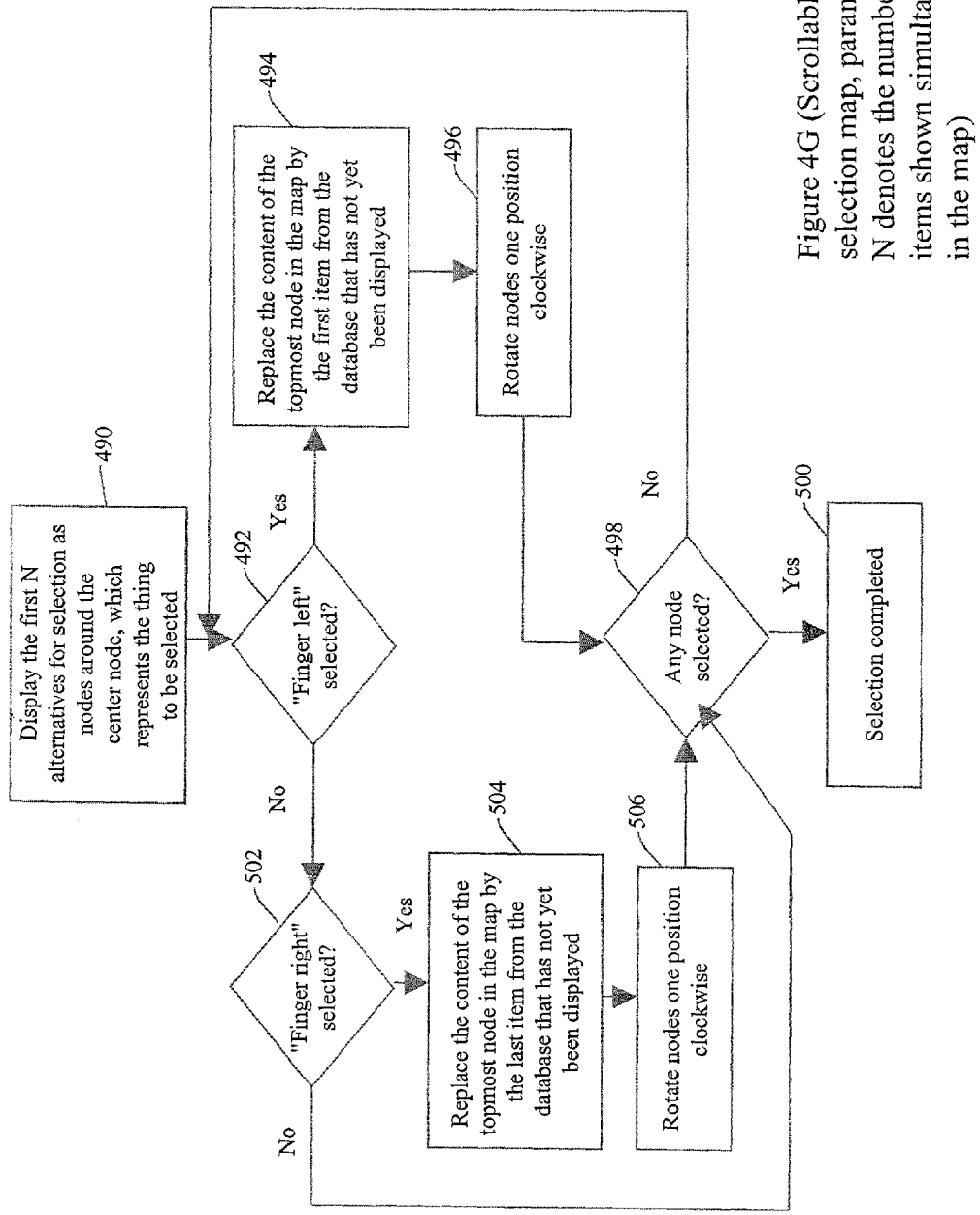
Figure 4G (Scrollable selection map, parameter N denotes the number of items shown simultaneously in the map)

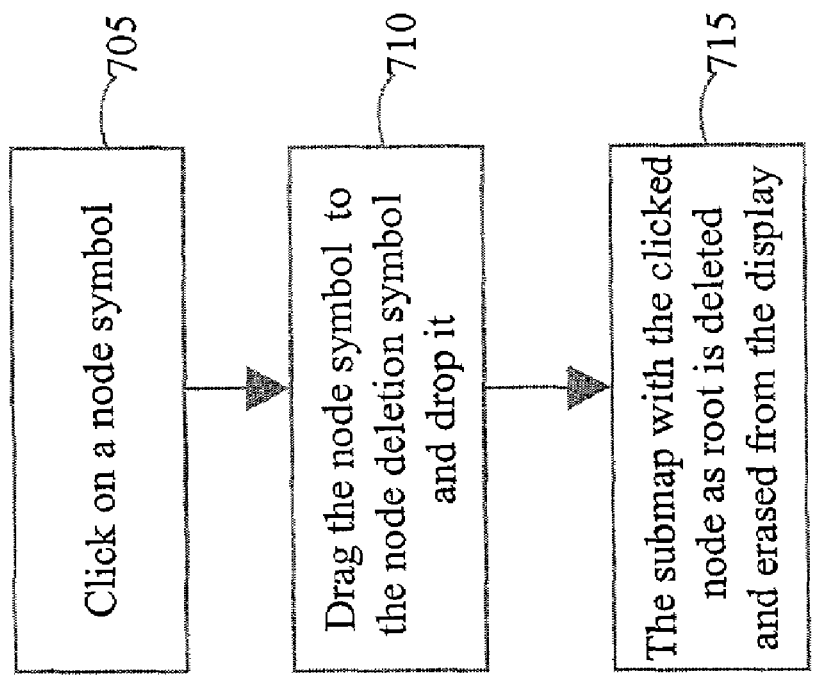
Figure 7A Deleting a submap (limiting case: a node) from a map

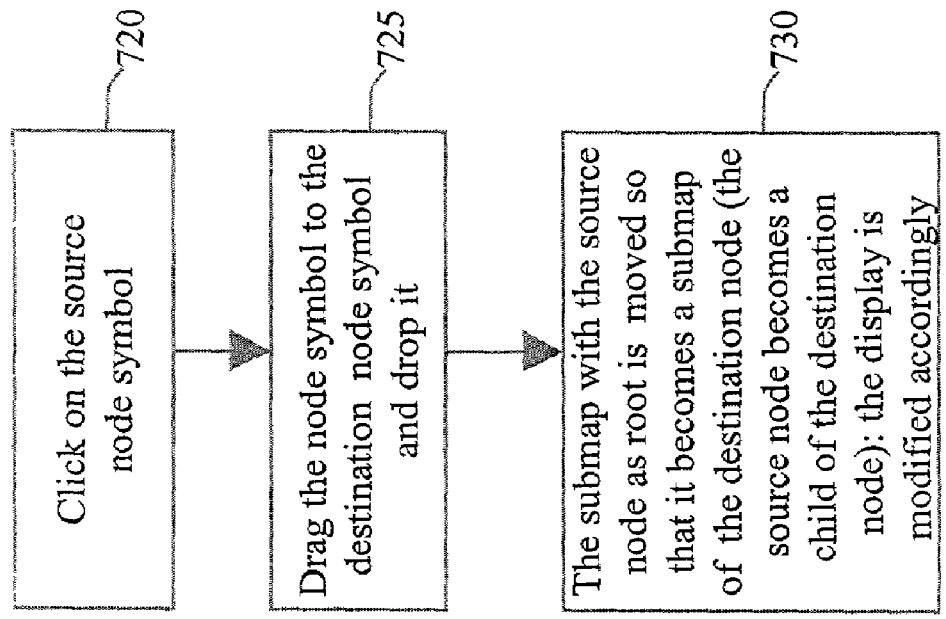

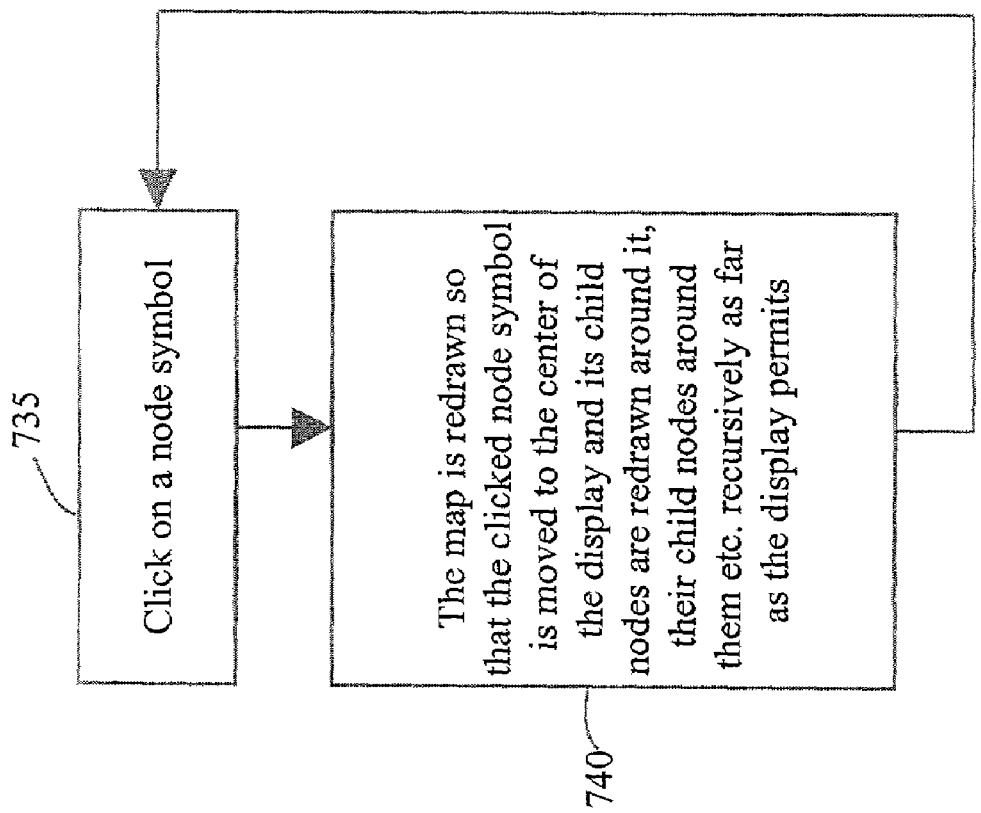
Figure 7C Navigating a map manually

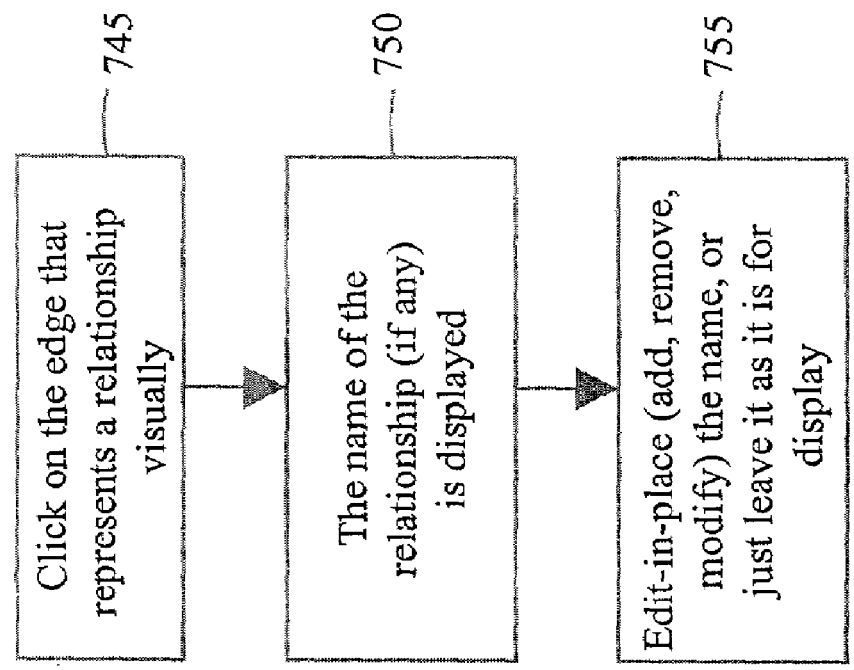
Figure 7D Editing or displaying the name of a relationship

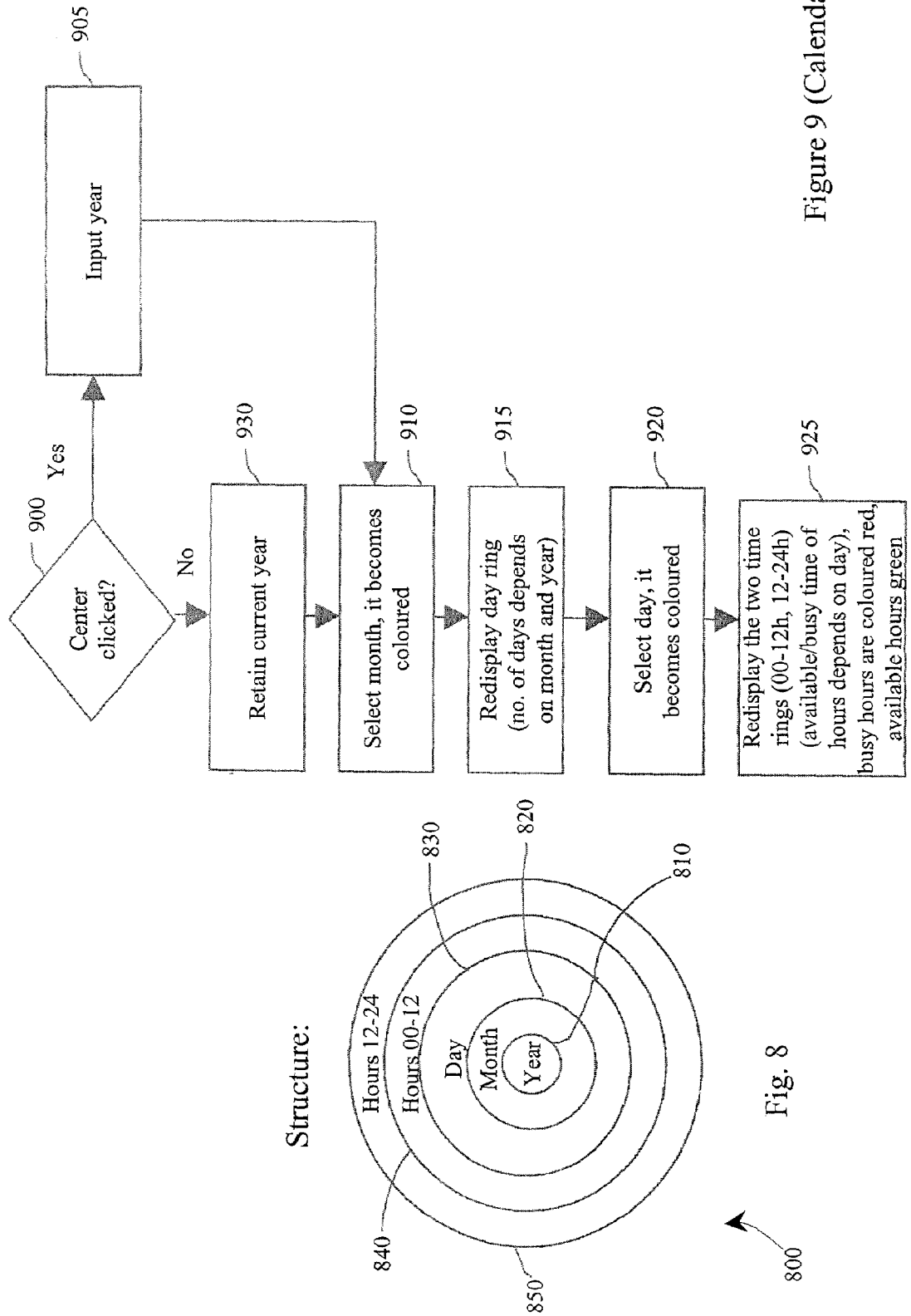

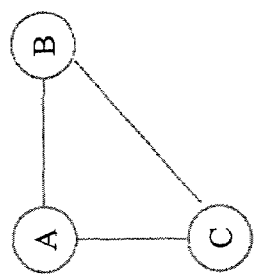
(c)
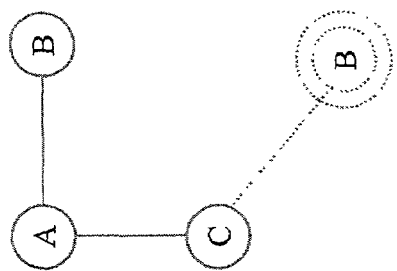
(b)
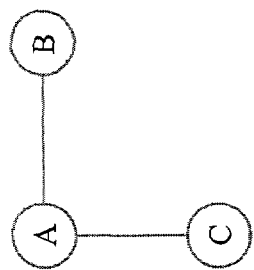
(a)
Figure 10

METHOD, SYSTEM AND APPARATUS FOR CONSTRUCTING FULLY PERSONALIZED AND CONTEXTUALIZED USER INTERFACES FOR TERMINALS IN MOBILE USE

FIELD

A method, system and apparatus for creating user-interfaces, and more particularly a method, system and apparatus for creating fully-personalized and contextualized user interfaces for terminals in mobile use.

BACKGROUND

User Interfaces (UIs) are generally organized in terms of hierarchical file systems. This stands in contrast to the way a user thinks, which is generally in terms of an association network of ideas. Association networks are referred to as maps hereinafter. Viewed as a data structure, an association network is a graph.

In older Personal Computer (PC) systems and UIs, information has been organized along the structure of the file system of a computer. Mobile phone UIs, in contrast, have been organized task-wise, but they are neither customizable nor map-structured. These older application programs are designed just for organizing and navigating information. However, as can easily be recognized, in today's computing environment there is a great need for application programs that provide a richer system of functionality that allows users to utilize them for a wide variety of functions. The additional functions of creation, innovation, understanding, learning, communication and commerce of information have had to be accessed by means of disparate devices and application programs with various types of UIs. These functions are disparate with respect to each other on a conceptual as well as on the implementation level. Users have been forced to move from one device and/or application program to another, possibly converting information from one format to another, and/or synchronizing data between devices and to switch from one mindset to another, in performing these functions.

Further, older systems have UIs that typically organize information in terms of a hierarchical file system. The items can be pictures, videos, links to web pages, text notes, files, and/or the like.

Unfortunately, such hierarchical file systems fail to relate items of information in a user-friendly manner such that a user might be able to access one piece of information from another related piece of information, when the two pieces of information are organized as different items.

Existing systems restrict customization of the UIs as well. Customization of a UI has been confined to the possibility, in some applications, of adding items to menus whose structure has otherwise been decided in advance and designed by a UI designer. For example, the WINDOWS desktop can be customized to some extent, but its menus have structures that are largely pre-programmed by the developers. Moreover, items on such systems cannot be interlinked. Such problems become even more acute when we deal with mobile systems, such as cellular phones.

Another disadvantage of existing systems is that they are device-dependent.

Thus, there is a need for a method, system and apparatus for creating user interfaces for terminals in mobile use that are compatible with all sorts of terminals.

Further, there is a need for a mechanism that allows individual users to customize their own terminals in accordance with their own preferences and needs.

SUMMARY

The method, system and apparatus for creating fully-personalized and contextualized user interfaces for terminals in mobile use disclosed herein overcomes the above-mentioned disadvantages.

The disclosed method, system and apparatus for enabling users to create customized user interfaces allows a user to create user interfaces on the fly. The user interface is logically structured as a node map, wherein nodes may be added to the node map in accordance with the user's needs. The nodes may be connected there-between to define relationships between the different nodes. The nodes may have an attachment, an action, an application and/or the like associated therewith. The user may perform a variety of other functions to customize, alter or expand the information depicted on their user interface.

These aspects and other objects, features, and advantages of the method, system and apparatus for establishing, monitoring and managing connectivity for communication among heterogeneous systems are described in the following Detailed Description, which is to be read in conjunction with the accompanying Figures and the claims.

BRIEF DESCRIPTION OF THE FIGURES

FIGS. 4A-4G are flowcharts illustrating an exemplary process by which users may create new nodes and edges on the maps;

FIGS. 7A-7D are flowcharts illustrating the exemplary actions that may be performed on the maps;

FIG. 8 depicts one exemplary embodiment of a calendar;

FIG. 9 is a flowchart for creating and using the calendar of FIG. 8; and FIG. 10 provides one exemplary illustration of the resolution of a graph into a tree.

Figure 1A:
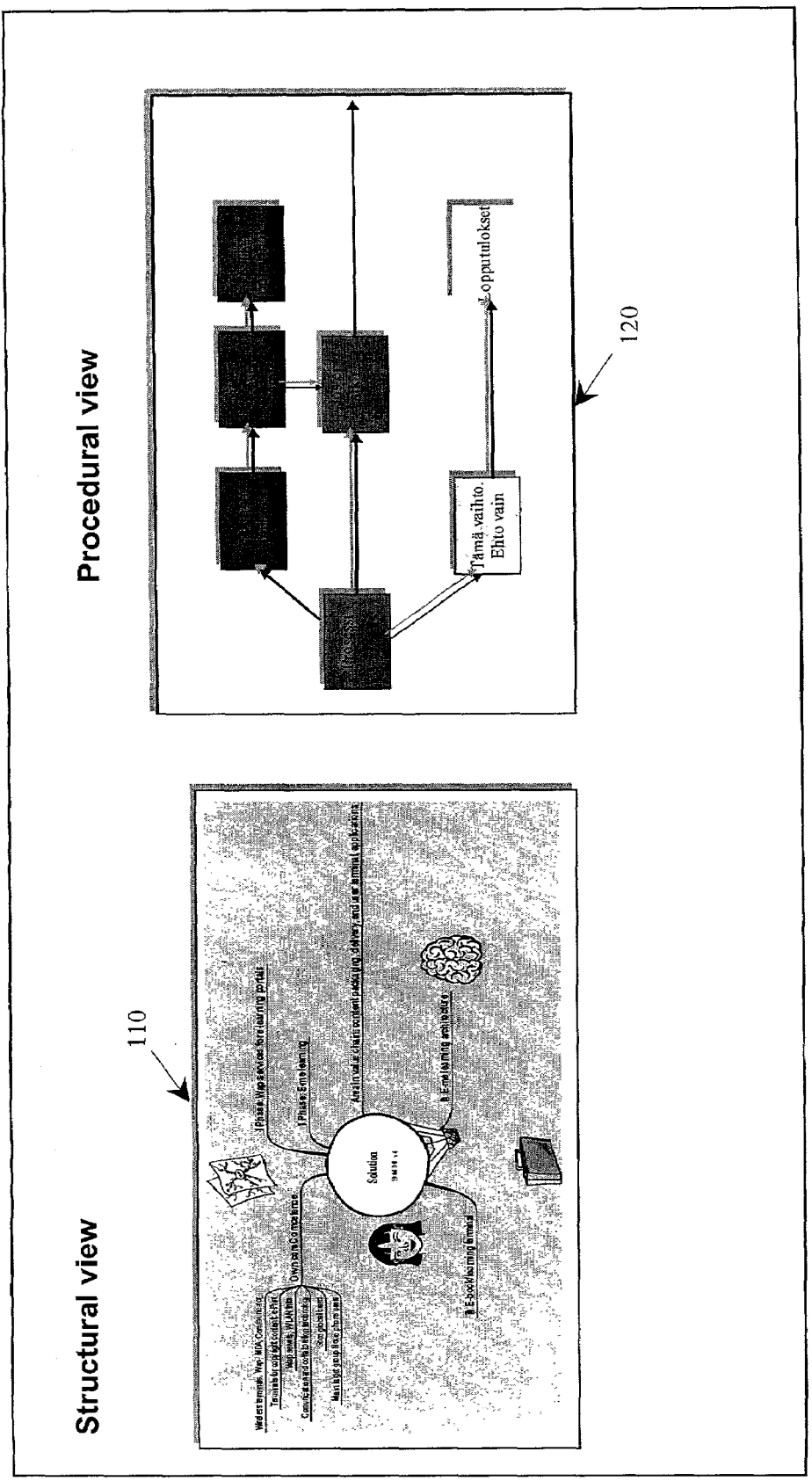
FIGS. 1A-1B depict the various views for viewing the information.

With reference to the following detailed description, the aforementioned Figures will be described in greater detail below.

DETAILED DESCRIPTION

Described herein is a method, system and apparatus for creating fully personalized and contextualized user interfaces for terminals in mobile use. The disclosed method, system and apparatus for enabling users to create customized user interfaces allows a user to create user interfaces on the fly. The user interface is logically structured as a node map, wherein nodes may be added to the node map in accordance with the user's needs. The nodes may be connected there-between to define relationships between the different nodes. The nodes may have an attachment, an action, an application and/or the like associated therewith. The user may perform a variety of other functions to customize, alter or expand the information depicted on their user interface. The key feature of the present invention lies in the disclosed meta-level character, which is a dynamic and user-friendly application for constructing UIs and allows users to fully customize their terminals in accordance with their own preferences.

It should be noted that hereinafter the word "terminal" is used to denote any computing device supporting JAVA, such as a mobile phone, a personal digital assistant, a laptop computer, a hand-held computer, a desktop PC, a digiTV, and/or any similar computing device.

According to the invention, users are able to organize their information/UIs using maps, which relate different types and items of information. The system and method for construction of UIs is access-, content- and device-independent, and actions may be made a function category of the UIs. Examples of the various devices that may be used include:

PC environment: Linux, MS Windows, MAC and/or the like.
Handheld devices: Symbian, Pocket PC, Windows CE, J2ME, PersonalJava and/or the like.
Mobile Devices: All J2ME and PersonalJava compliant devices, WAP/XHTML and/or the like.
Other devices: JINI, OBEX, Local Operation Network (LON), which may be only accessed using the present invention (as a result, devices such as refrigerators and washing machines can be controlled by the system of the present invention, as will be explained in more detail below).

Examples of the various types of access that may be used include:
TCP/IP based environment and/or the like.
Mobile Devices: GPRS, 3G and/or the like.
Handheld Devices: WLAN, Bluetooth and/or the like.
PC environment: WLAN, Bluetooth, ADSL and/or the like.

Examples of the various types of content that may be supported include:
XML based content easily accessible with any device, and/or the like.
MIME based file-type identification that is dependent on viewer, and/or the like.

In addition, the system and method for construction of UIs may be person-dependent, so that the system is filly customizable and includes user created content. The system and method may also be time dependent so that a different device may be in use at different times and access to the system may be obtained from all devices, and user defined profiles may be used to allow time enabled services, which are explained in more detail below. The system and method may be location dependent as well, to allow different services at different locations, with location identification based on user (such as user definable locations). The system and method may further be device-dependent to allow location identification using technologies such as GPS, GPRS and or the like.

Two or more users can collaborate simultaneously with each other in performing these functions by terminals, using Bluetooth, WLAN, Internet, GSM, GPRS and UMTS connections. The connection type depends on terminal. For example, a PC may use an Internet connection, whereas a mobile phone a GPRS connection in a collaboration situation. The system may optionally be implemented in a peer-to-peer system that enables convergence of communication, information management and learning in interfacing them uniformly to the user. Because the exact design of the system does not restrict the use of the disclosed invention, it is believed that the scope of the present invention is not limited by the system implementing the disclosed invention.

As will be described in more detail below, the present invention enables a user to interface various types of terminals in mobile use. The user can access the same information regardless of where and when he needs it and/or the terminal being used. In addition, the user can restrict access to certain information. For example, an employer may restrict access to certain confidential files to the physical premises of the employer. Nevertheless, the default is as described above. As will be clearer from the discussion below, information is more intuitively organized than in present systems.

In accordance with the invention, if the user wants to perform an action that he has customized into his UI, he just points at the symbol associated with the action on the terminal, and the action is initiated. In another embodiment, the user must first move the symbol to the center of the display by pointing once, and then by double-clicking (i.e., double-pointing) perform the action. The terminal is conceptualized as a tool for uniform organization, navigation, creation, innovation, understanding, learning, communication and commerce of information. In other words, the present invention acts as management tool for information on a computing device. The convergence of communication, information management and learning is supported by a method for interfacing them uniformly to the user. Further, the user has complete freedom to customize the way he interfaces to a terminal.

In accordance with the present invention, the system for constructing UI's may be run at home, at school or work, on terminals and/or the like. At home, the system may be run on terminals connected to a master device or on the master device itself via Bluetooth, WLAN technology and/or the like. At school or work, the system may be run on terminals connected to the master device via Internet connections provided by X Service Providers (xSPs). The master device may also be a service purchased from a service provider. On cellular terminals, the system may be run anywhere via wireless connections provided by cellular network operators, such as GSM, GPRS, UMTS operators.

The above-mentioned master device is a computer at home that stores data, and communicates with the external world via Internet. The master device communicates via Bluetooth, WLAN or LAN connections with terminals and/or any other devices, such as coffee makers, refrigerators and/or the like. One may also purchase a master device service from a service provider, if one does not want to have one of one's own. The system for creating UIs may run on top of the JAVA VIRTUAL MACHINE, which runs on an operating system such as LINUX or any other compatible operating system. The user may interact with a terminal by means of some kind of a pointing device, which may be dependent on the terminal type. The pointing device can be a touch screen pen, a mouse, arrow keys on a keyboard and/or the like. Terminals may also have a text-inputting device, such as a keyboard, a virtual keyboard on a display device, or a touch screen together with a pen and handwriting recognition functionality. According to one embodiment, the disclosed system architecture is a peer-to-peer system. As is described in greater detail below, the user's content is organized around maps, and resides in a map database in the user's master device. When a user inspects or updates his maps, a copy thereof is also transferred temporarily from his master device to the terminal he is using, and the modifications are transferred back to his master device. It should be noted that in one embodiment, this updating can be done either manually by the user or set to take place automatically every x minutes, where the user chooses x.

With reference to the Figures, various embodiments of the method, system and apparatus for creating UIs to fully customize terminals in accordance with the user's own preferences will now be described in greater detail. It is to be understood that the tasks shown in the Figures and described in this Detailed Description can be sequenced in many different orders to achieve the desired result. The order or sequence of tasks illustrated in the Figures is merely intended to be exemplary of the concepts defined herein.

Figure 1B:
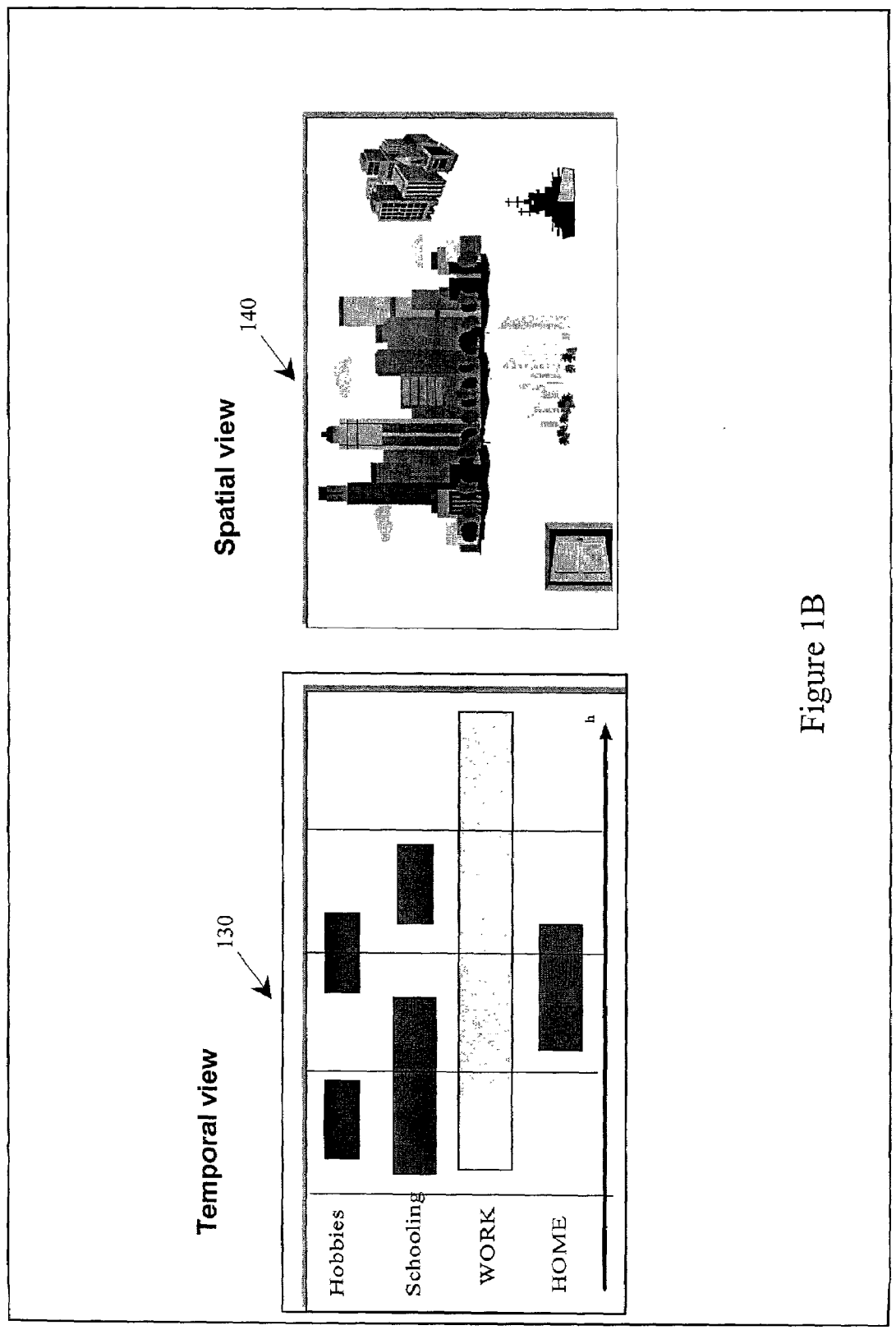

FIGS. 1A-1B illustrate the various views that may be exposed to a user, depending on the user's own preference for the UI. The process of switching between various different views allows a user to inspect his information map in terms of different aspects. As shown, the structural view 110 allows viewing of information that is organized in terms of the main object, such as what the object is, why it is in its given form, and who (human players, other objects or processes) impacts the given object. The piece of knowledge is displayed by means of an ordinary map, which will be described in more detail below. If the user desires, he may switch the view to a procedural view 120, which is similar to a flowchart for the procedure or process involved. The user may also switch to a temporal view 130, which organizes and displays information in a temporal chart in terms of duration, time schedule of one or more activities and/or the like. The user may also select to display their information is a spatial view 140, which depicts the information in an ordinary geographical map. The system of the present invention provides automatic conversions between the various views, as long as there is sufficient information for each view.

In the event that there is not enough information, the present system may optionally provide a notification to the user informing about the lack of enough pertinent information. According to the invention, the user can generate views in various ways, including directly from a given map, by combining information from several databases by means of a knowledge management engine and/or the like.

Figure 2:
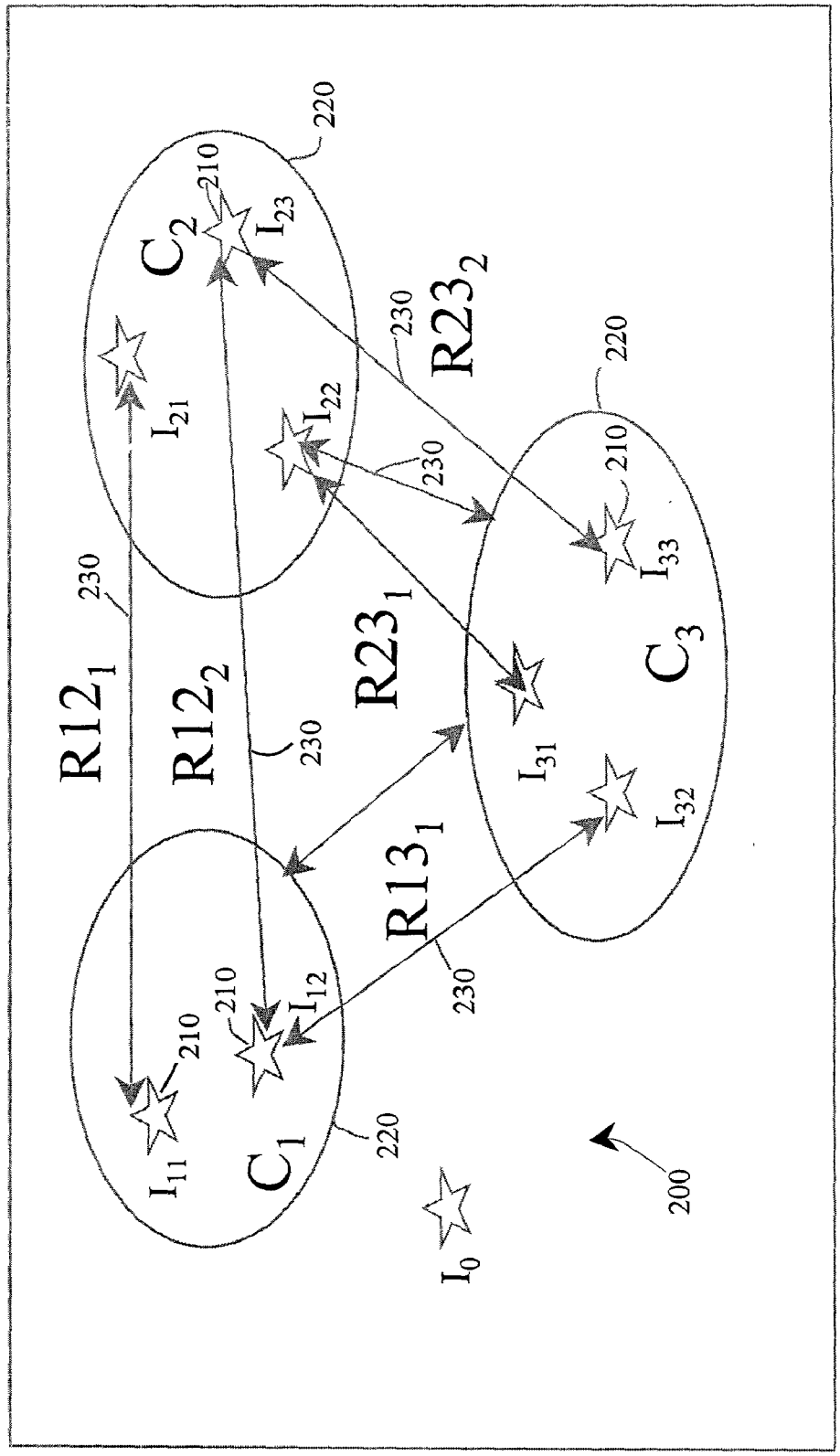
FIG. 2 illustrates one exemplary embodiment of a map in accordance with the present invention.

FIG. 2 depicts a map in accordance with the present invention. As shown, a map 200 comprises a plurality of individual objects 210, wherein the individual objects 210 may be organized by categories 220. More than one individual object 210 may be related to each other as well as more than one category 220 may be related to each other through the use relationships 230. In addition, there may be relationships between an individual and a category. The placement of an object 210 in a category 220 implies a relationship between the object 210 and the category 220. Thus, there are relations between objects $I_{11}$, $I_{12}$ and category $C_1$, objects $I_{21}$, $I_{22}$, $I_{23}$ and category $C_2$, and objects $I_{31}$, $I_{32}$, $I_{33}$ and category $C_3$. As noted above, an object may be related to more than one category. For example, $I_{22}$ is related to category $C_2$ as well as category $C_3$. In short, an individual object 410 may belong to any number of categories 420 (including, to zero categories (e.g., $I_0$), or to more than one category (e.g., $I_{22}$)). There may also be relationships between a category and another category, such as the relationship between $C_1$ and $C_3$.

Each individual 210, category 220 or relationship 230 may also have any number of associated attributes. The term node is used hereinafter to refer to individuals 210 and categories 220, and the word edge is used to refer to relationships 230 in the map 200, when discussing the visual representation of the map 200, and when discussing the map on the data structure level (as opposed to the conceptual level).

Individuals 210 and categories 220 may be further subdivided into notes, actions, applications, attachments, outlined entries, and/or the like. Each terminal has its own API that may (or may not) support an application. For example, a call application may be supported by mobile phone APIs but not by DigiTV APIs. Actions that are defined in terms of applications derivatively may (or may not) also be supported by a terminal. For example, the action of calling home may be supported by mobile phones but not DigiTVs. An application node is a link to any application, such as a mail program or a schedule tool. Double-clicking a previously defined application node by a pointing device starts the application. In another embodiment, double-clicking a previously defined application node that is in the center of the display by a pointing device starts the application.

An attachment is a file. It may be of any kind, such as pictures, video, file, sound, notes and/or the like. A particular special case of a file attachment is another map. A note node may contain a link to another map. When an attachment that has been created previously is opened for viewing or editing, the application by means of which it was created is launched to do this.

An outlined entry may be used for supplying input of a pre-determined format to an application. The form of an outlined entry is specified by the application it belongs to. For example, an outlined time entry can be used for inputting data to a schedule tool. An outlined entry may be in the form of an electronic form.

The map structure of the present invention allows two different visual structures that the user may switch between: trees and graphs. Graphs require a terminal with a graphical display.

Figure 3A:
FIGS. 3A-3P are screenshots illustrating one embodiment of navigating the maps provided by the present invention.
Figure 3B:
Figure 3C:
Figure 3D:
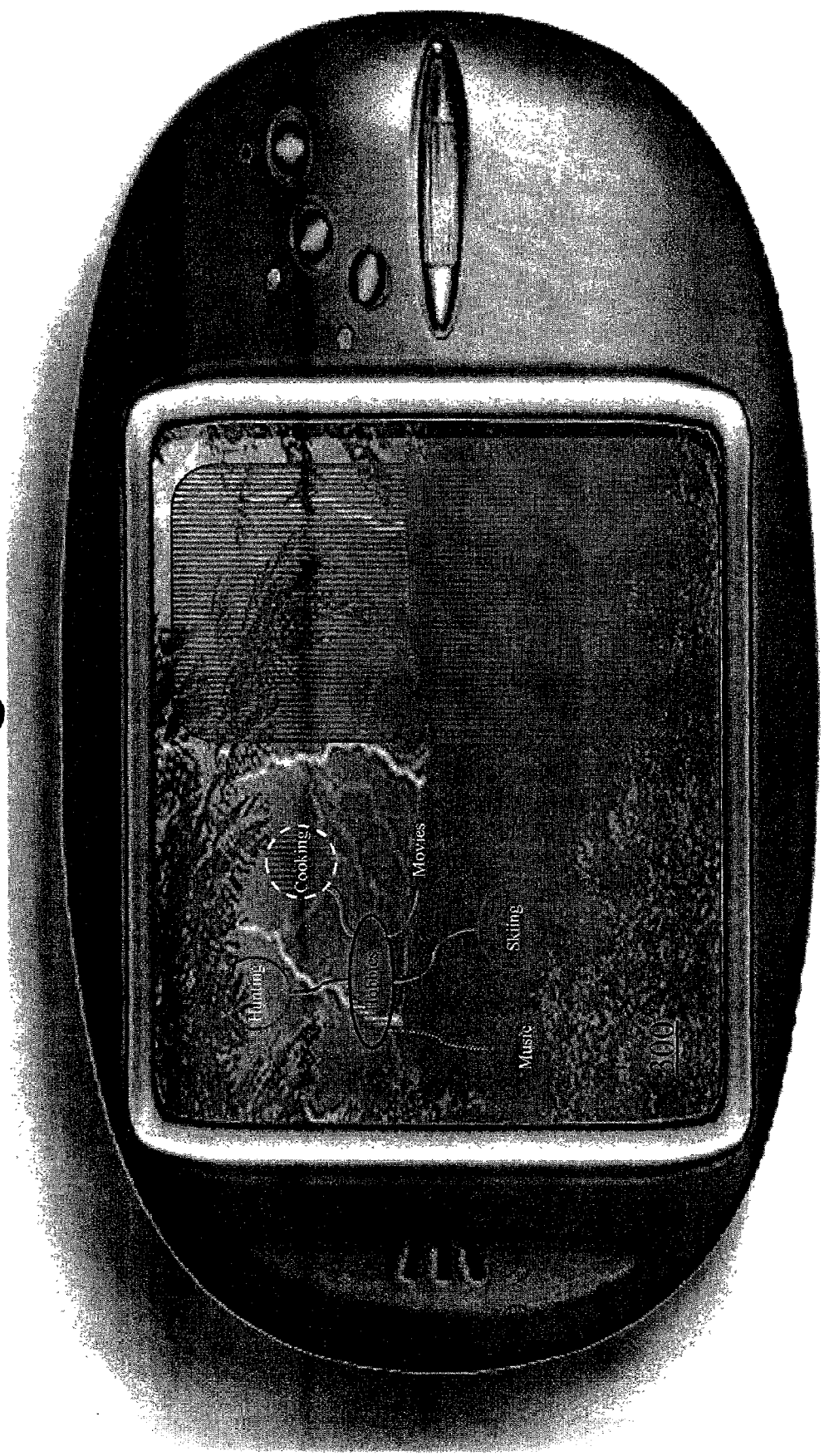
Figure 3E:
Figure 3F:
Figure 3G:
Figure 3H:
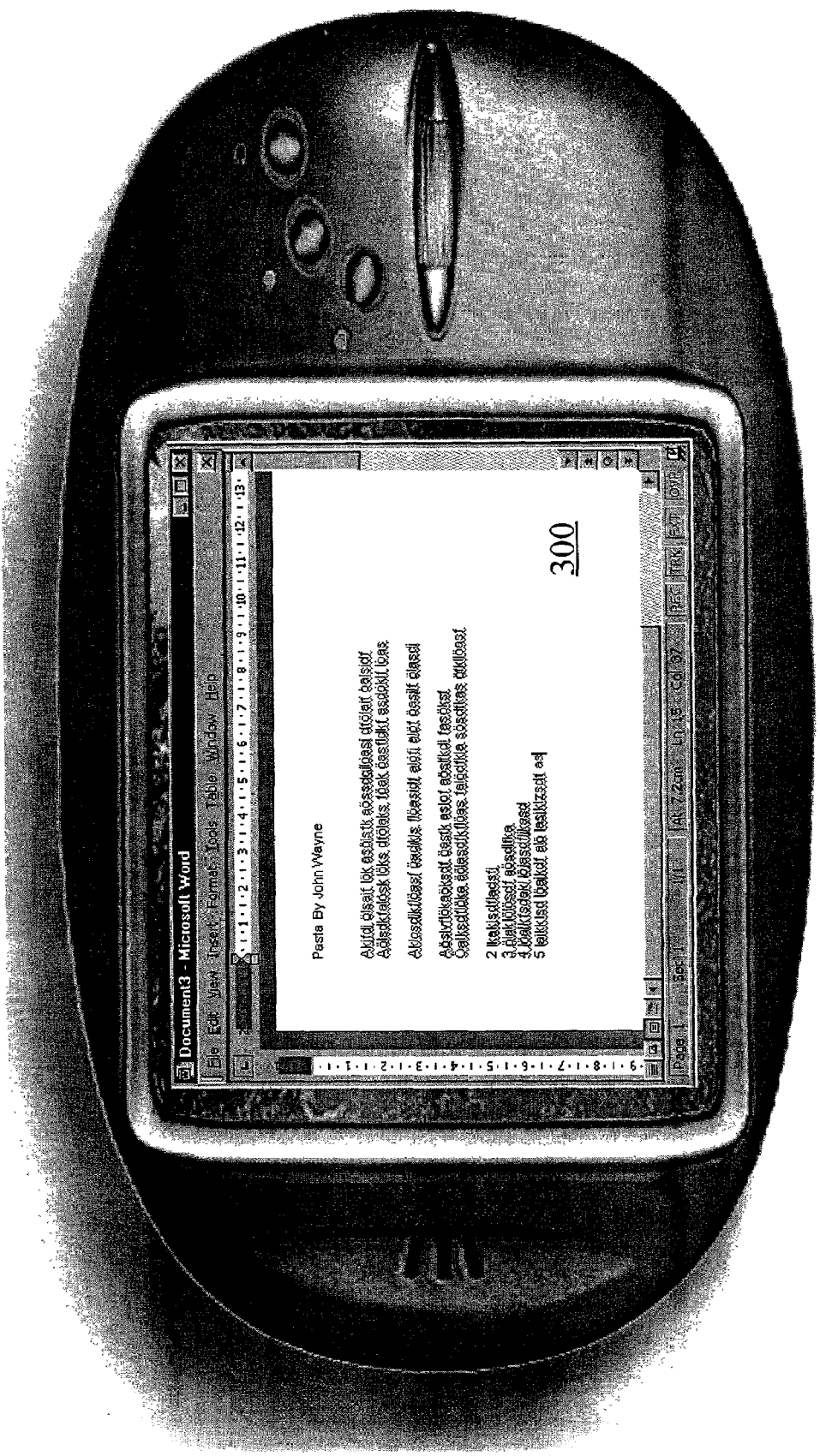
Figure 3I:
Figure 3J:
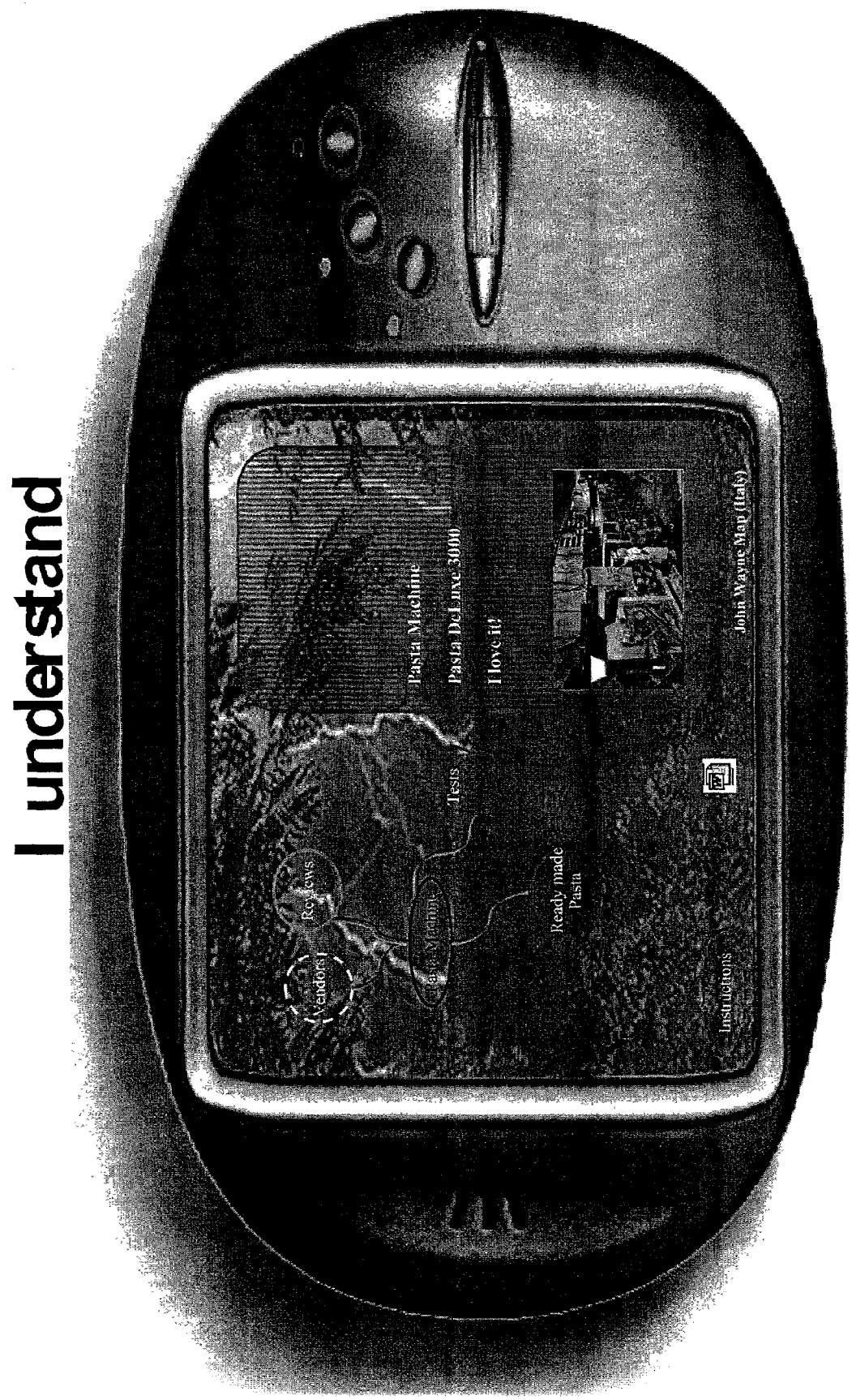
Figure 3K:
Figure 3L:
Figure 3M:
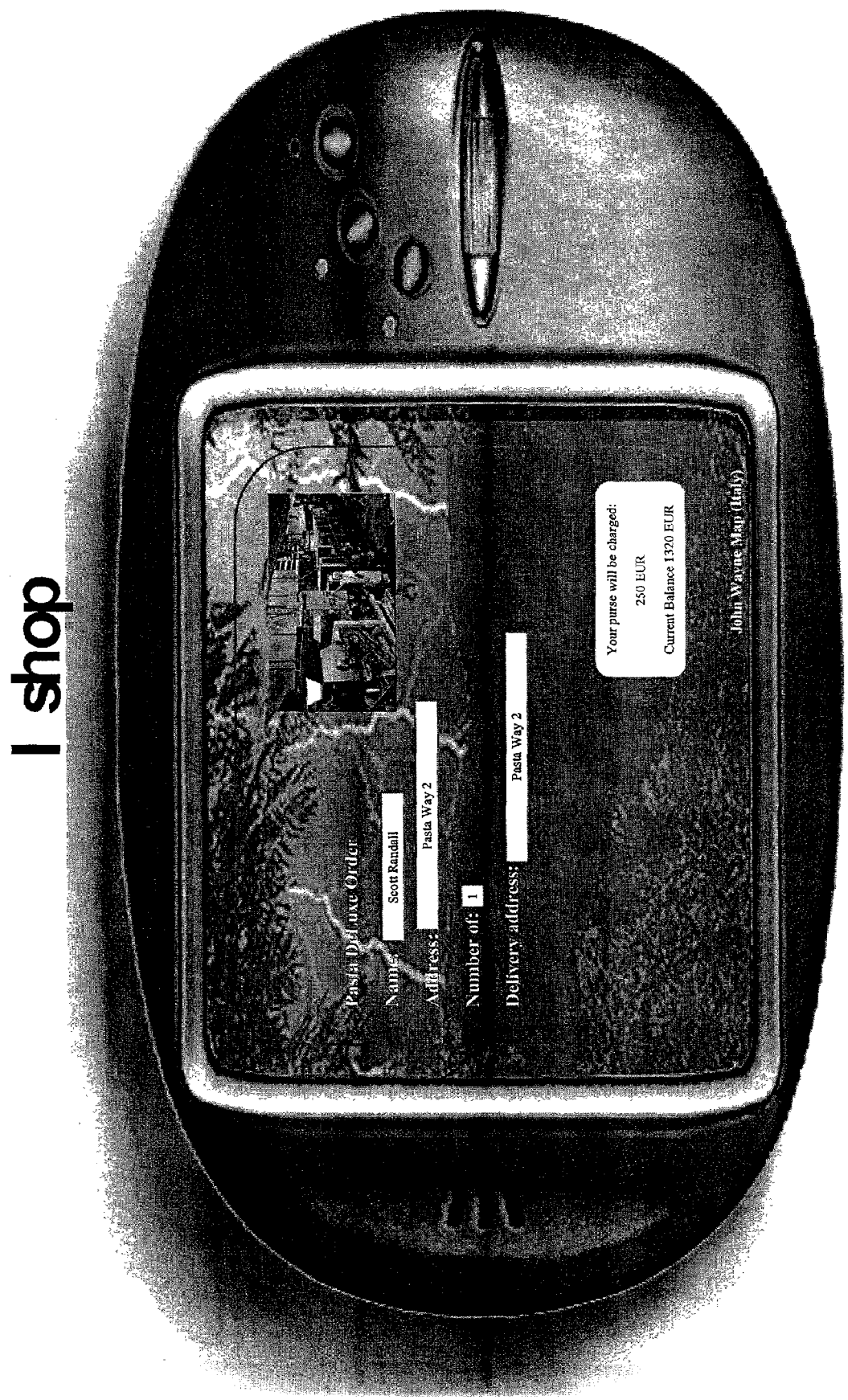
Figure 3N:
Figure 3O:
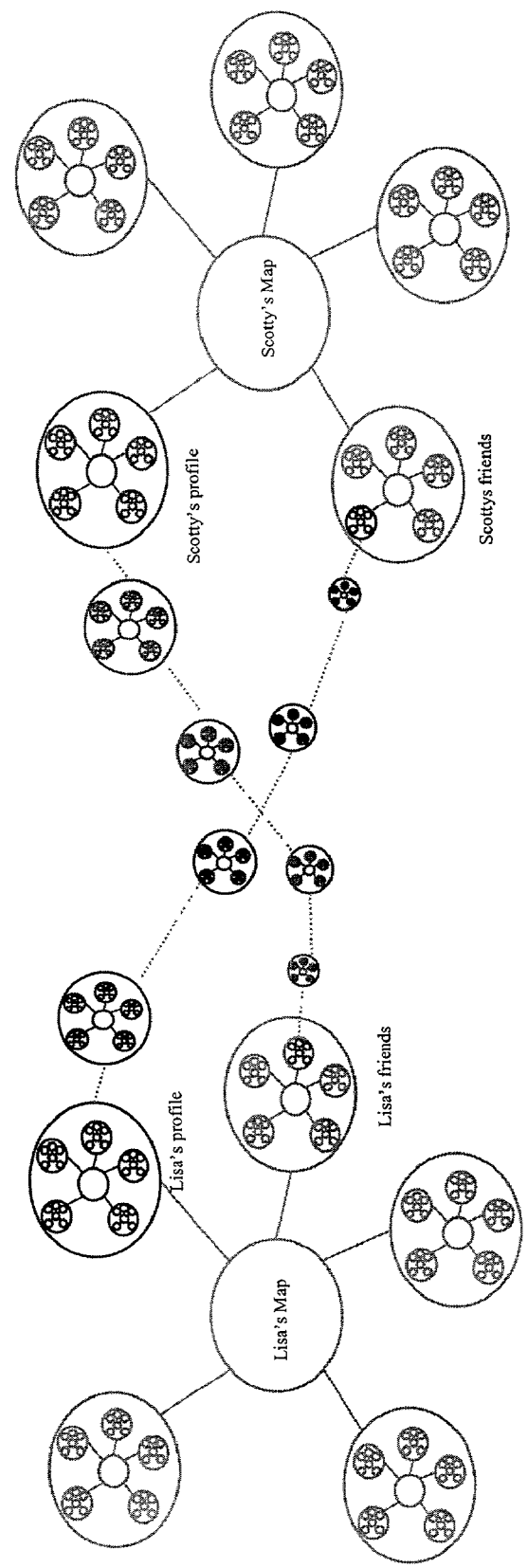
Figure 3P:
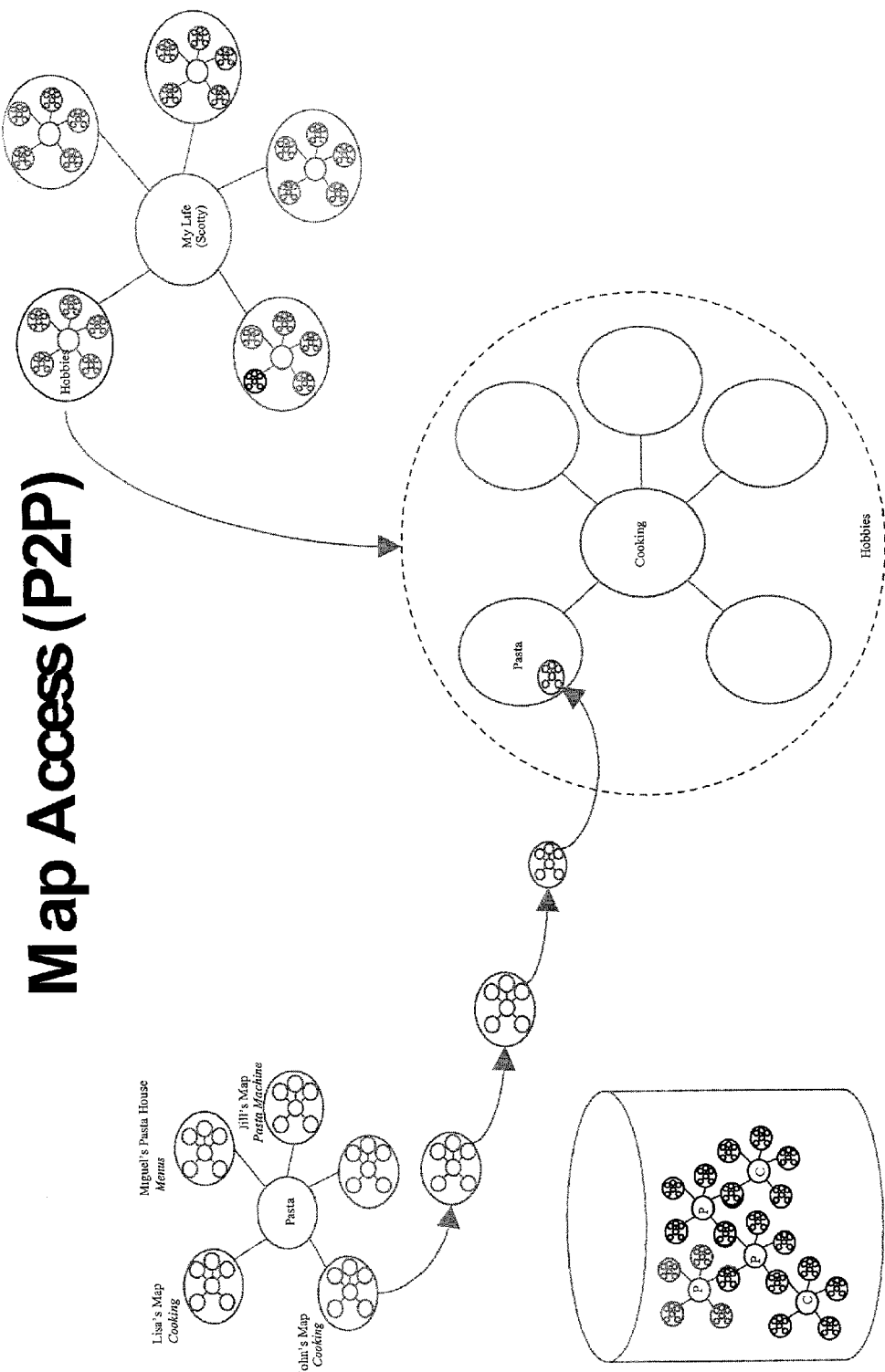

FIGS. 3A-3P illustrate one embodiment of navigating the maps provided by the present invention. It will be understood that the exemplary user interfaces displayed in this manner are intended to be illustrative, rather than limiting, and that any user interface may be provided or created by the user as well as any mechanism for providing visual feedback may be employed.

FIG. 3A depicts the example of a map that comprises the user's family. As shown, "Family" represents a category 220, and "John", "Mary" and "Jill" are individual members 210 thereof. The family relationships are labeled so that "John" is the "father", "Mary" the "mother", and "Jill" the "daughter" of the family, where father, mother and daughter are the defined relationships 230.

It should be noted that individuals 210, categories 220 and relationships 230 might be given any name by the user. Similarly, individuals 210, categories 220 and relationships 230 may be represented visually in any manner desired by the user, as long as the map structure is abided by. For example, in one embodiment, a yellow circle may represent categories 220, a blue circle may represent individuals 210, and branches may be used to represent relationships 230. In another embodiment, the user may choose to use the same kind of visual representation for both individuals 210 and categories 220.

FIGS. 3B-3N illustrate the possibility of leaving relationships 230 unnamed. In one embodiment, the default setting in the "Mapper" leaves relationship names implicit. To depict that the user has named a relationship 230, a dot in the middle of the edge that represents the relationship 230 graphically is used in one example. This implicit name can be made explicit by clicking on the dot by a pointing device. Such a default setting makes maps more succinct and easy to grasp visually, and may be reversed by the user so that all relationship names are explicitly shown.

A relationship 230 is created at the same time as a new node is created, namely between the new node and node to which the new node is associated. An existing relationship 230 can be edited by clicking with a pointing device on the edge that represents it visually. Editing a relationship allows adding, removing or modifying its name.

A tree-form display of a map 200 has a main node at the center. It can be a category 220 or an individual 210. For instance, FIG. 3B displays a configuration where the main category is "My Life". The remaining categories "Home", "Hobbies", "Social Life", "Work", "Leisure", and "Family" can be regarded as subcategories of "My Life", because they have been created as its child nodes.

In one embodiment of the present invention, maps 200 are constructed by a pointing device and a text input device. Selecting a node by a pointing device activates the node, moves it to the center of the display, and arranges the immediately related nodes around it.

Submaps may be moved to other locations in the map 200 by dragging-and-dropping, as described in more detail below.

The UI may also contain a message area for the user, as illustrated in the bottom of FIG. 3B. In one embodiment, the terminal is intended to be in continuous real-time contact with other terminals and servers via Internet, telephone networks, Bluetooth, WLAN and/or the like. Thus, in this exemplary embodiment, the illustration depicts the situation where the user receives a message and is informed by the UI in real-time. The nodes of the map 200 may be arranged in a particular geometric configuration, such as child nodes may be displayed on an ellipse shape arrangement around their parent, as shown in FIG. 3B. The user may optionally rotate this ellipse manually to inspect it from other aspects. In addition, the present invention may also allow automatic rotations with respect to the rhythmic passing of time (such as day, week, year and/or the like).

In accordance with the present invention, users are enabled in sharing maps with other users. For example, FIG. 3B illustrates the example where the user has received a map request from another user.

As will be described below, the user navigates the map 200 manually by repeatedly selecting nodes, and thus moving the visible area of the map on the display device. For example, FIG. 3C shows a situation where the user has selected category "Hobbies" by a pointing device and hence moved it to the center of the display device (FIG. 3D). The immediately related nodes may be drawn around the node moved to the center. Selecting a node located in the center of the display activates it for inspection or editing. It should be noted that to select a node the user must click once by pointing device, which moves the selected node to the center of the display. Selecting the node in the center of the display opens it for inspection or editing unless it is an application or action node. If it is a note node with a link to another map, the other map is displayed. Double-clicking an application or action node in the center of the display starts the application or performs the action. For example, in one embodiment, selecting an attachment node that is in the center of the display opens an attachment thereto.

Further generations of nodes beyond the first generation of children are displayed depending on the terminal, so that the displayed part of the map fits on the display device 300. The previous node on the navigation path is displayed at the bottom left corner of the display 300, as illustrated by the navigation path traversed in the sequence of FIGS. 3D-3G, 3I-3L, which lets the user backtrack. Selecting the node, shown at the bottom left corner of the display, with a pointing device takes the user to the previous node on the path. Alternatively, several previous nodes of the navigation path are displayed.

In connection with navigation, the user may also reorganize a map 200, by adding, deleting, editing the content, or moving around parts of it. Thus, FIG. 3D illustrates how the user may organize information by adding a new subcategory "Music" to the category 220 "Hobbies".

FIG. 3E illustrates a map search. The user first selects the category "Cooking" and then its subcategory "Pasta". Now the search engine of the present invention informs him that two other users, namely "Lisa Jordan" from Mexico and "John Wayne" from Italy, also have a map 200 with this association (i.e., information about cooking pasta). If more associations are found in the "mobile universe" than can be displayed simultaneously, the "Mapper" just displays the number of associations that fit on the display 300 at any given time for avoiding information overload.

Another aspect of the present invention is the notion of a search agent that automatically scans the "mobile universe" and gathers statistics of the most commonly occurring associations. When the user creates a node, the "Mapper" may then suggest, for example, the five most frequently occurring associations in the "mobile universe" as possible extensions of the user's map 200.

As one possible example, if the user creates a node with name "Cooking", and the most common associations with "Cooking" are "Pasta", "Pizza", "Paella", "Meatloaf" and "Thali", the "Mapper" can suggest these to the user as possible extensions of his map 200.

The user may collaborate with other users, say, in terms of the child nodes "Desserts", "Ingredients", "Instructions", "Wines", and "Salads" of "Pasta" (FIG. 3F). The UI displays a price tag for each item, which signifies that they are objects of commerce. Alternatively, the user may give away for free content that he has created. Commercial actions are straightforward and intuitive: if the user selects an item with a price tag, the user's electronic purse is charged that amount. One of the attributes of a node may be price.

FIG. 3G illustrates an exemplary action where the user has selected the category "Instructions" and paid 2 Euros for them. Using the purchased pasta cooking instruction illustrates how the present invention is used for learning. The user may also obtain an item of information in linear form, instead of a map form, by means of an automatic conversion, as illustrated in FIG. 3H. The linear form can be automatically converted to map form, shown in FIG. 3I.

The next step of the exemplary embodiment of the instruction requires a pasta machine. Assuming the user does not have one, the user may learn where to get one. To learn, he selects that item, and obtains information regarding pasta machine vendors, tests, reviews and/or the like, as shown in FIG. 3J. If the user decides to buy a pasta machine in the example, the user selects the item "Vendors" on the terminal. Three vendors are displayed in map form (FIGS. 3J, 3K), using an association-search across the network. The user may decide to purchase "Pasta De Luxe" by selecting that item, as shown in FIG. 3L. The user may then decide to buy this item, by providing his contact information to the vendor, as shown in FIG. 3M. As is evident, this described process illustrates communication and commerce using a user's terminal, and the interrelation with understanding, organizing and navigating information.

In an alternative embodiment, shown in FIG. 3N, two users might create new content collaboratively. The resulting map 200 could then be shared for free with other users or made an object of commerce that is co-owned by the two users. The "Mapper" supports such collaboration by allowing the map 200 of the user to be displayed simultaneously with the map 200 of another user, which is achieved by splitting the display area in two by a line. A modification of such collaboration may be that the foreign map on a display is common to a group of users. In such group collaboration, each user sees his own map simultaneously with the common map, with the display split in two by a line. In one embodiment, in the latter kind of group collaboration, the user's own map is at a corner of the display, in a window which may be opened and closed according to need. Moreover, if the collaboration uses an application, then the session is shared among the collaborators.

According to the invention, each node in a map may include an attribute that can alternatively be set to Private or Public to enable the user in preventing others from navigating his private maps. In another embodiment, the attribute can also be set to Custom, which means that the user may enumerate a list of users that may access that node and others may not.

Learning by means of UIs constructed by the "Mapper" offers many benefits to the user. Navigating maps that have been constructed according to associations of concepts is an efficient method of learning, as is also creating maps to represent, understand, summarize or organize information alone or in co-operation with others.

In addition to these general functionalities offered by the "Mapper", learning by the present invention may be accomplished in many ways, as illustrated by the following examples. In one embodiment, the combination of navigation, learning and understanding takes place. Here, learning may occur by a quiz game. Given a map 200, one must connect one of the alternative surrounding nodes to the main node by an edge. That relationship represents the user's answer to the quiz. If the answer is correct, the user is provided further information.

In another embodiment, the same cross-functionality of the UI provides a game for small children to teach Finnish language. Given a letter of the alphabet, the game prompts the user to connect Finnish words that begin with that letter to pictures that have the same meaning as the words.

In one embodiment, the cross-functionality of organizing and communicating information in a mobile situation may be illustrated with the following example, as depicted in FIG. 3O. The user may organize his personal profile information and use it in his social life management, such as in using his UI for help with dating. A particular function here might be to find people in the vicinity whose profile matches the user's with respect to certain criteria. This functionality uses the mobility of the apparatus to match the user with other terminal users in the same area at the same time. In one embodiment, a terminal with GPS service may be required.

In the above example, assume that two matching persons are found within a predetermined radius. Their users' profiles match each other in terms of interests, hobbies and/or the like, and they have also given their profiles out for search. Then, the users receive photographs and profiles of the other user, and then send out a message to the other, proposing meeting.

In the embodiment where the system is implemented as a peer-to-peer system, a peer-to-peer form of map transfer takes place during the profile matching functionality. For example, the profile of a second user, one of the matching users found in the specified radius, is sent to the user's terminal and linked to the node in his map containing profiles of friends. Symmetrically, the user's personal profile is sent to the second user and linked to the "Friends" node of her map.

FIG. 3P illustrates the functionality involved in the user's finding a pasta recipe. The user has navigated from his main map "My Life" via the path of "Hobbies" and "Cooking" to "Pasta". His maps reside in his master device. Then, the user searches for instructions across a network. The one found in another user's (labeled "John") map is accessed by transferring it from the other user's master device to the first user's master device and linking it to the Pasta node of the first user's map. This is also a digital commerce transaction, whereby the first user's purse is charged 2 Euros.

Another exemplary manner for navigating is by using search engines to find associations between pairs of nodes, or to find single nodes. The user may select a node pair and submit a search request across the network for node pairs of the same name that are associated. A search may also be carried out for a single node, a relationship, or any number of their attributes.

The user may also specify an automatic search agent operating continuously as a background process that pushes search results that match his query in real time as they are created by other users anywhere in the network. The apparatus of this invention thus contains a search engine and a push mechanism.

The search for associations allows the user to search for other users' maps with the same association, and allows the possibility of associating ideas using the map-based UI. The name of a node is a keyword that indicates the meaning of the node. Thus, maps are types of semantic networks, and the totality of all users' maps are interlinked via the "mobile universe" (described below) to form a semantic web. The "Mapper" allows searching for associations across this semantic web that match those of the user. Thus, the present invention allows searching of the Internet in a semantic orientation.

It should be noted that the above-discussed exemplary embodiments are mere illustrations of the dynamic nature of the present invention in that the invention allows use in a wide variety of functions.

FIGS. 4A-4G illustrate one exemplary process of the flow by which users may create new nodes and edges on the maps. As noted above, this exemplary flow is an illustration of how the present invention may be used, and should not be considered as limiting the scope thereof.

FIGS. 4A-4B illustrate the process of creating a new node and a new edge in the map 200, in accordance with the present invention. In step 402, the user clicks on a new node symbol on the terminal of the computing device, which in one of exemplary embodiments may be a mobile device. The new node symbol causes the initiation of the process of creating a new node, within the system. Next, at step 404, the user drags the symbol onto an existing node and drops it thereupon. In accordance with the present invention, the dragging and dropping action may be performed using a mouse or any other of the above-mentioned pointing devices.

Next, the flow proceeds to step 406, where a node description form is displayed to the user by the present system. At step 408, the user inputs the node name in accordance with his own personal preferences.

The flow then proceeds to step 410, where the system checks to determine if the node name already exists in its database. If the node name does not already exist, the flow proceeds to step 416 and the user inputs other node characteristics. The process of inputting other node characteristics is described more fully in conjunction with FIG. 4C. On the other hand, if a node name already exists in the system's database, the flow proceeds to step 412. The system asks the user if the new node is the same as the old node, i.e. whether the nodes should be identified. If the user answers affirmatively, the system adds the node pair to its list of identical node pairs in its database, in step 414. Next, the flow proceeds to step 416 and the user inputs other node characteristics. However, if, at step 412, the user answers negatively, the flow proceeds directly to step 416. In this case, the user must also enter a new name for the node. The new node name should not yet exist in the system's database.

From step 416 the flow proceeds to step 418 (FIG. 4B), where the system draws a new node with the name the user provided. Next, at step 420, a new edge is drawn to the new node from the existing node on which the new node symbol was dropped. In other words, in step 420 the system connects the newly drawn node to the older node from which the creation of the new node was initiated.

Finally, the flow proceeds to step 422, where the new node is added to the node list in the system database, and the new edge is added to the edge list in the database as a pair consisting of the source node and the destination node. The new edge is drawn by connecting the source node and the destination node.

FIG. 4C illustrates the subroutine called from step 416 in FIG. 4A to allow the user to input node characteristics. In step 430, the user is allowed to initiate inputting of detailed description for the new node being created. In step 432, the user selects the node type for the node being created. According to the present invention, some of the exemplary node types that can be selected by the user are attachment, action, application, outlined entry, and/or the like. In step 434, the system checks to determine if the user selected the attachment option as his node type. If the user selected attachment as the node type, the flow proceeds to step 436, where the user may input the characteristic information for the attachments. Further details regarding the input characteristics for attachments is provided in conjunction with FIG. 4D and will be described in more detail later.

After step 436, the flow proceeds to 438, where the composition of the selected as well as the input items is displayed to the user on the terminal. Referring back to step 434, if, however, the system determines that the user did not make the attachment selection, the flow proceeds to step 440, where the system checks to determine if the user selected the action option as the node type. If the user selected action as the node type, the flow proceeds to step 442 where the user may input characteristic information for actions that may be performed using the node. Actions are macros, i.e., sequences of steps of any kind performed with the "Mapper". Actions are defined by recording such a sequence. In another embodiment, the process of inputting characteristics for actions is described in more detail with conjunction to FIG. 4E.

Returning back to step 440, if the system determines that the user did not select action as the node type, the flow proceeds to step 444. At step 444, the system checks to determine if the user selected the application option as the node type. If the user selected the application option, the flow proceeds to step 446, where the user may select the application that is to be associated with the node. In one embodiment, the user may select the application by looking through a predetermined list of applications that are supported by the present invention. FIG. 4G will provide more details regarding the selection of an application by the user.

Returning back to step 444, if the system determines that the user did not choose application as the node type, the flow proceeds to step 448 where the system checks to determine if the outlined entry option was selected as the node type. If the outlined entry option was selected as the node type, the flow proceeds to step 450, where the user may input characteristic information for outlined entries, which is described in more detail in conjunction with FIG. 4F. If the system determines that the user did not select outlined entry as his option, the flow proceeds to step 438 from 448.

FIG. 4D illustrates the process of inputting characteristics for attachments that were initially mentioned in step 436. In step 452, the user may select the attachment type. According to one embodiment, the selection may be made from a selection map that is provided to the user. The attachment types that may be provided include pictures, files, videos, sounds, notes, and/or the like, in accordance with the present invention. Once the user has made his/her selection of the attachment type, the flow proceeds to step 454 where the user is allowed to select the attachment content from the system database. In one embodiment, the selection may be made by utilizing a scrollable selection map. Next, at step 456, the system symbolizes the node that is being created by an attachment symbol that indicates the type of the attached file (e.g. Word document, picture, video, map).

FIG. 4E details the steps involved in inputting the characteristics for actions, where actions is the node type that was selected in step 432. FIG. 4E is called from step 442 in FIG. 4C. At step 460, the user selects the action type, which may be displayed from a selection map displayed on the terminal. In accordance with the present invention, there may be several different action types, such as "call", "print", "locate", "collaborate", "text chat", "message", and/or the like.

Next, the flow proceeds to step 462, where the system checks to determine if the action type is call. If the action type is call, the flow proceeds to step 464 where the user selects the call type, which may be displayed as a selection list. The call types may be "individual", "conference", "chained" and/or the like.

Next, the flow proceeds to step 466 where the system checks to determine if the call type is conference. If the call type is conference, the flow proceeds to step 468 where the user selects another participant from the user's contact database. Once the user has selected one or more participants from the user database, the flow proceeds to step 470, from where the control is returned to the step that called the subroutine depicted in FIG. 4E.

At step 466, if the call type was determined to not be conference, the flow proceeds to step 467 and the system initiates procedures for other call types, in accordance with the present invention, and proceeds to step 470.

Returning back to step 462, if the system determines that the action type selected by the user was not call, the flow proceeds to step 472.

At step 472, the system checks to see if the chosen action type is "collaborate". If the chosen action type is collaborate, the flow proceeds to step 474, where the user is allowed to select one or more participants for collaboration. The participants are chosen from the user's contact database that is located in the present system. Upon selection of the participants, the flow proceeds to step 470. If, at step 472, the action type is determined to not be collaborate, the flow proceeds to step 476, where the system initiates procedures for other action types that are supported by and within the scope of the present invention, and then the flow proceeds to step 470.

FIG. 4F illustrates the process of inputting characteristics for outlined entries, which called from step 450 of FIG. 4C. At step 480, the user may select the outlined entry type from a predetermined selection, in one embodiment. The outlined entry may be "Contact", "Recipe", "Time", "Location", and "Message". Once the user has selected the appropriate outlined entry, the flow proceeds to step 482, where the system checks to determine if the outlined entry type is time. If the outlined entry type is not time, the flow proceeds to step 484, where the user inputs characteristics for other outlined entry types and then the flow proceeds to step 489, from where the control is returned to the step that called the subroutine depicted in FIG. 4F.

However, if, at step 482, the outlined entry type is determined to be time, the flow proceeds to step 486 where the user is allowed to input the time entry using a predetermined user interface on the terminal. According to one of the embodiments, the time entry user interface is a calendar display.

Next, the flow proceeds to step 488, where the system associates the input time in the calendar implicitly to the node being created. Finally, the flow proceeds to step 489.

FIG. 4G depicts the subroutine for selecting an application by a user, which was initially called in step 446 of FIG. 4C. At step 490, the terminal displays the first predetermined number of alternatives for selection as nodes around a central node, which represents the node that is to be selected. The flow proceeds to step 492, where the system checks to determine if the left finger was selected. If the left finger was selected, the flow proceeds to step 494 where the system replaces the content of the top-most node in the map 200 by the first item from the system database that has not yet been displayed on the terminal. At step 496, the nodes are rotated one position in the counter-clockwise direction and the flow proceeds to step 498, where the system checks to determine if any nodes were selected. If at least one node was selected, the flow proceeds to step 500 and the selection is considered complete.

On the other hand, at step 498, if no nodes were selected, the flow returns back to step 492.

Returning back to step 492, if the system determines that the left finger was not selected, the flow proceeds to step 502 and the system checks to determine if the right finger was selected. If the user did not select the right finger, the flow proceeds to step 498. On the other hand, if the user selected the right finger, the flow proceeds to step 504 where the content of the top-most node in the map is replaced by the last item from the database that has not yet been displayed.

Next, in step 506, the nodes are rotated one position clockwise and the flow proceeds to step 498, which was described above. On the other hand, if no nodes were selected, the process returns back to step 492 and the entire process is repeated again.

In accordance with one embodiment, FIGS. 5A-5G are screenshots depicting the customization of the UI by the user to conform the UI to his/her personal preferences.

As described above, the user customizes his UI as a side effect of organizing his information. The user may also customize his UI by choosing a background picture, a background sound, and the manner in which the maps are displayed (i.e., how the individuals 210, categories 220 and relationships 230 look). Another opportunity for customization is based on cognitive or personality style, such as if a user has a particular learning style, he can obtain backgrounds that suit that style from other users or service providers. Specific background pictures and sounds may also be associated with a particular function of the UI. Thus, for instance, learning might be associated with classical music and cooking with salsa music.

Figure 5A:
FIGS. 5A-5G are screenshots illustrating one embodiment of customization of the UI by the user to conform the UI to his/her personal preferences.
Figure 5B:
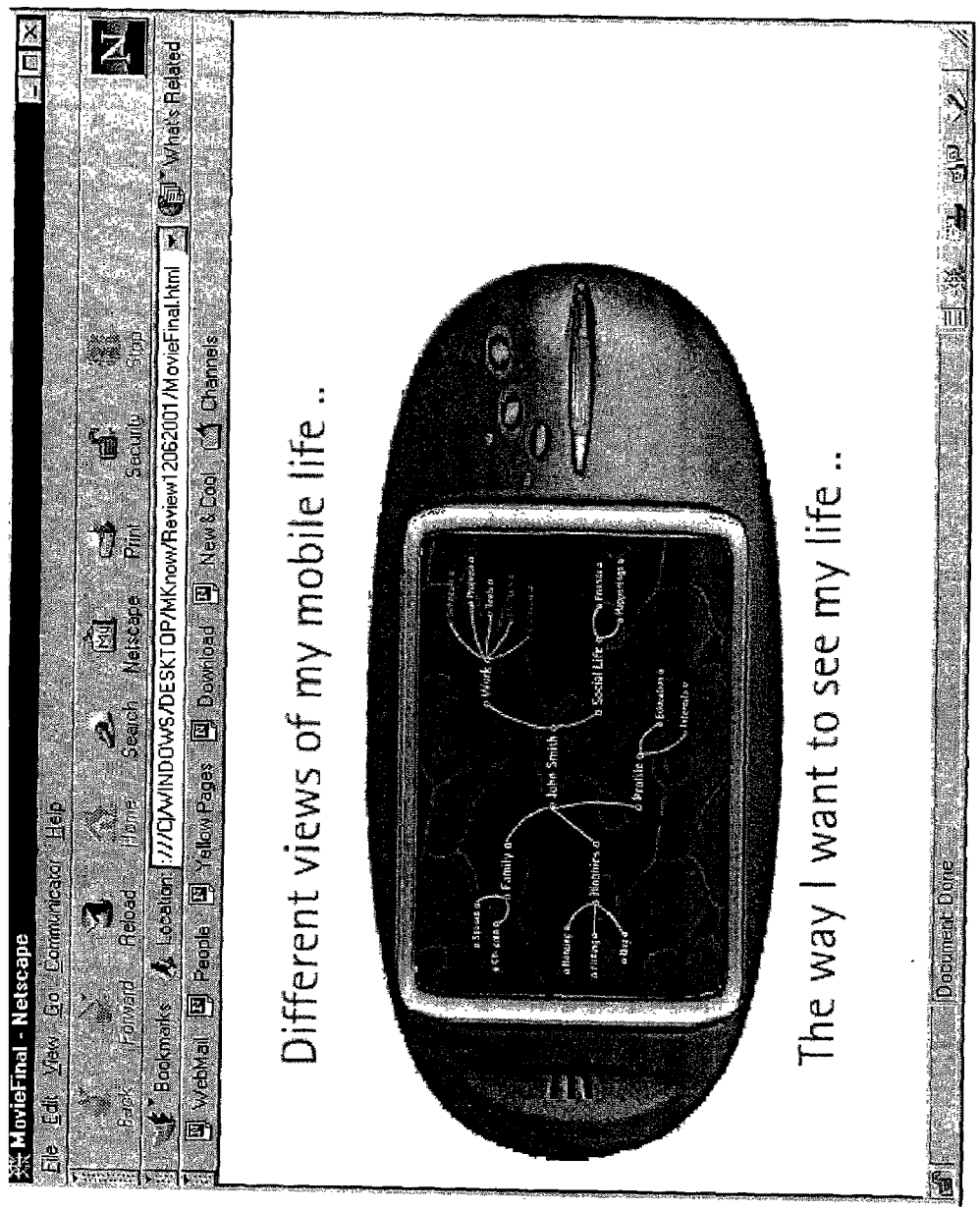
Figure 5C:
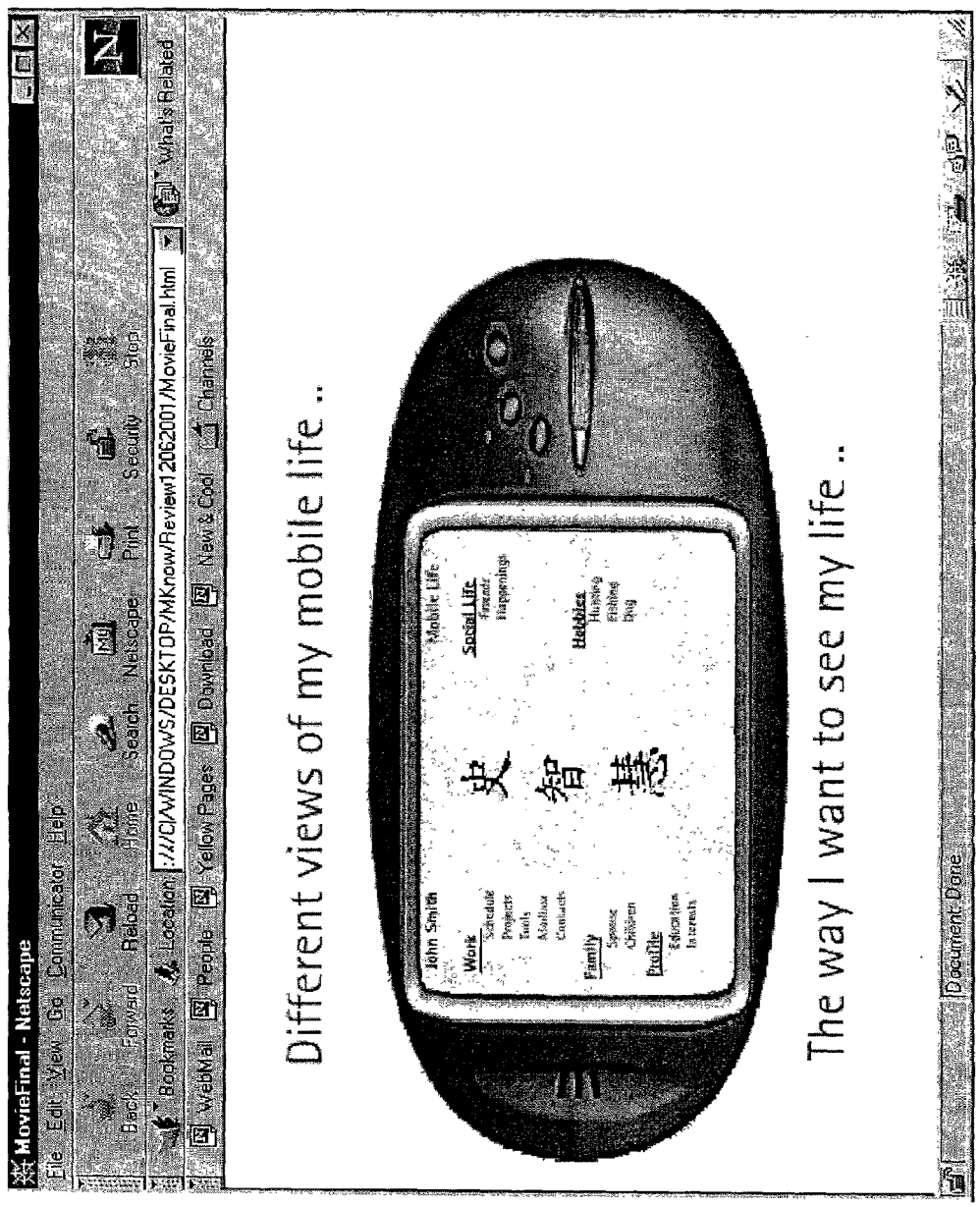

FIGS. 5A-5C illustrate the variation of background pictures and the visual representations of individuals 210, categories 220, and relationships 230. FIGS. 5A-5C each displays the same information, even though the displays are in different forms. In particular, each figure has a different background picture. FIG. 5A displays individuals 210 and categories 220 by ovals, whereas FIG. 5B displays them by plain text that is pre-fixed and post-fixed by a dot symbol.

It should be noted that the scope of the present invention is not limited by the manner in which the information is displayed on the terminal, and various display styles may be used within the scope of the present invention. FIG. 5A displays relationships by straight lines, whereas FIG. 5B displays them by curved lines. Further, FIGS. 5A-5B display the map graphically: the main node is in the center and the immediately related nodes surround the main node. On the other hand, FIG. 5C displays the same information in outline form, with the main node in the upper left corner. This display form could also be displayed on a XHTML (or WAP) mobile phone without a graphical display, as opposed to those shown in FIGS. 5A-5B which require a terminal with a graphical display.

As noted above, these forms have automatic conversions therebetween, so the user may select the preferred form, provided the terminal being used supports it.

Figure 5D:
Figure 5E:
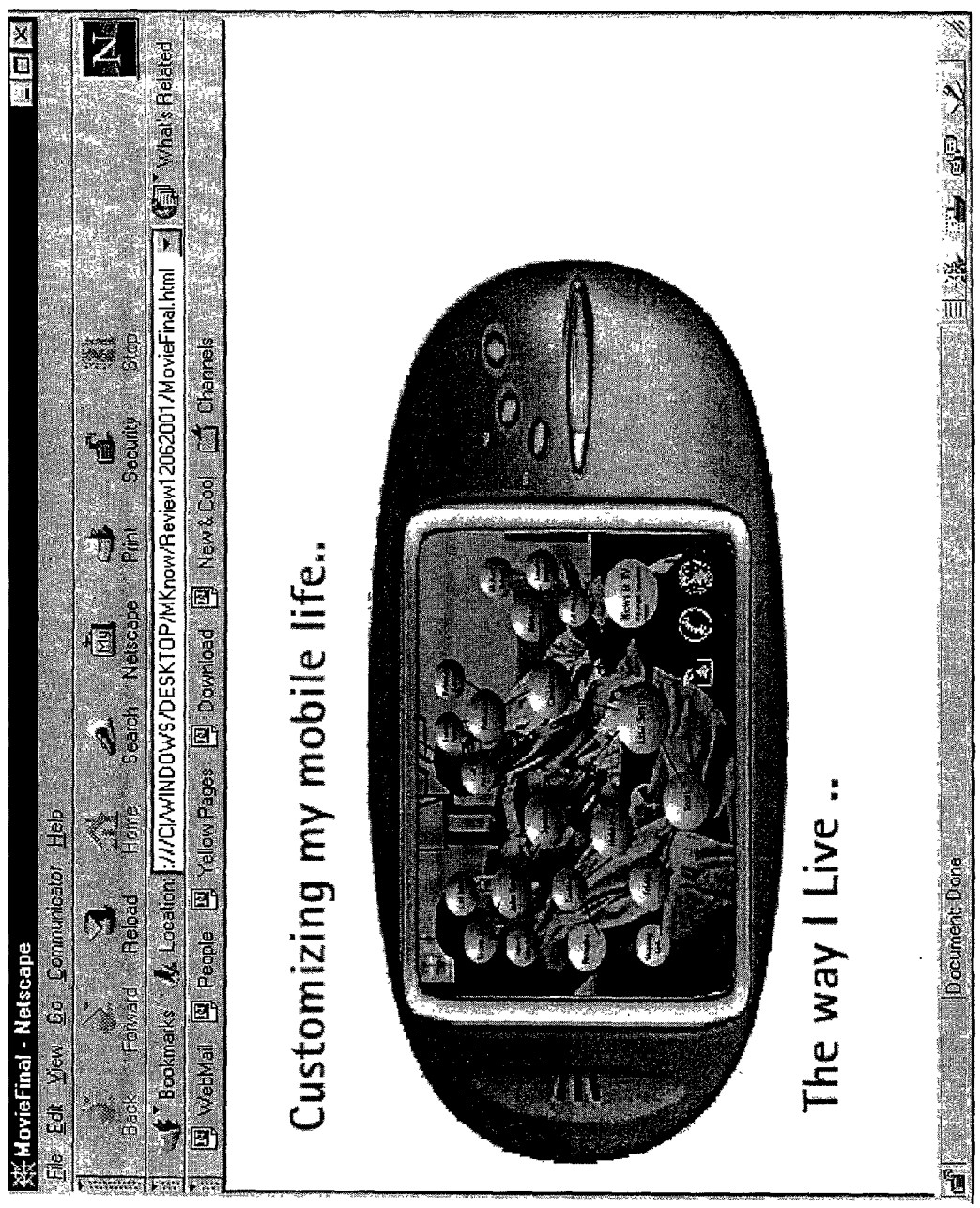
Figure 5F:
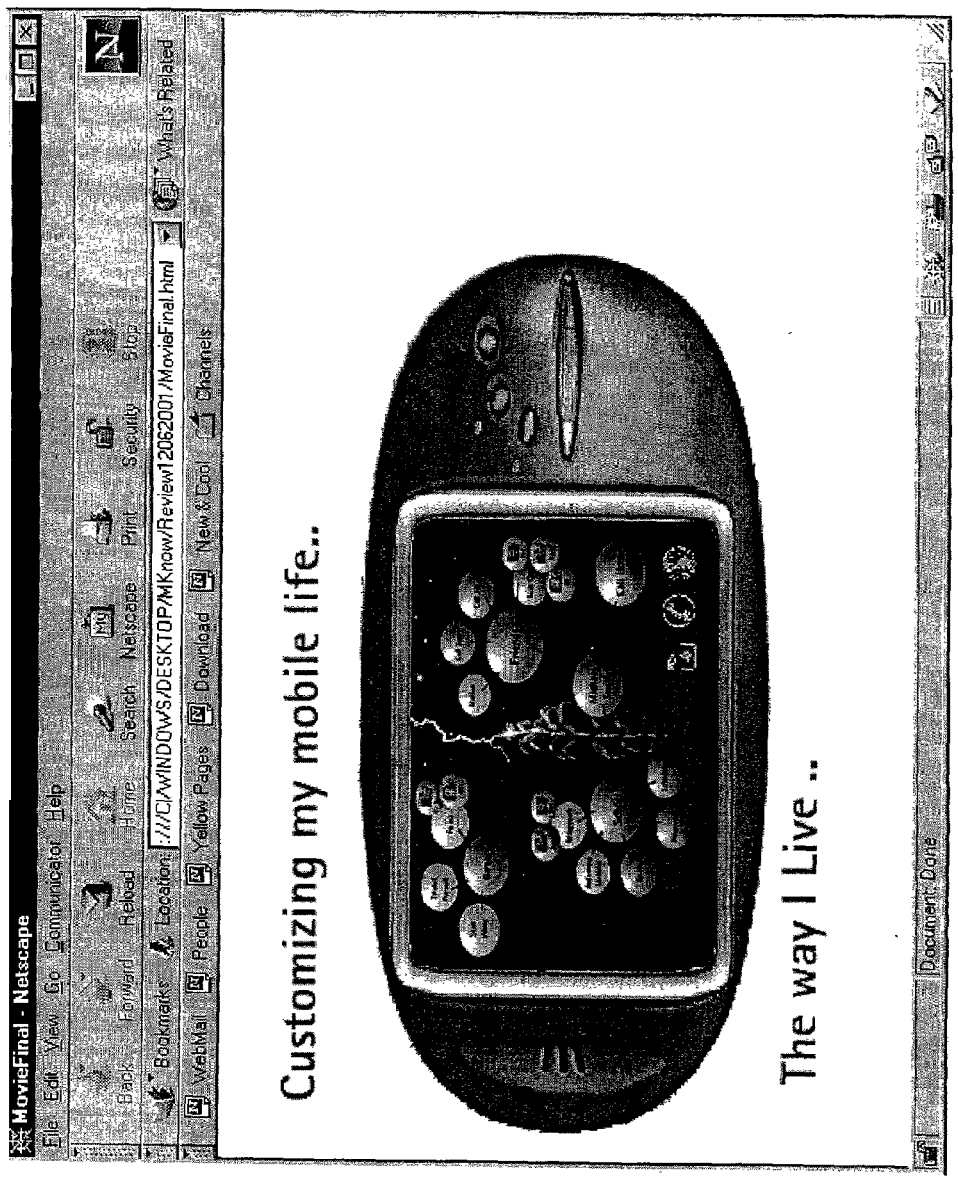

FIGS. 5D-5F illustrate the example of customization in the case of three members of a family: John Smith, Lisa Smith and Michael Smith. Each of the members uses a different background, and each has customized his/her own UI according to his/her preferences, and according to his/her social life, hobbies, profile, work, school and/or the like.

Figure 5G:

The user may customize his own UI from scratch, constructing it node by node. Alternatively, the user may purchase an UI from a service provider (as shown in FIG. 5G), or get the UI from some other user or community. A UI obtained from an external source can be used as such, or again the user may further customize it. Thus, any extent of customization is possible, depending on the needs, capabilities and preferences of the user.

A UI constructed by the "Mapper" is relative to a context. The context may contain attributes such as time, location, and role (e.g. work, private, study). One may even relate a map to the user's mood, by using, in one example, a dark background in the event of a bad mood or a light one in the event of good mood.

As just noted, the user may choose to relate the importance of nodes in a map to temporal cycles, such as time in a day, week, month, or year, and use this rhythm to contextually customize his UI. Thus, for example, information regarding family and hobbies might be deemed as more important in the evening, while work- or study-related information would have more significance during the day time. Family- and hobby-related nodes are then displayed with emphasis on a map in the evening, and work- and study-related nodes in the daytime. Similar customization can be done with respect to season or time of year. For instance, skiing-related information may be more relevant in the winter and swimming-related matters in the summer. Such customizations are implemented by positioning nodes on an ellipse that the UI automatically rotates as time passes, or by emphasis by means of e.g. color or size.

Customization relative to location may be done by making use of Global Positioning System (GPS), Wireless Local Area Network (WLAN) or Bluetooth. Work-related nodes (including application programs) may be displayed with emphasis in a map when the user is at his office, and family-related matters at home.

The user can manually select a role, such as work, study, or private, that is irrespective of time and location, because the role may not always be automatically determined from time and location, and roles may intermingle.

To help the user in selecting the information he wants to inspect at a particular moment, distinct visual symbols and sounds may be associated with classes of pushed information. Thus, arriving electronic mails might have a different symbol or animation or sound than arriving map requests. Additionally, electronic mails from family members can be further associated with different attributes than electronic mails from colleagues at work.

To help the user in creating maps more conveniently and swiftly, the "Mapper" provides pre-initialized maps. They may, for example, have certain attributes that are fixed, such as background, sound and/or the like. Such pre-initialized maps may be copyrighted, given away for free or sold to other users via a mobile network.

Figure 6A:
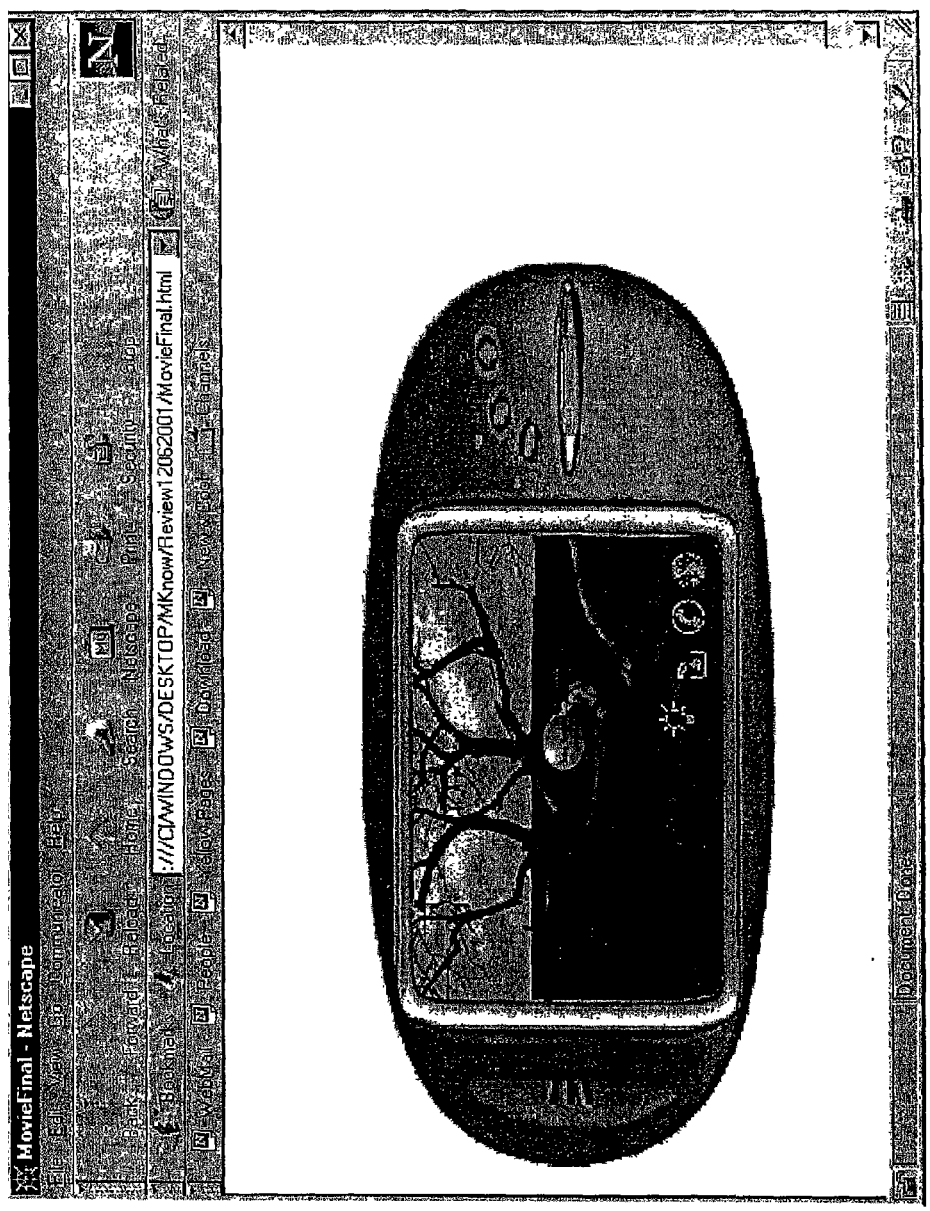
FIGS. 6A-6AE are screenshots illustrating one embodiment of the functions that may be performed on the disclosed maps.

FIGS. 6A-6AE are screen shots that illustrate one exemplary embodiment of the functions that may be performed on the created maps, in accordance with the present invention.

A new map always contains a main node to start the construction process. FIG. 6A displays a new map, whose main node has already been named by the user John Smith after himself. The lower right corner of the display contains four symbols. From left to right, they are for "Creating a new node", "Deleting a node", "Calling", and "Navigating". The first two (i.e., "Creating a new node" and "Deleting a node") are fixed items, and the last two (i.e., "Calling" and "Navigating") are examples of user-selectable items.

It should be noted that if the node is the root node of a submap, then deleting a node also causes the submap to be deleted. In the disclosed example, the user has clicked the new node symbol with a pointing device and started dragging the new node symbol towards the main node (with his own name) in order to create a new node.

Figure 6B:
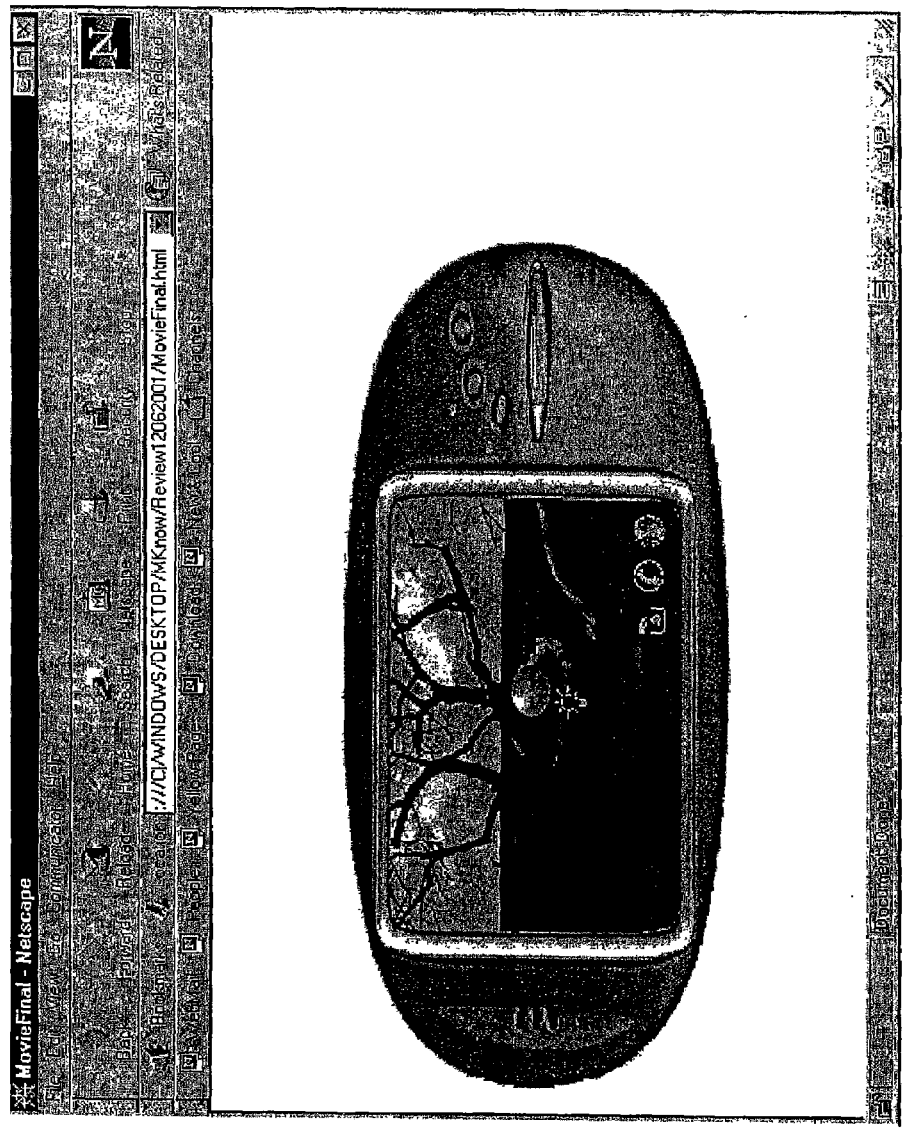

FIG. 6B displays the subsequent position of the new node symbol, where the dragging causes the new node symbol to be on top of the destination node. Here, the user releases it with the pointing device.

Figure 6C:
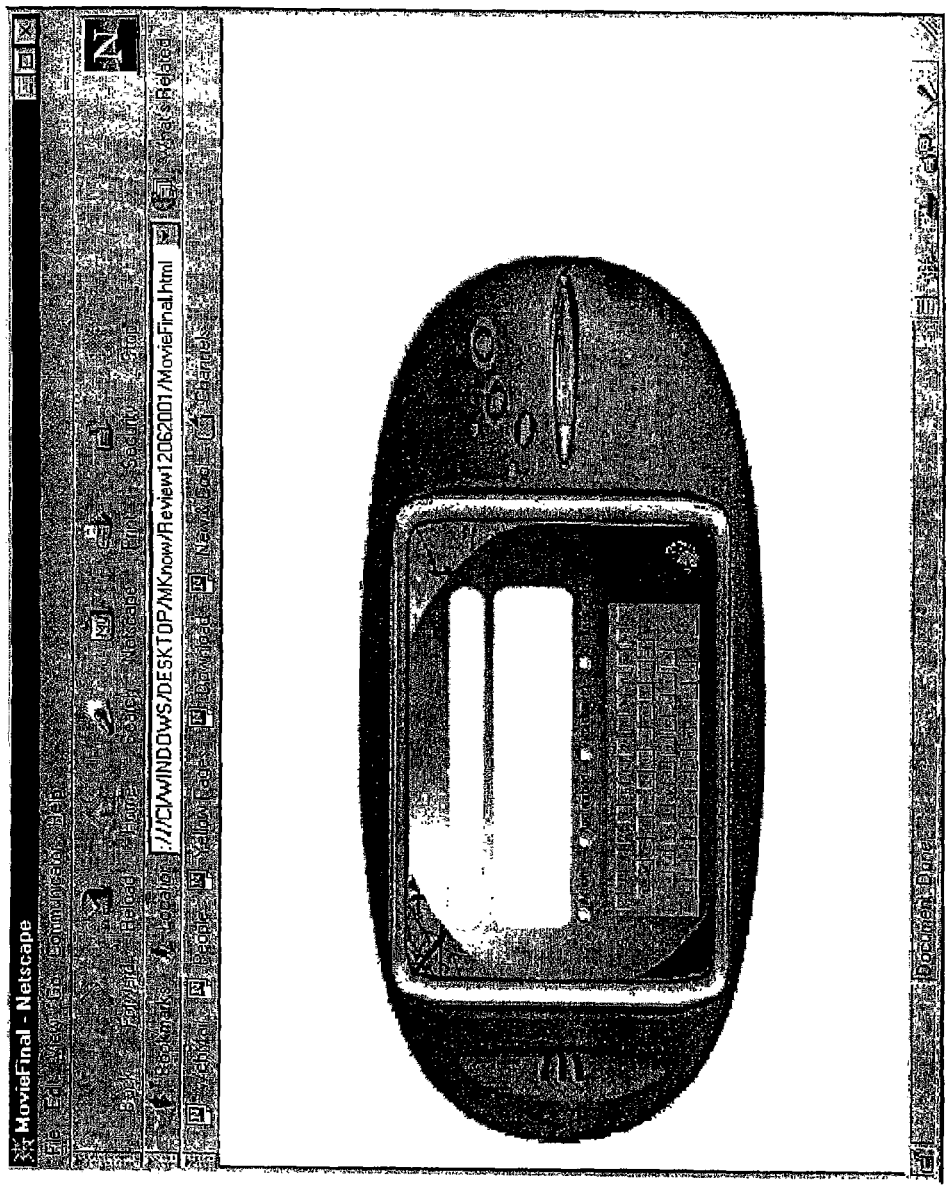

The "Mapper" now displays a form, as shown in FIG. 6C, from top to bottom with a field for the new node's name; a field for describing the node by a more detailed note; check boxes for selecting the type of node, namely Action, Application, Attachment or Outlined entry. If no selection is made, the node is considered a plain Note. A virtual keyboard for typing may also be part of the form. If the terminal type has a physical keyboard, the virtual keyboard may not be displayed.

Figure 6D:
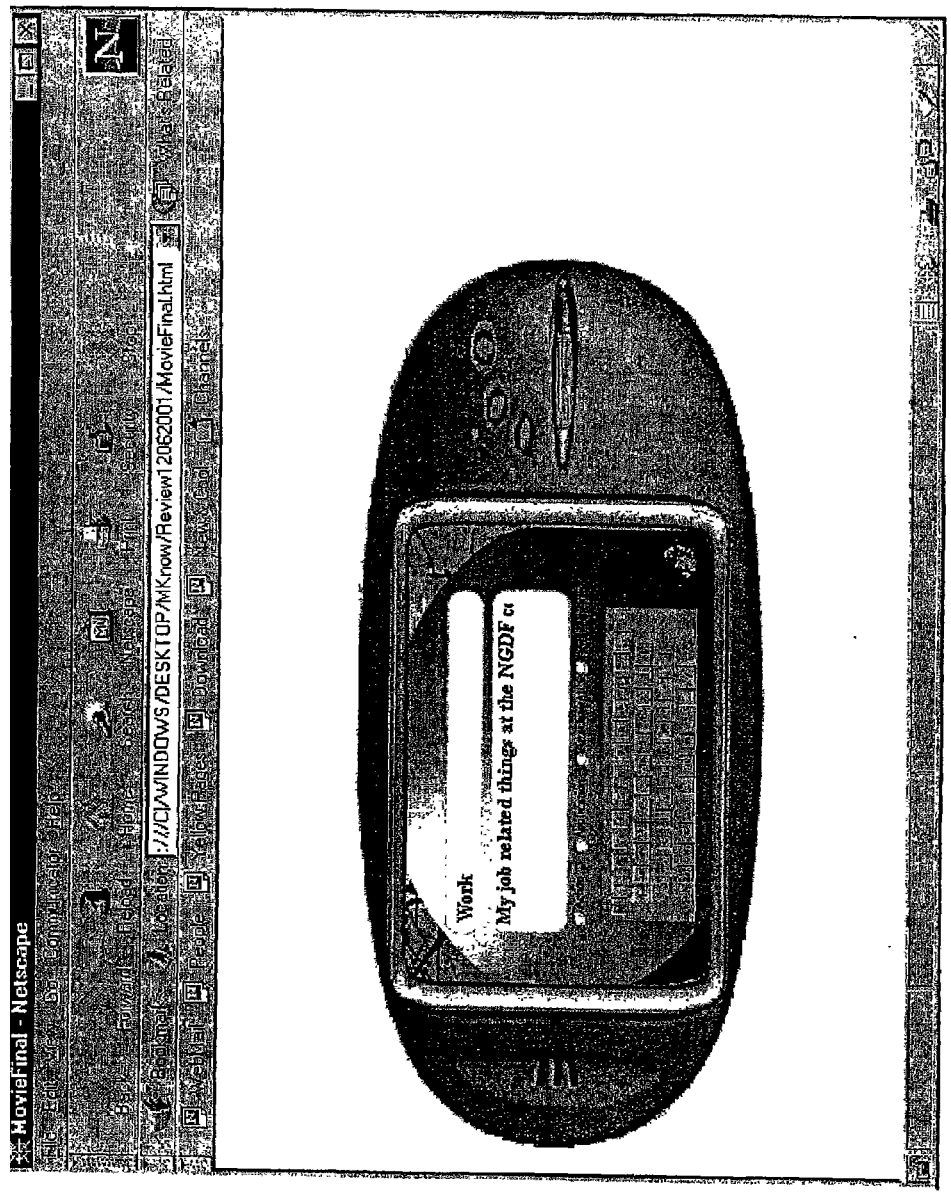

FIG. 6D displays the example where the user has completed the form. The user has given the new node the name "Work", and described the node in more detail as "My job related things at the NGDF c . . . ". As he has not checked boxes for selecting the type of node, the node is a Note.

Figure 6E:
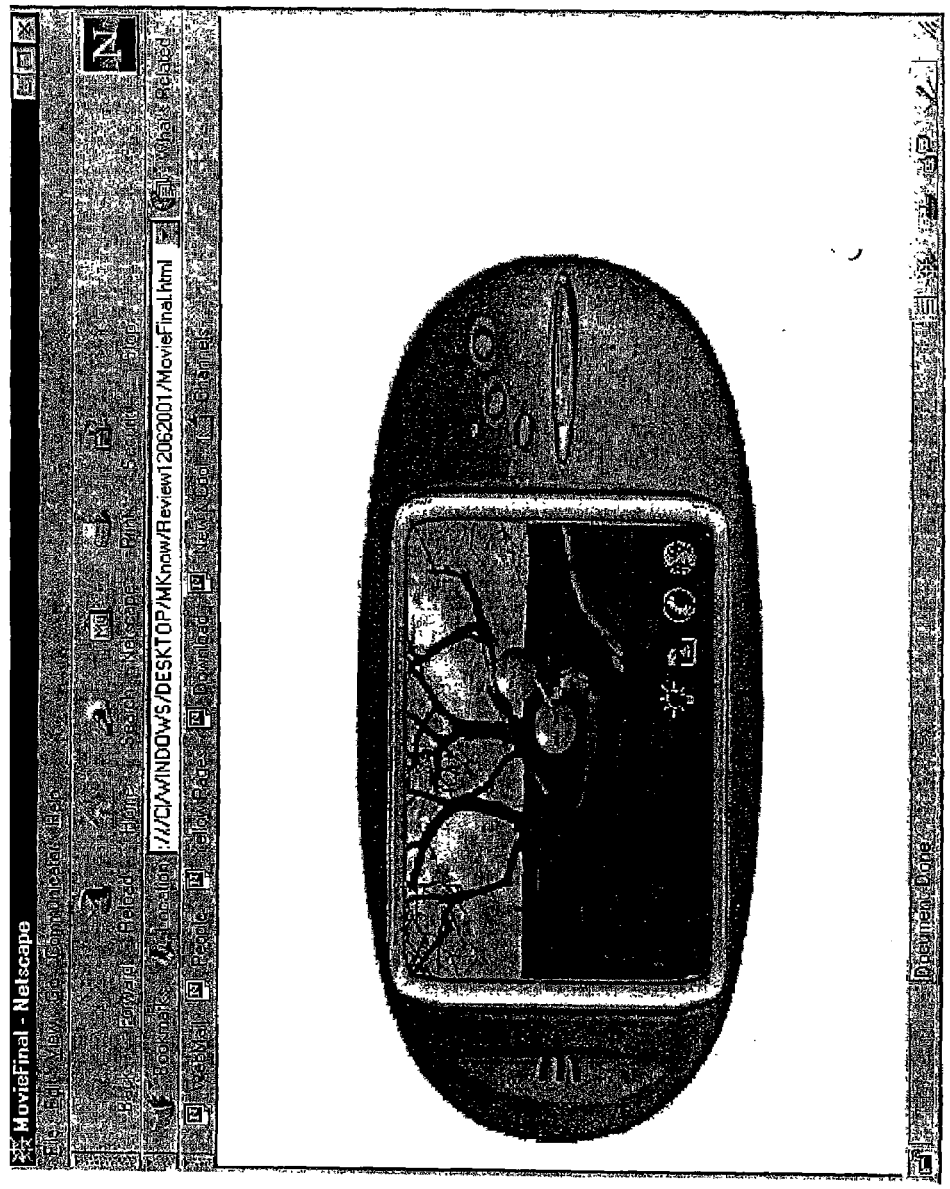

FIG. 6E displays the result. The new node "Work" has been associated to the main node "John Smith".

Figure 6F:
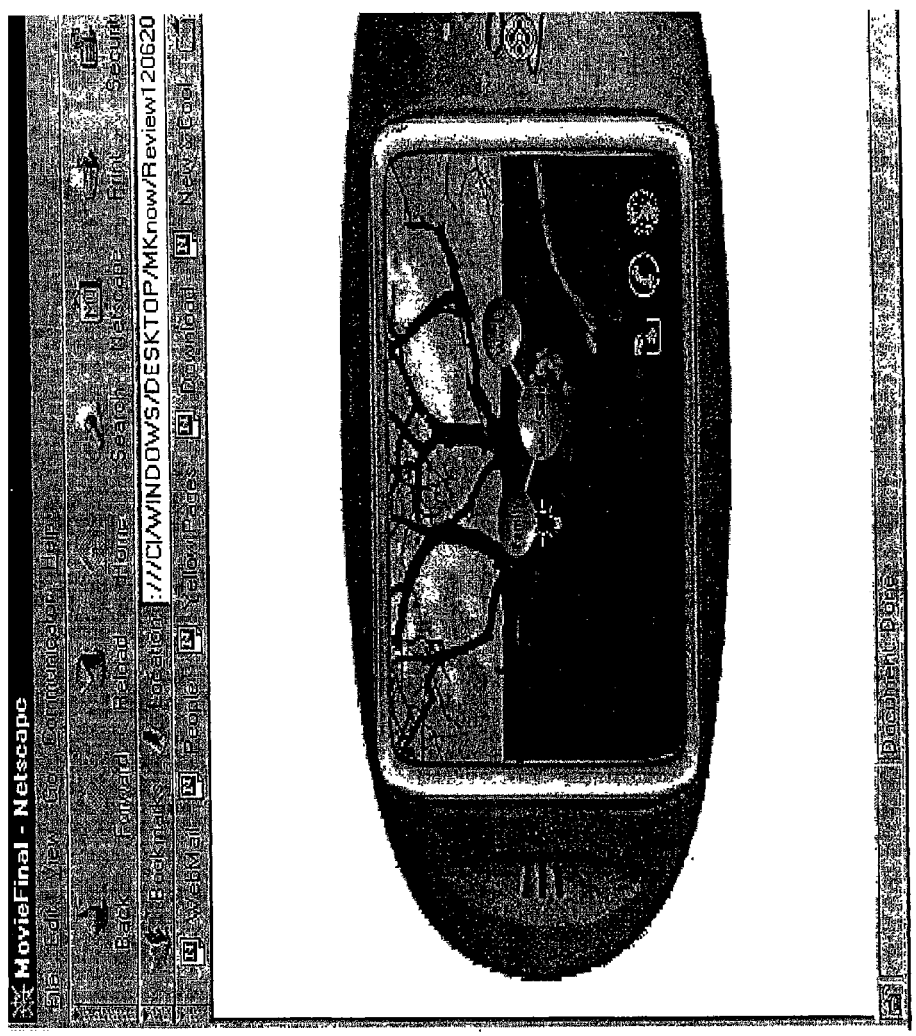

FIG. 6F displays the situation where the user is creating a new node (by the procedure just described), related to the node "Family" that he created after the node "Work". The node "Family" is a child of the main node "John Smith". The user now drags the new node symbol and drops it on the "Family" node. The user decides to construct an attachment node.

Figure 6G:
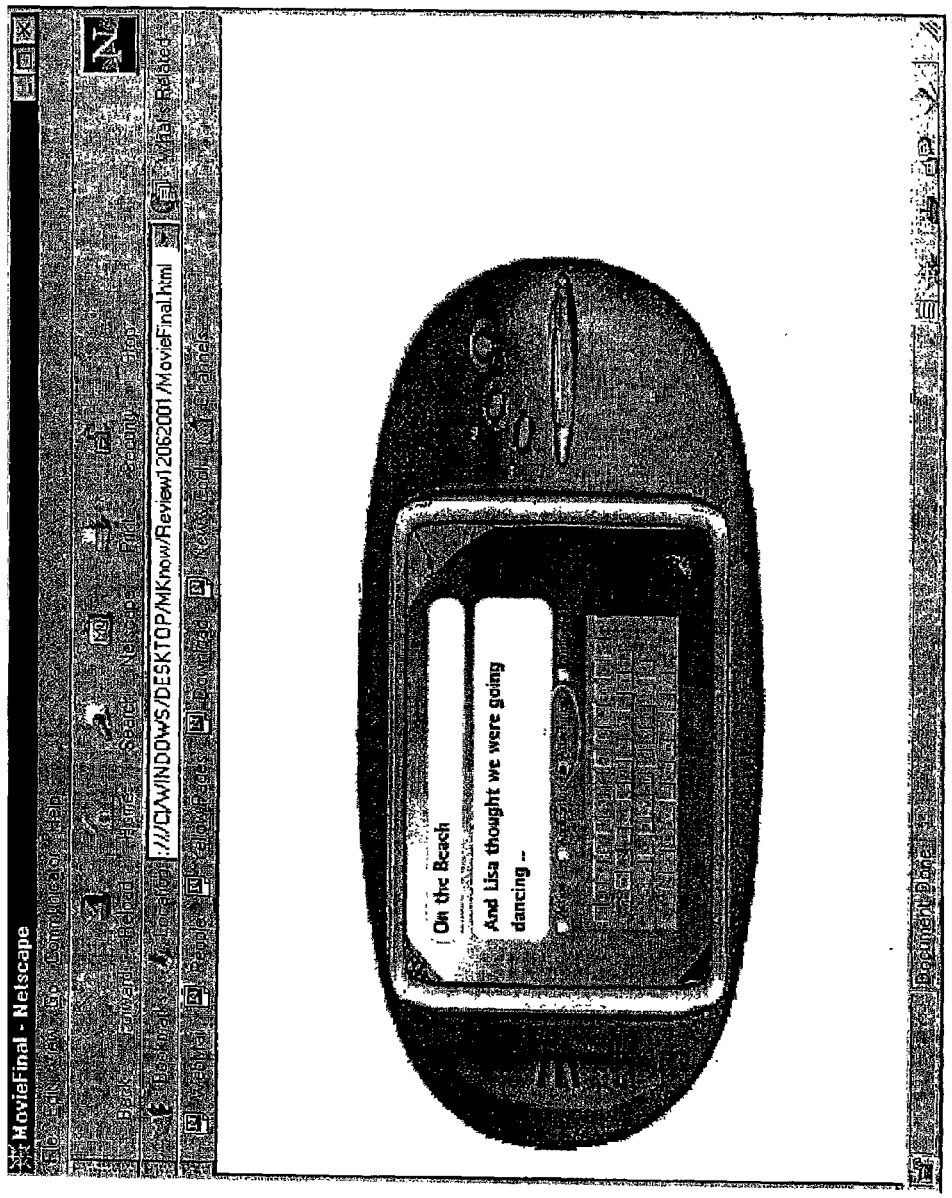
Figure 6H:
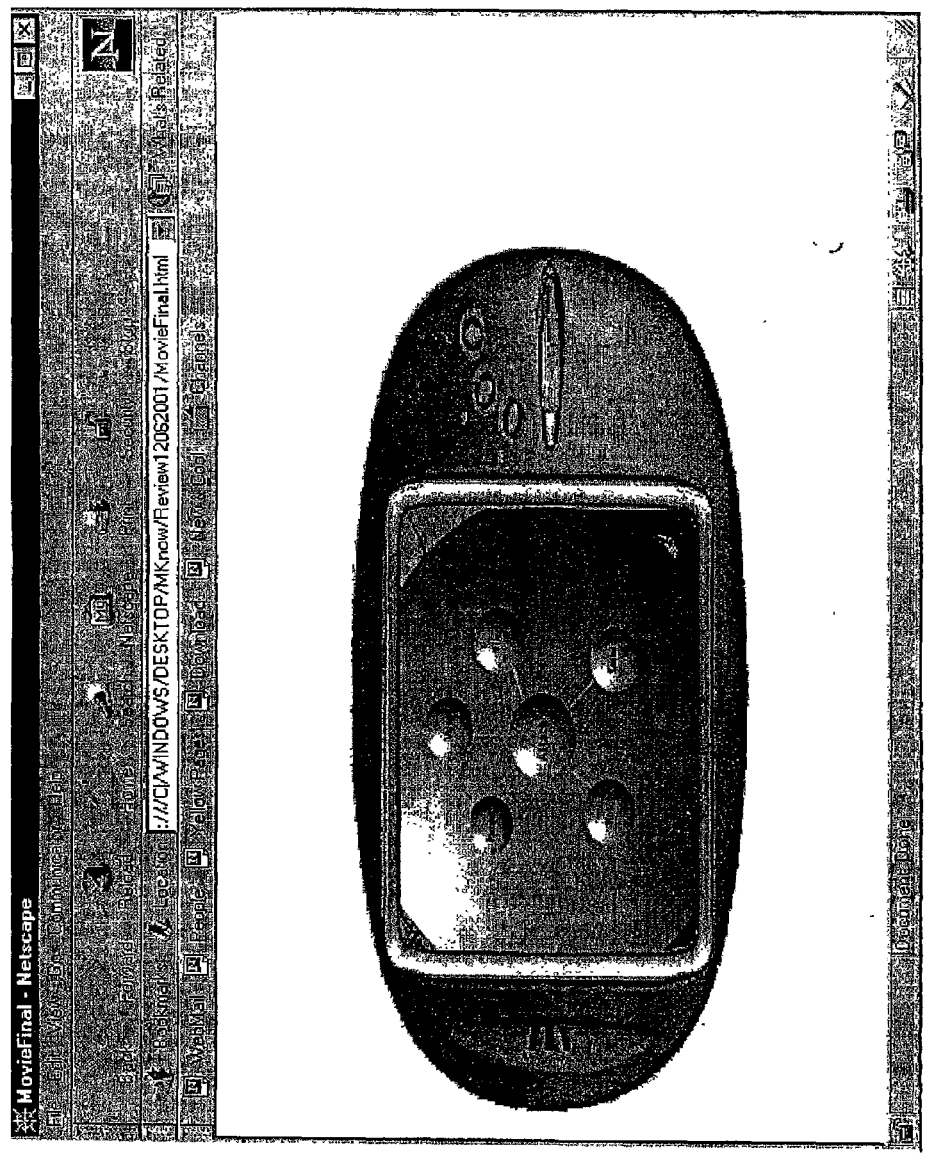

An attachment node is constructed as follows when the user checks the "Attachment" box in the form for entering the new node (FIG. 6G). In this example, the user also names the new node as "On the beach" and describes it in more detail as "And Lisa thought we were going dancing . . . ". FIG. 6H shows the selection of an attachment type by a user.

Figure 6I:
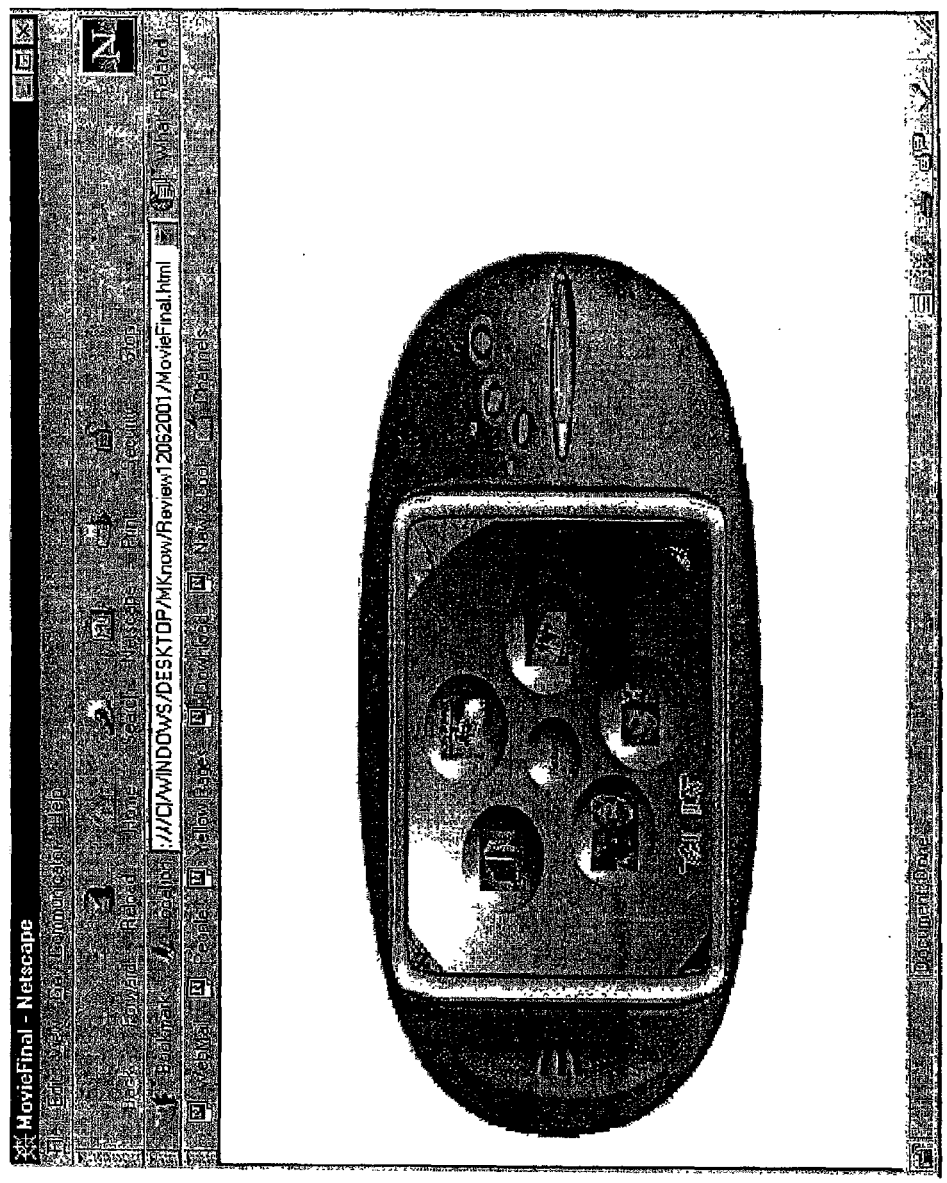

In one embodiment, the user's database contains pictures. As a result, the "Mapper" displays a selection of pictures in the user's database, in FIG. 6I. The user may rotate these pictures forwards and/or backwards by means of the two "pointing finger" symbols at the bottom of the screen. At each rotational step, a picture is replaced by a new one from the database (if possible), so that the user can scroll through his entire collection of pictures. The user makes selections by clicking a picture with a pointing device.

Figure 6J:
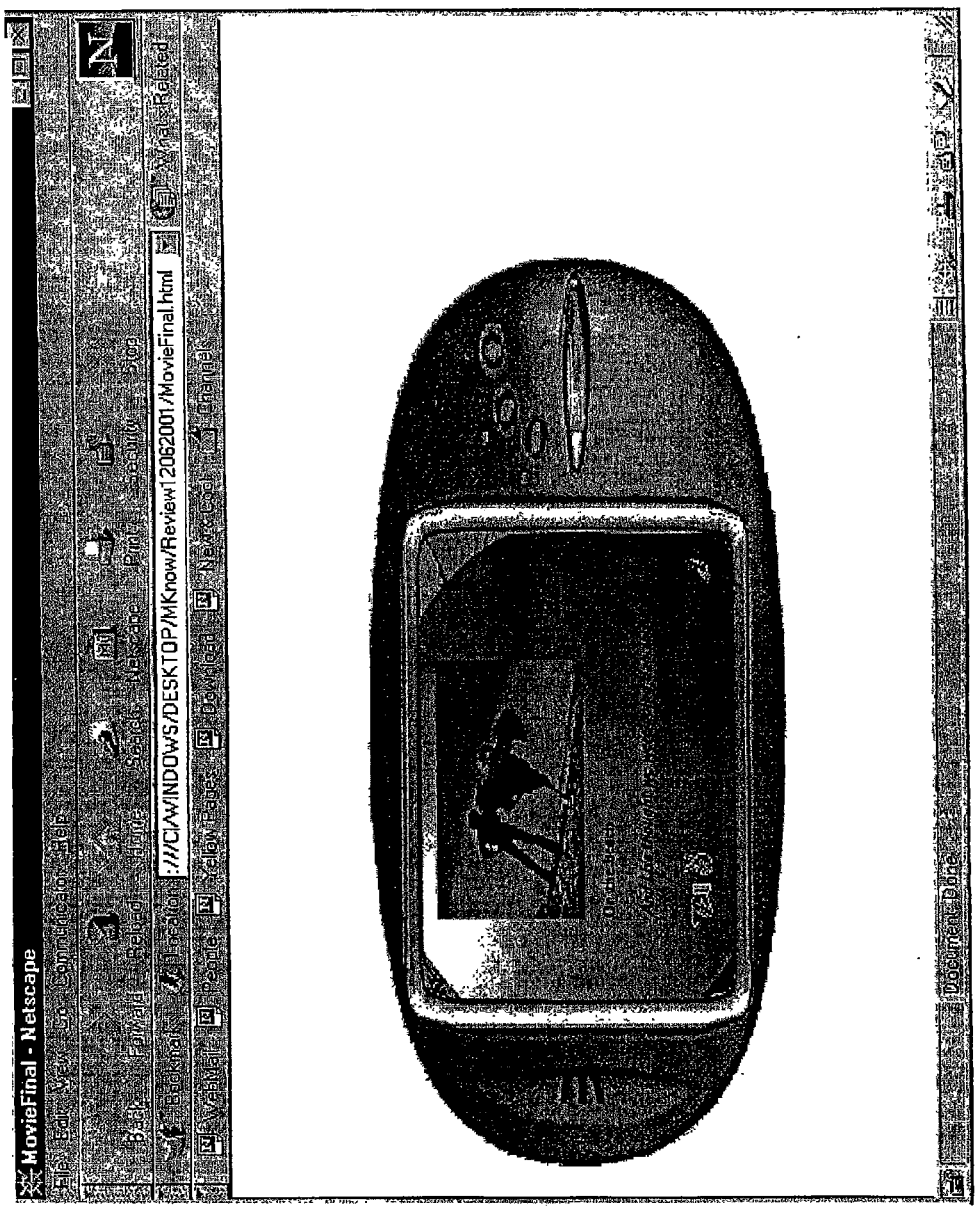

FIG. 6J displays the result of selecting a picture. The result includes the composition of the selected picture, the name of the node and a more detailed description. At the bottom of the screen, there are symbols for returning to the previous screen to undo the picture selection (i.e., finger pointing to the left), and for accepting the selected choice (i.e., fingers in OK position).

Figure 6K:
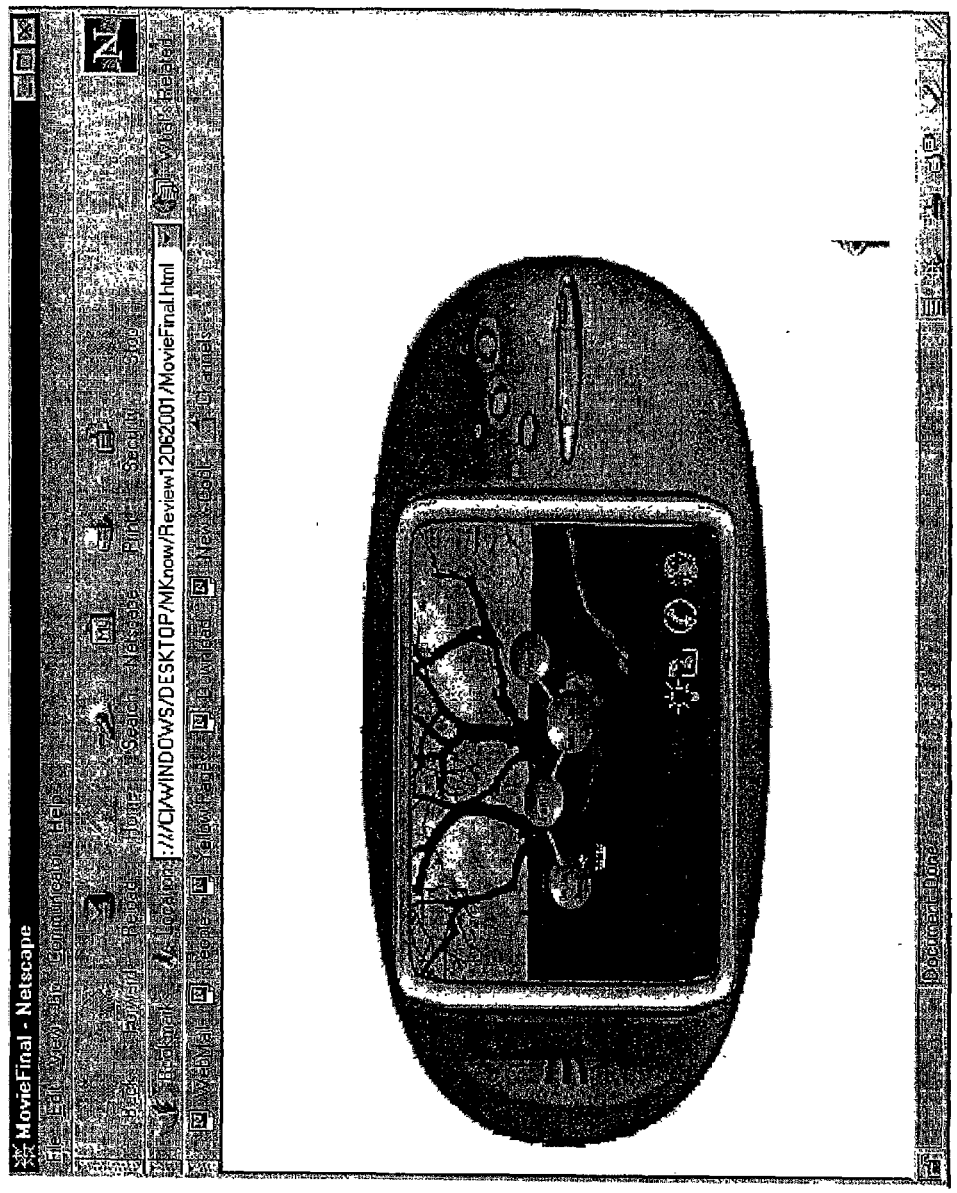

FIG. 6K shows the resulting new node "On the beach" with a symbol that indicates the type of the attached file, i.e. picture in this case.

Figure 6L:
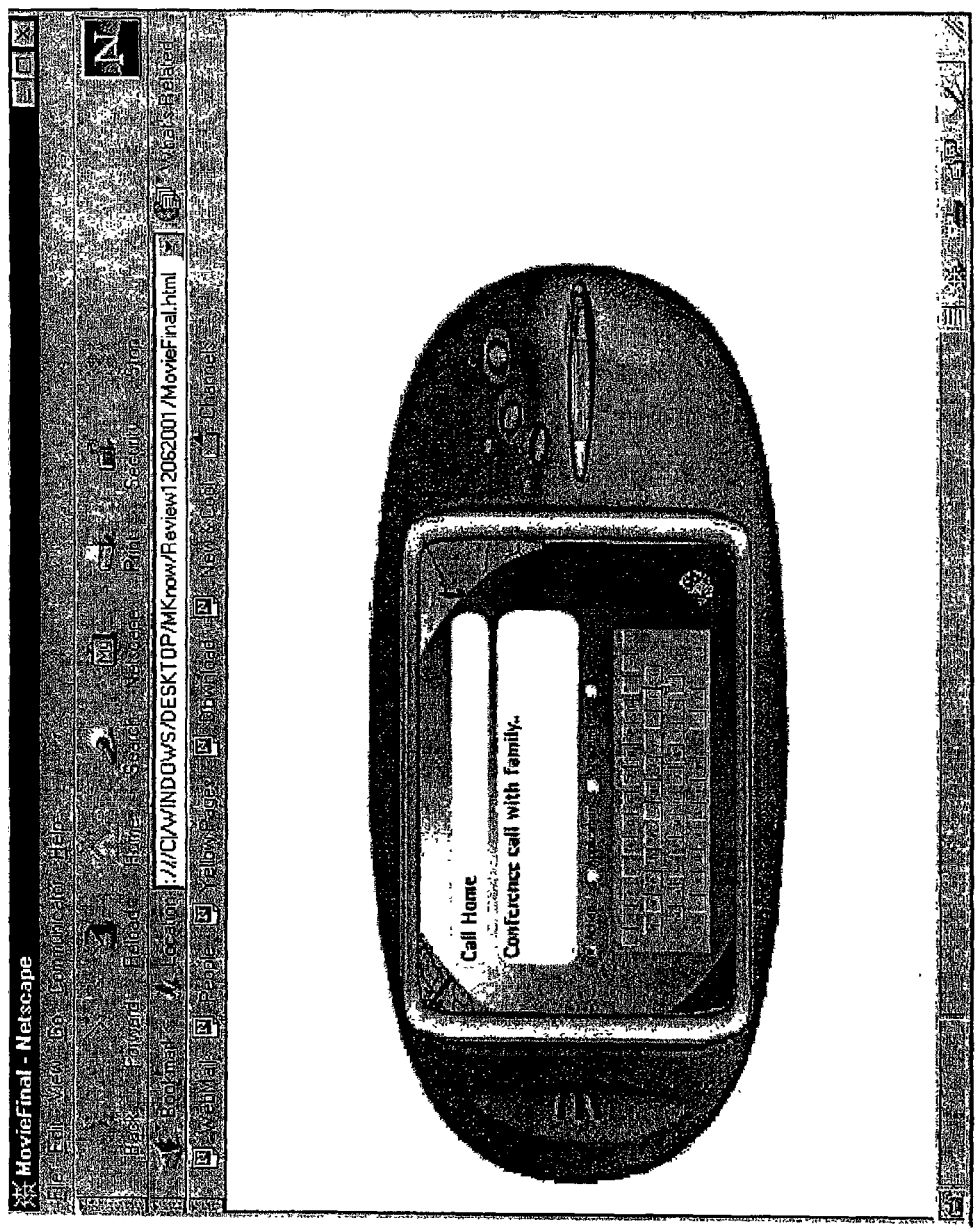

Using the action node, the present invention allows the option of programming the node to perform a desired function, such as calling home and/or the like. The user can simply double-click a node at the center of the display with a pointing device with a pointing device when he wants to carry out a function. The procedure described above is used to create a new node. As described, the user drags the new node symbol and drops it on the "Family" node. At its description form, shown in FIG. 6L, the user enters the name "Call home" and the more detailed description "Conference call with family", and checks the "Action" selection.

Figure 6M:
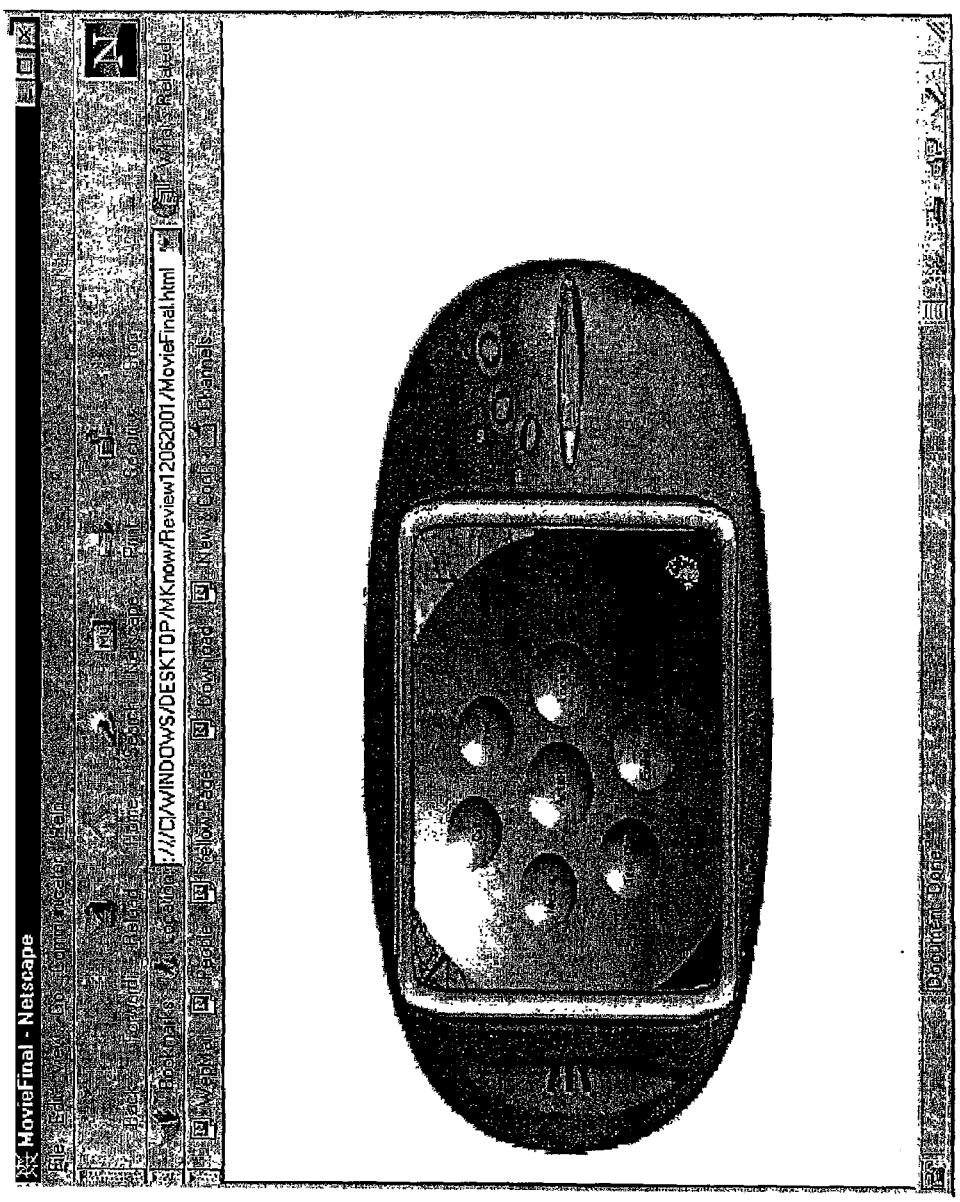
Figure 6N:
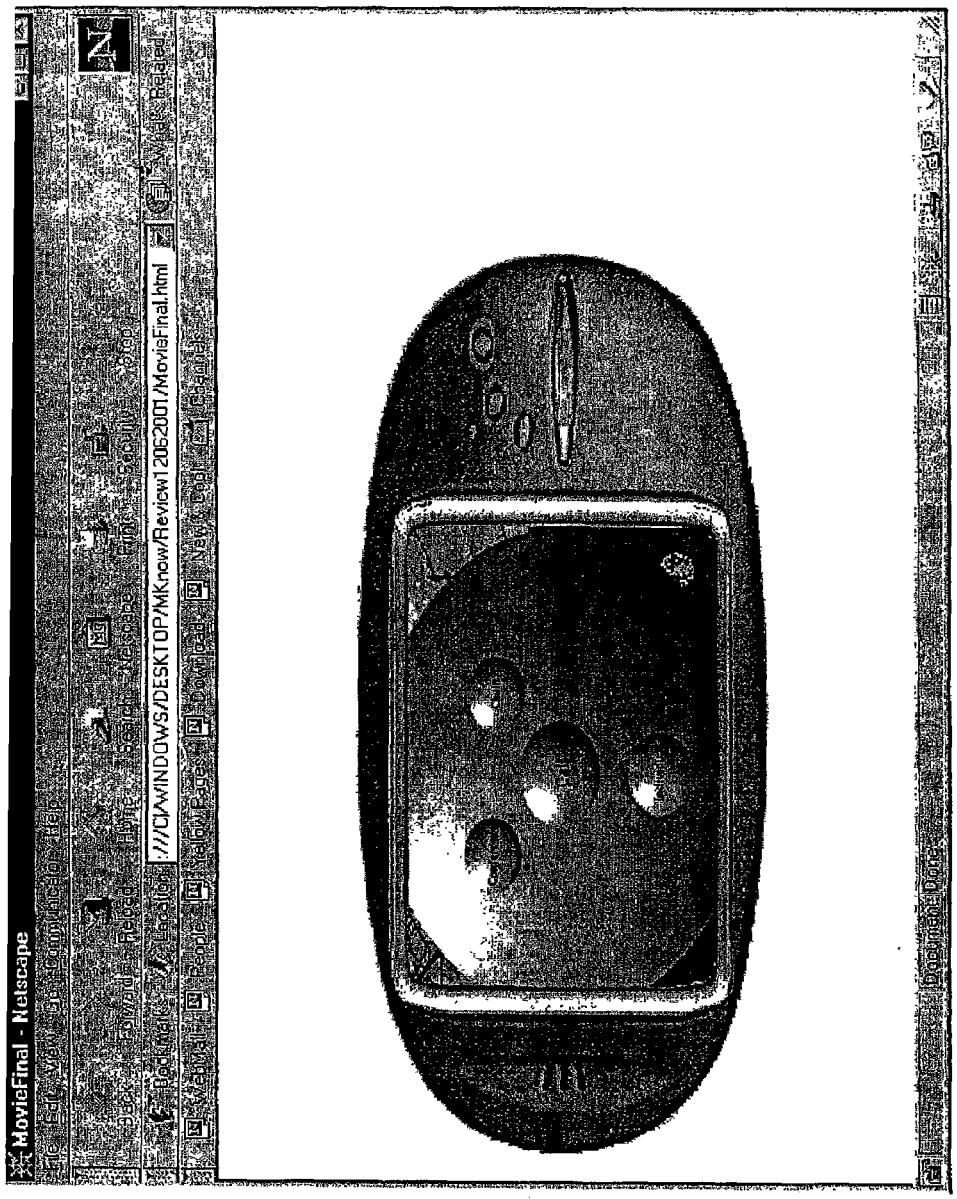

As a result, the "Mapper" displays a selection of action types, as shown in FIG. 6M. In one embodiment of the present invention, the action types include "Call", "Print", "Locate", "Collaborate", "Text Chat", and "Message". The user selects the action type "Call" by a pointing device, and as a result the "Mapper" displays a selection of Call types (shown in FIG. 6N). In one embodiment, the call types include: Individual, Conference, and Chain.

Figure 6O:
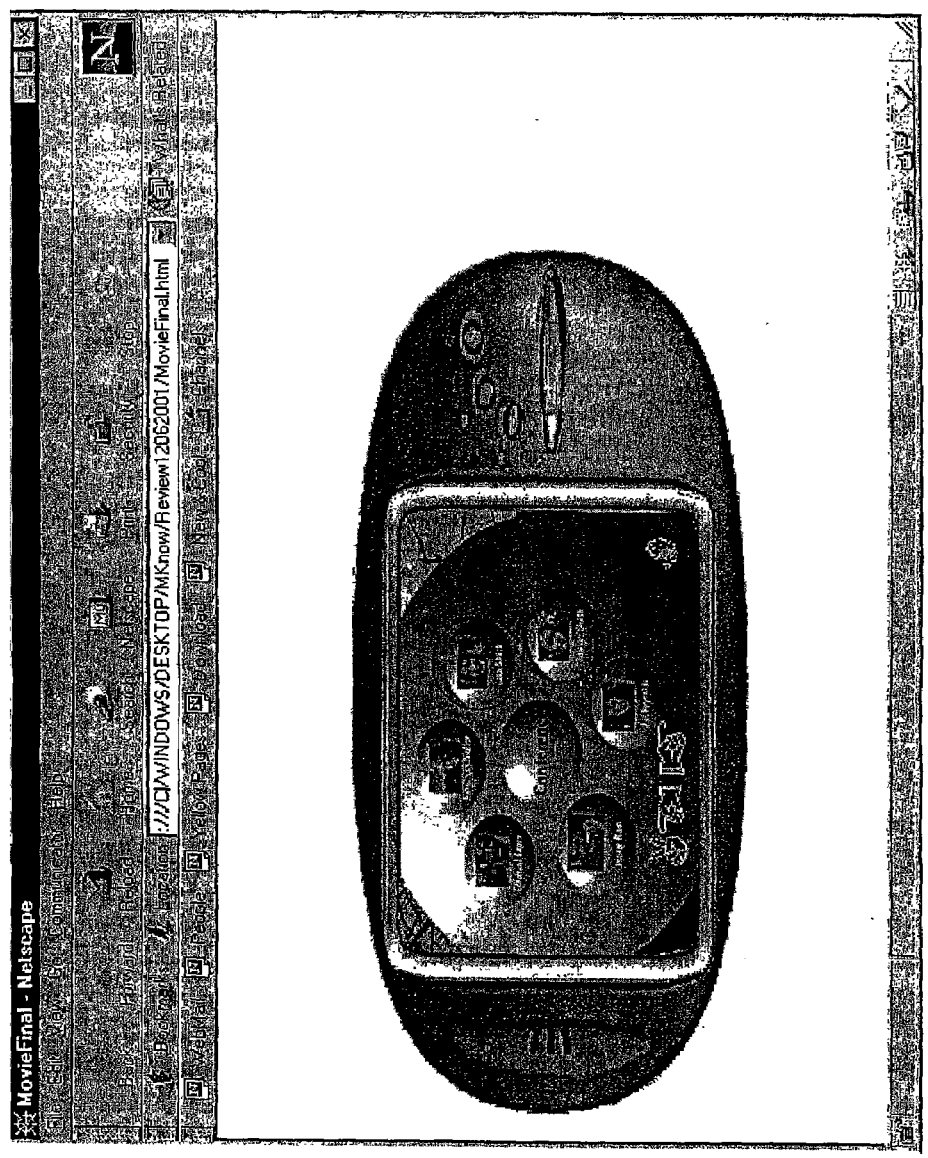
Figure 6P:
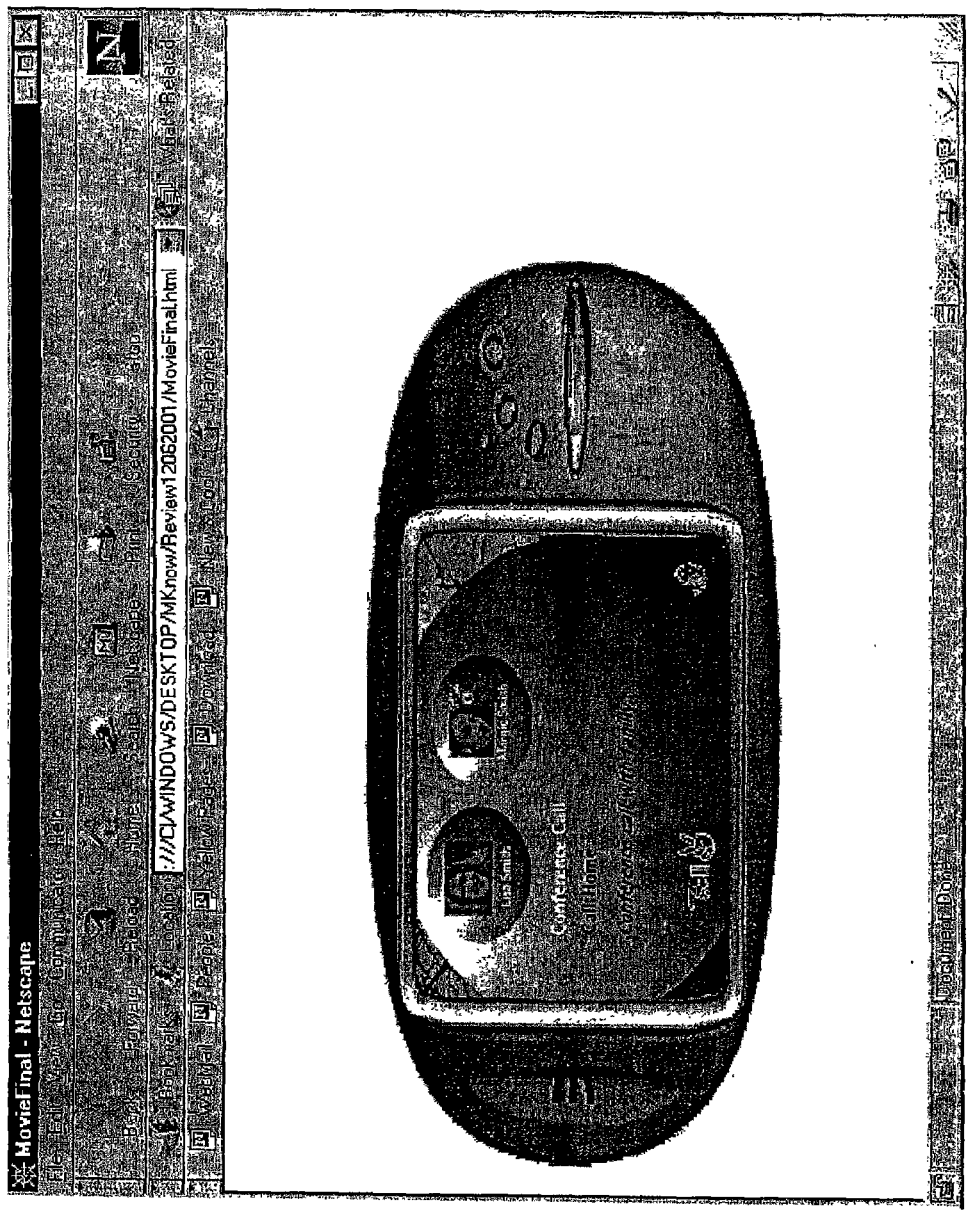

The user may select the type "Conference" by a pointing device. This results in the "Mapper" displaying a selection of contacts, as shown in FIG. 6O. The three symbols at the bottom of the display can be used to scroll through further contacts or accept the choices made. The symbols have the same functions as described above in connection with FIGS. 6I-6J. In the present example, the user selects two family members, namely Lisa Smith and Margie Smith, by means of a pointing device, which is displayed on the screen as shown in FIG. 6P. Thus, the user records the steps of making a conference call to his family.

Figure 6Q:
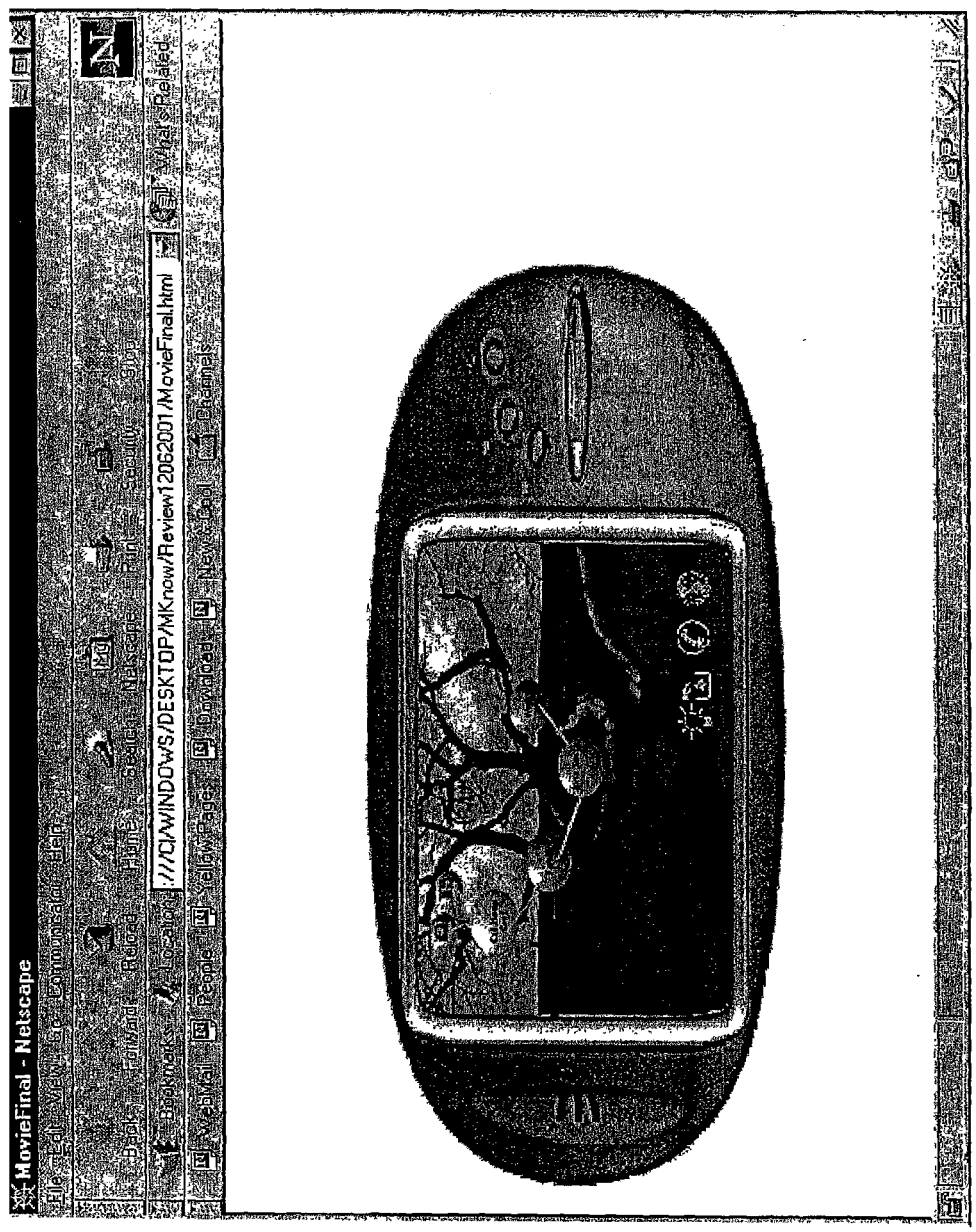

FIG. 6Q displays the result of accepting the selections. A new action node for carrying out a conference "call home" is displayed. It is related to the node "Family", and also displays the pictures of the other participants. After defining an action like this, the user may perform the action by double-clicking the node with a pointing device when it is at the center of the display. The "Mapper" moreover allows the user to customize his UI completely with respect to associating actions to the place where they belong on his map in terms of his personal preference. Thus the "Conference Call with Family" node is naturally associated to the "Family" node.

Figure 6R:
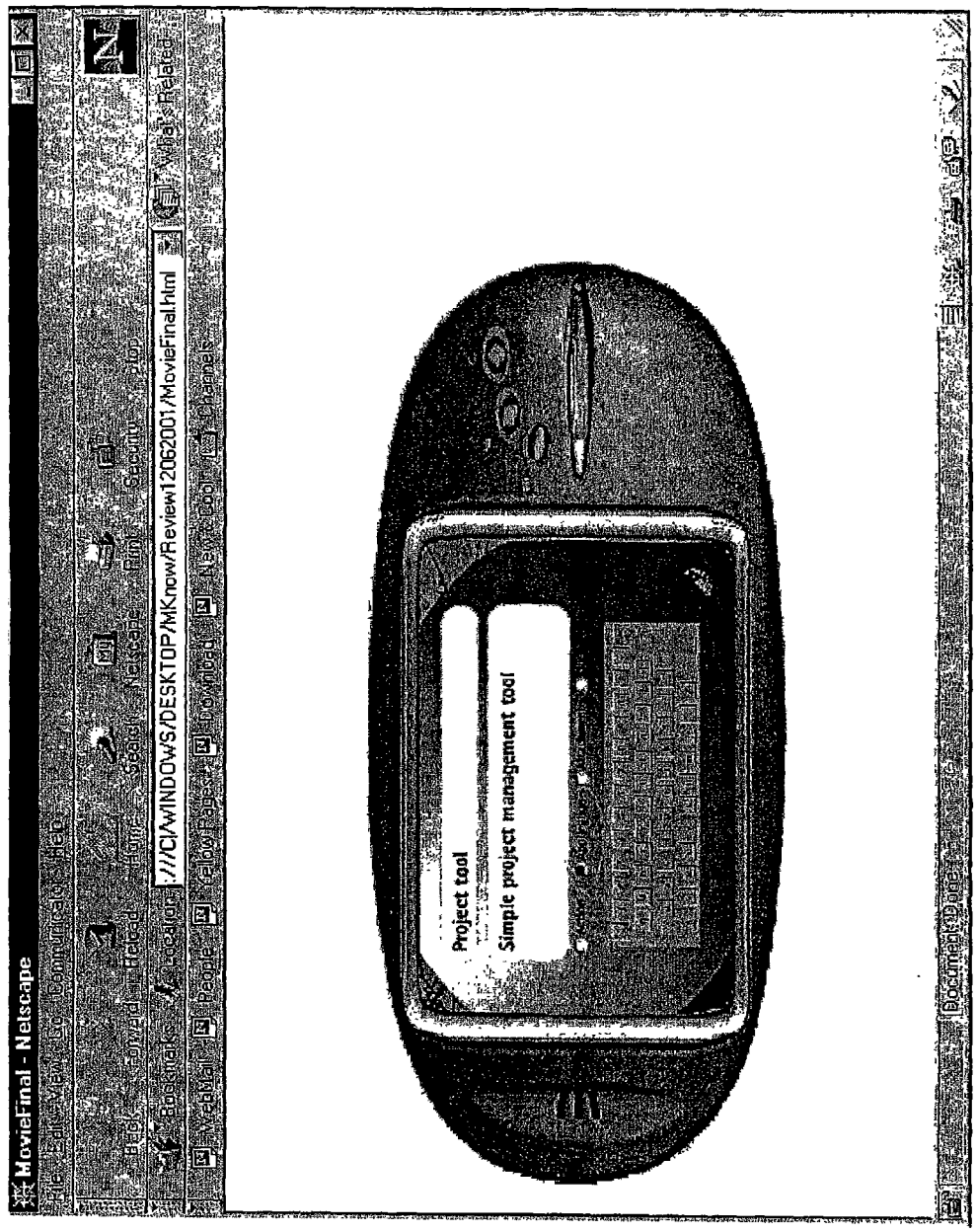

An application node may also be constructed. First, the user creates a new node with the procedure described above, by dragging the new node symbol and dropping it on, for example, the node "Work". At the description form (shown in FIG. 6R) of the new node, the user checks the "Application" selection. In the present example, the user constructs a start button for a project tool application and thus names the node "Project tool" and describes it farther as "Simple project management tool".

Figure 6S:
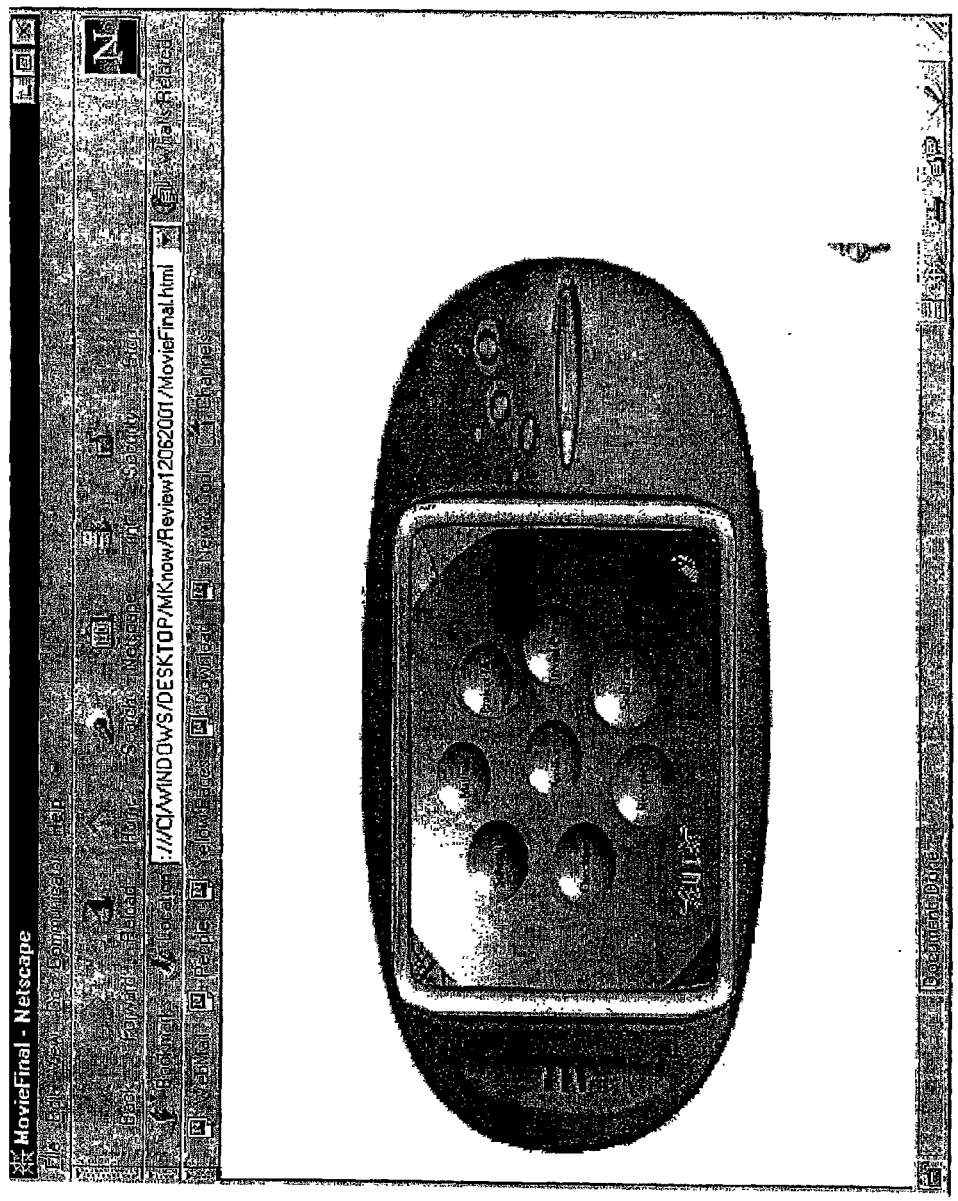

As a result, the "Mapper" displays a selection of available applications, as shown in FIG. 6S. In the manner described above in connection with FIG. 6I, the user may scroll through other possible applications by means of the two "pointing finger" symbols at the bottom of the display. The user selects the "Project Management" alternative by a pointing device.

Figure 6T:
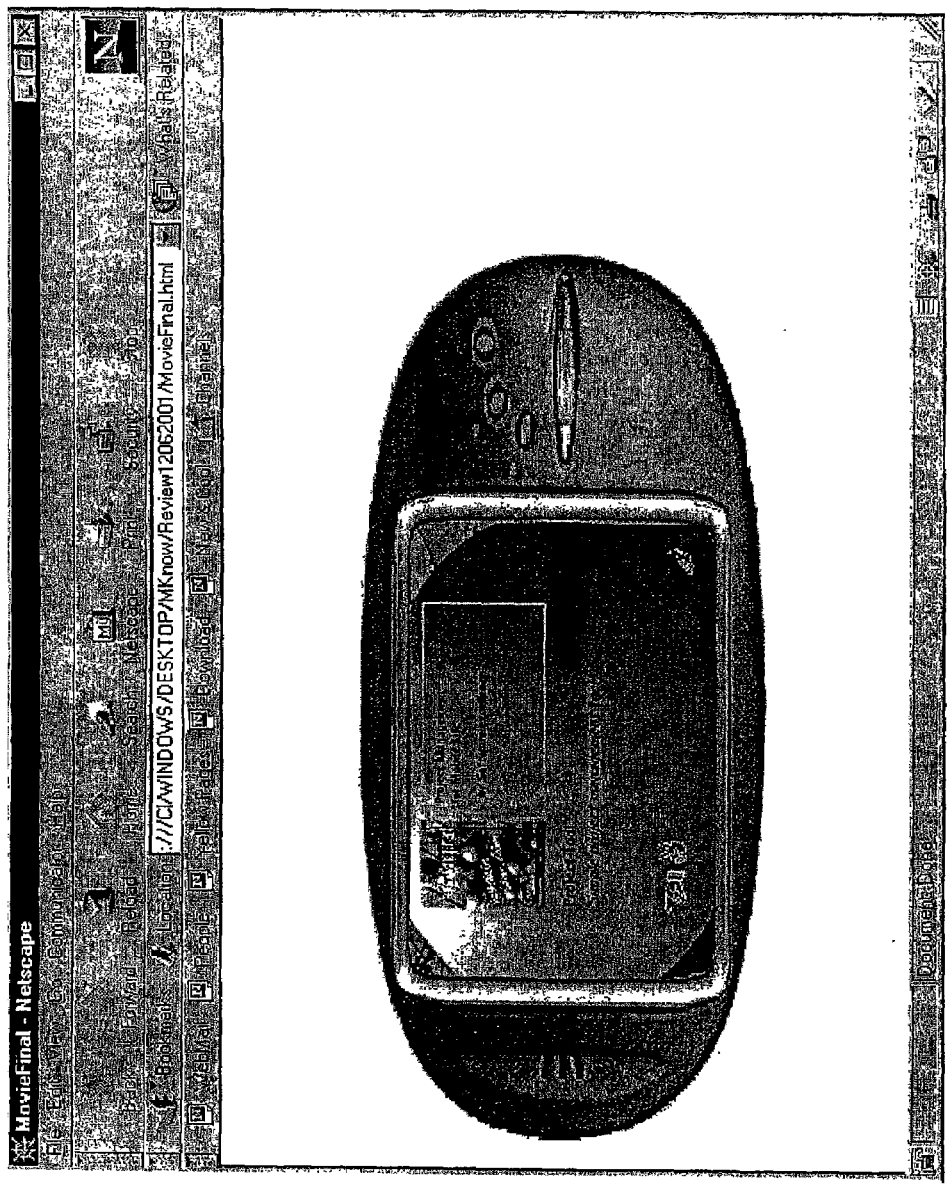

FIG. 6T shows the composition that results from the inputs given and selections made. The user may now redo the selections or accept them, using the two symbols at the bottom of the screen in the manner described in connection with FIG. 6J.

Figure 6U:
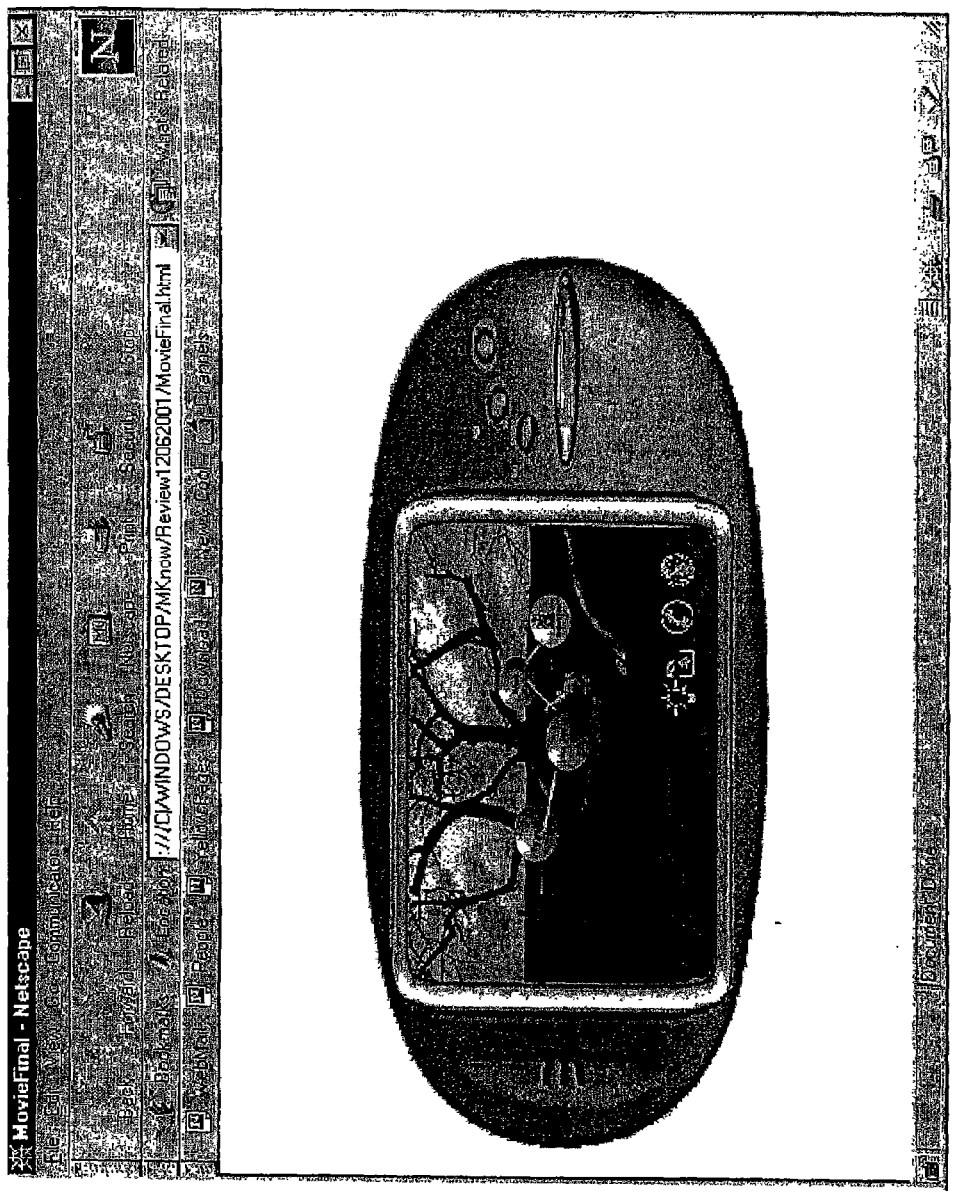

FIG. 6U displays the result, namely the new node that has been associated to the "Work" node.

An example of a construction of an outlined entry is provided below. First, the user creates a new node with the procedure described above, by dragging the new node symbol and dropping it on, for example, the node "Review" which he has already created so that it is associated to the "Work" node. The user may now construct an outlined time entry node for the work review.

Figure 6V:
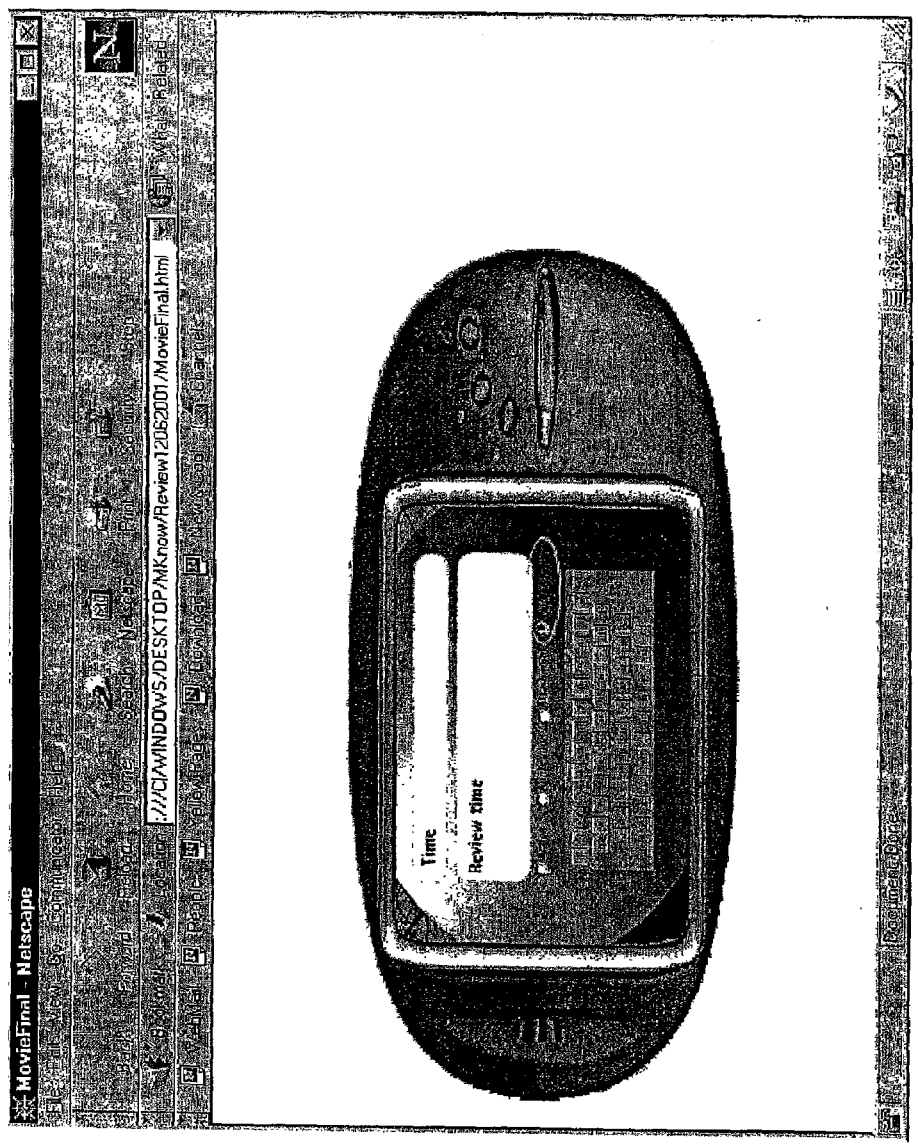

FIG. 6V displays the node description form. The user enters the name "Time", the more detailed description "Review time", and checks the selection for "Outlined entry".

Figure 6W:
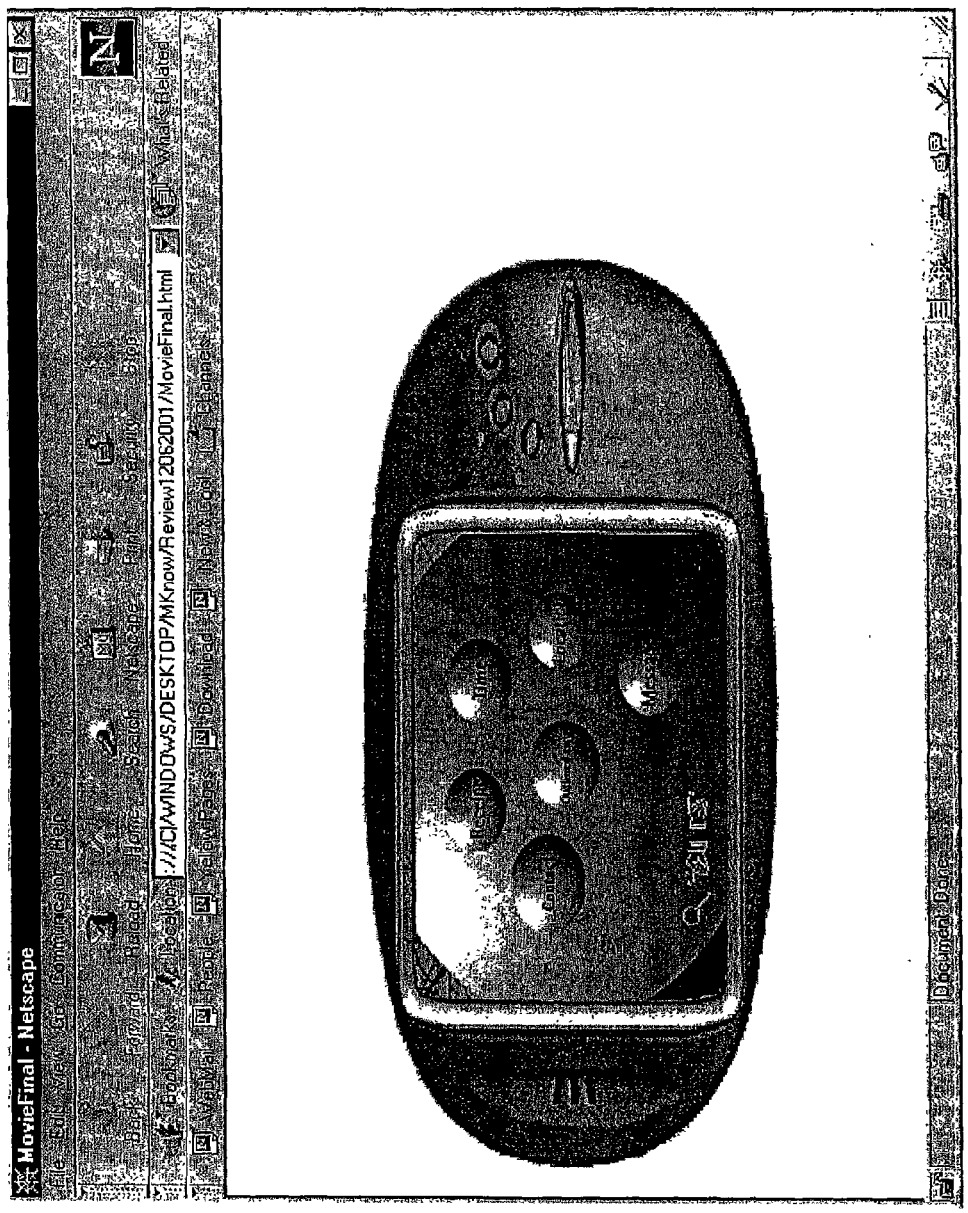
Figure 6X:
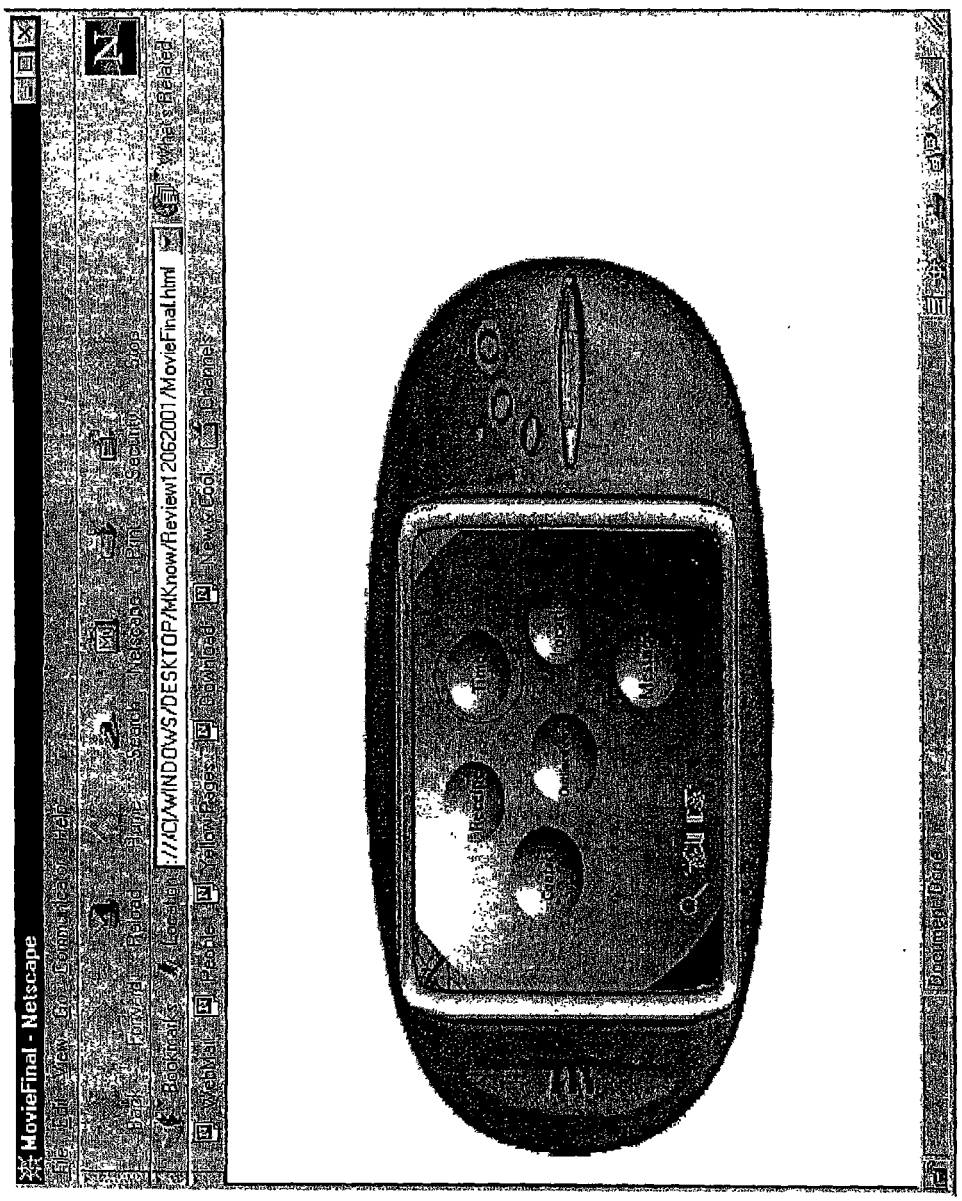

As a result, the "Mapper" displays a selection of possible Outlined entry types, as shown in FIG. 6W. In one embodiment, the possible Outlined entry types are Contact, Recipe, Time, Location, and Message. There may be more Outlined entry types, and these farther possible selections may be scrolled by means of the "pointing finger" symbols at the bottom of the screen as in FIG. 6J. The user selects "Time", as shown in FIG. 6X.

Figure 6Y:
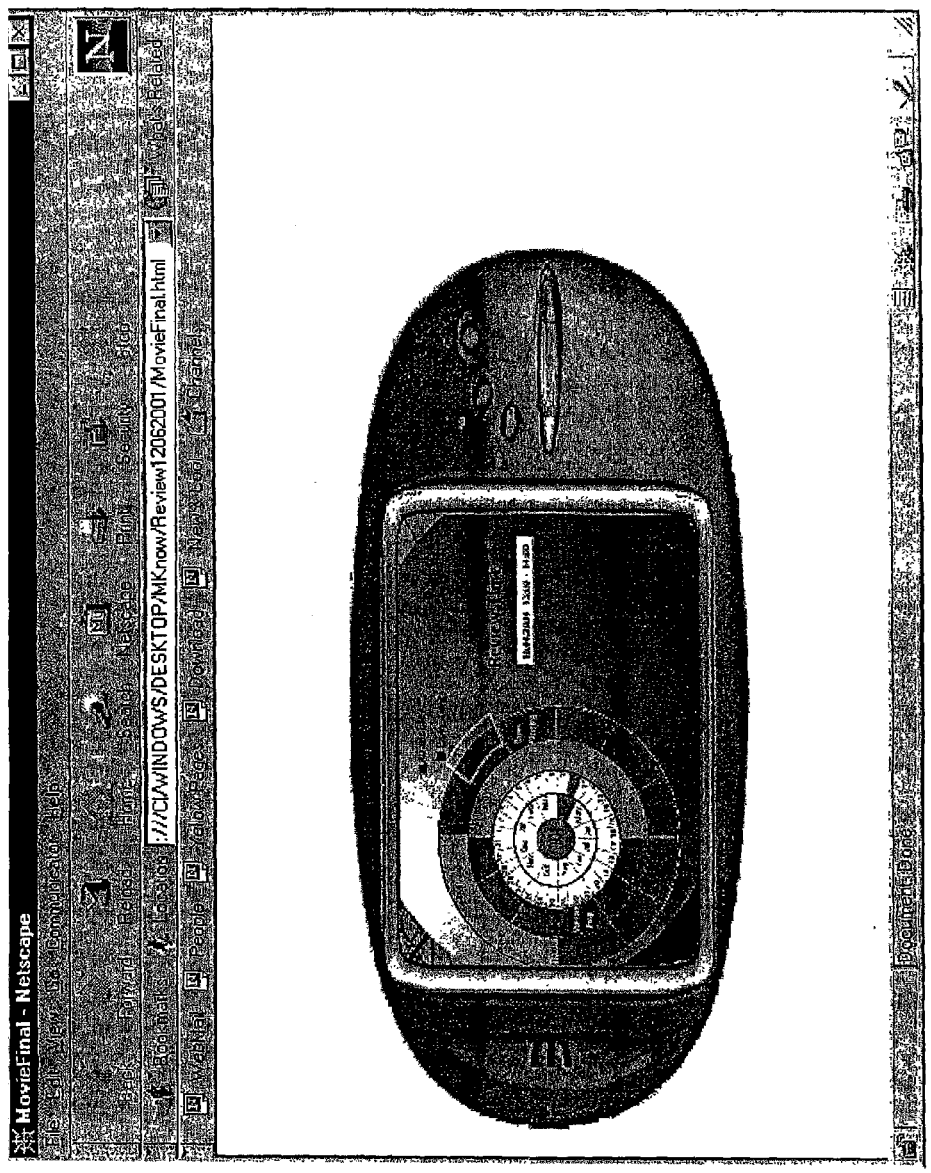

The "Mapper" then displays the user's calendar in a personally customized form. In one embodiment, a circular form is used, such as in FIG. 6Y. FIG. 9 will describe the time display algorithm for this calendar. The calendar shows the busy and available times of the user for a given year, month, day, and time. The center of the circle shows the year, and the concentric rings from center show the month, day, and time respectively. There are two rings for time. The innermost shows the hours from midnight to noon, and the outermost from noon to midnight. The month ring is divided into twelve equal numbered compartments, one for each month. Similarly, the day ring is divided into 28 to 31 equal numbered compartments, depending on the month. And similarly, the two time rings are divided into twelve equal numbered compartments each, the innermost one from 00:00 to 12:00, and the outermost one from 12:00 to 24:00.

Colors may be used to illustrate times. For example, red color may indicate a busy time, and green color may indicate free time. The user may conveniently check his free and busy time for a given occasion by first selecting a month and then a day by a pointing device. The year, by default, may be the present year, but could be changed. The changing may take place by first selecting the center area of the circle by a pointing device, then entering a New Year into a resulting input field, preferably in the center area of the circle itself, then selecting a month, and finally selecting a day.

In the illustrated example, the user enters the time 13:00-14:00, 10.4.2004 for the review by selecting that area in the calendar with a pointing device, and as a result the "Mapper" encircles that area in the calendar and displays the selected time beside the calendar.

Figure 6Z:
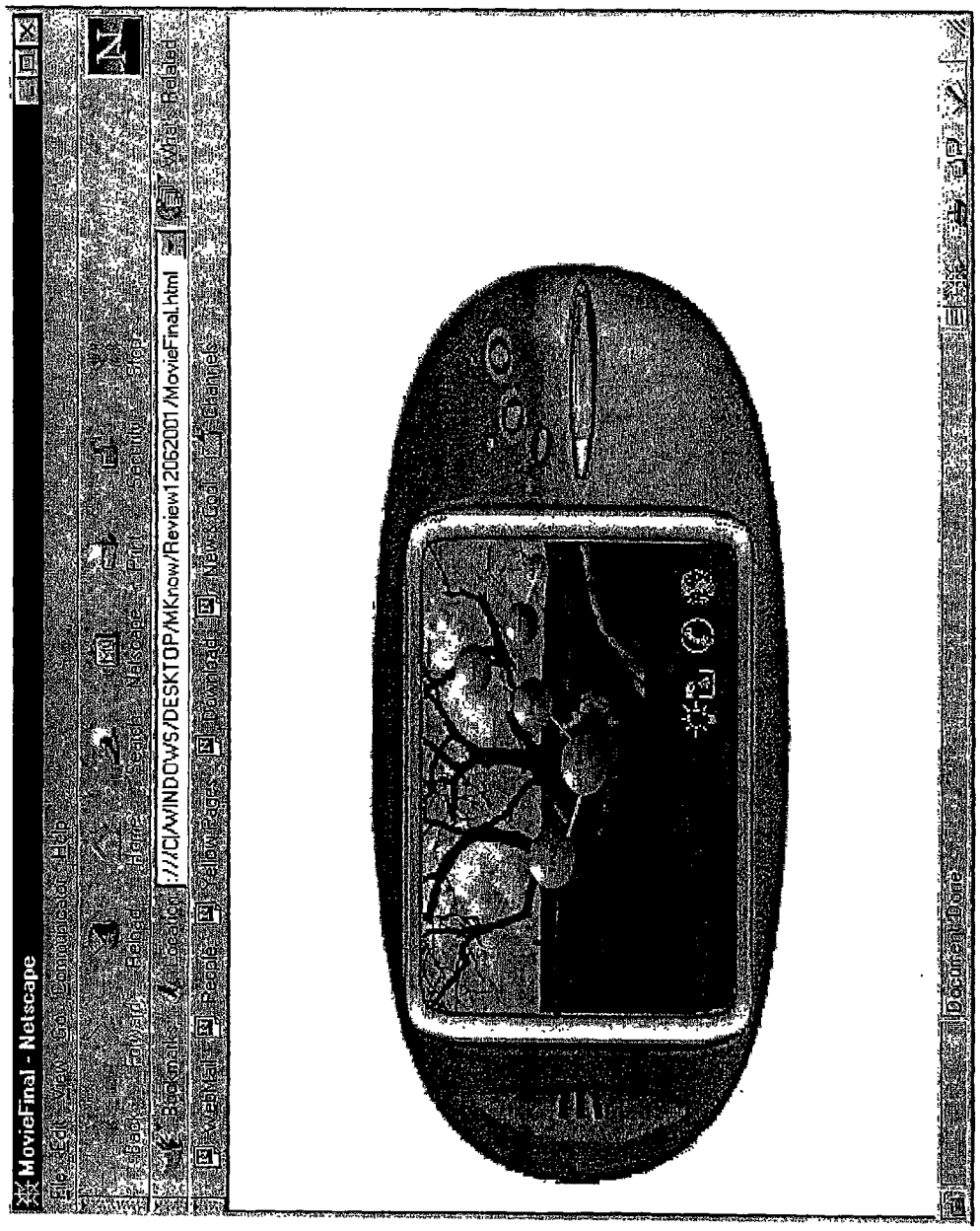
Figure 6A:
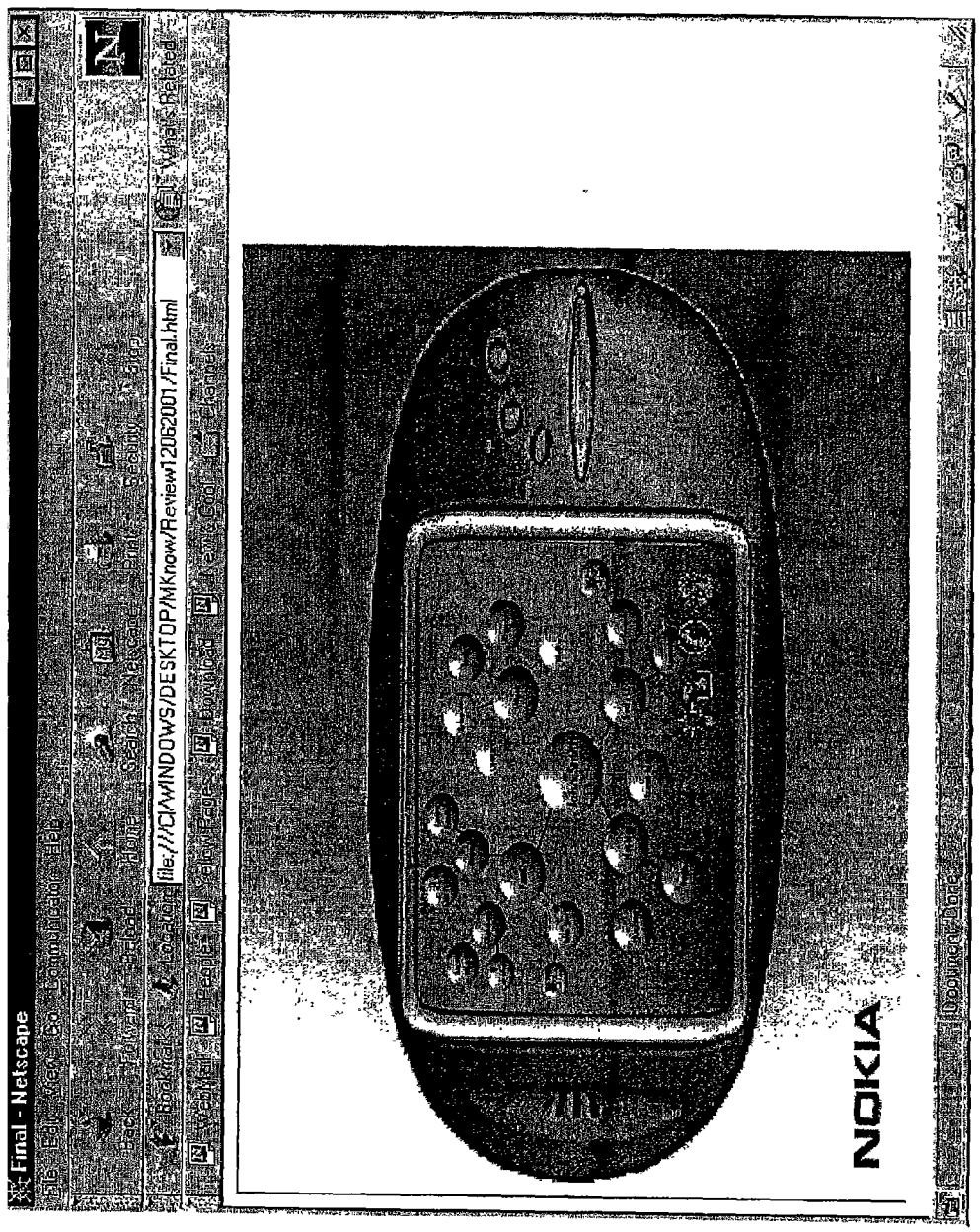
Figure 6A:
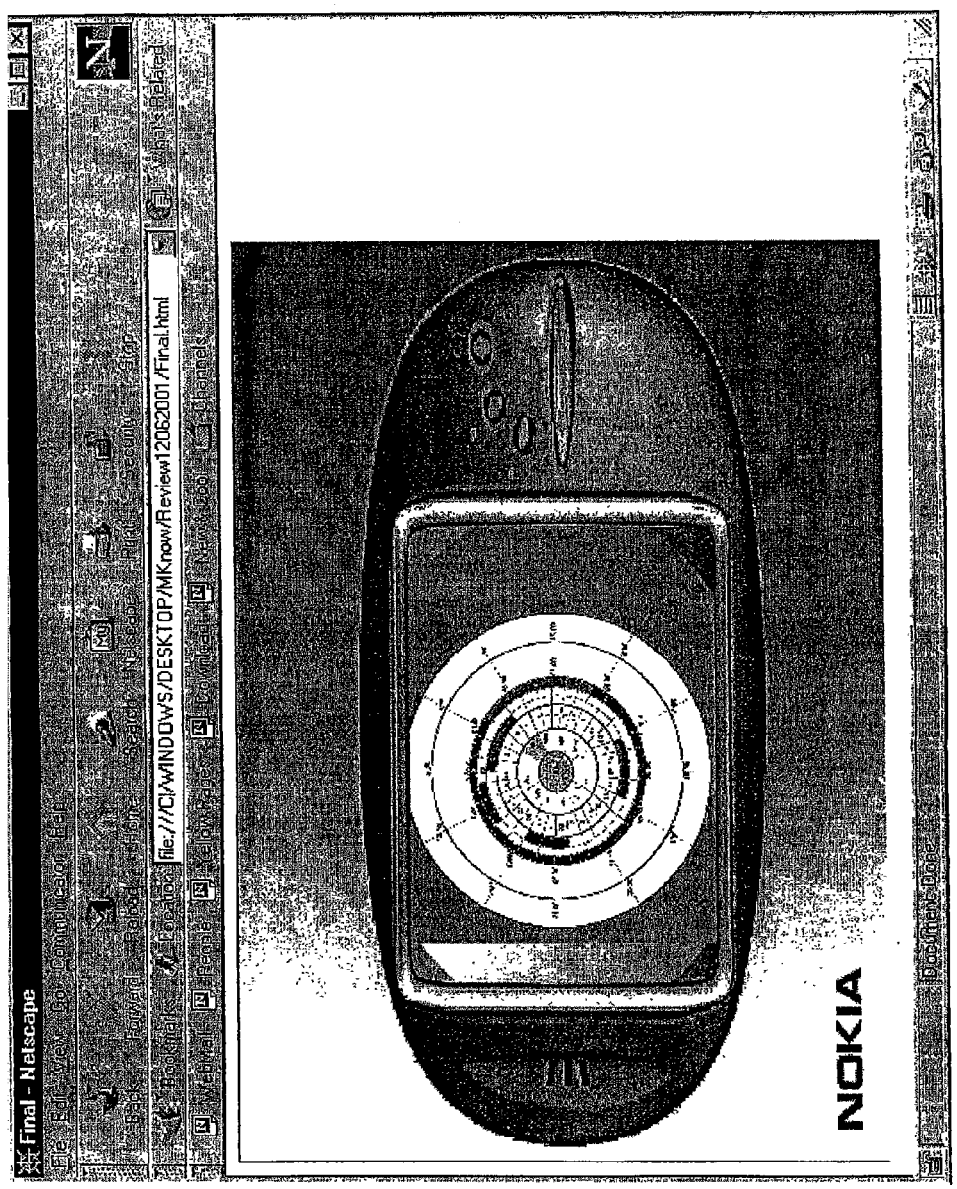
Figure 6A:
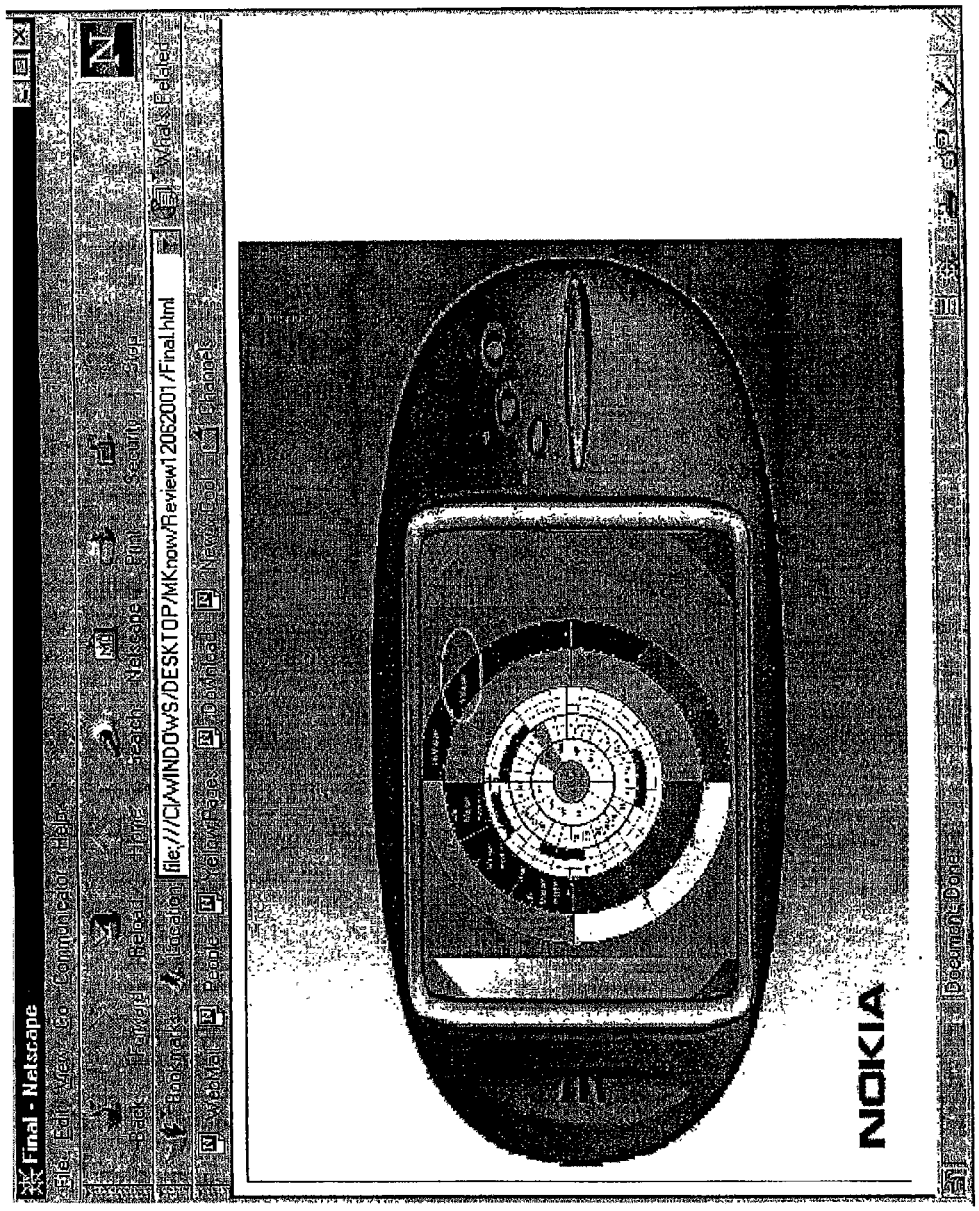
Figure 6A:
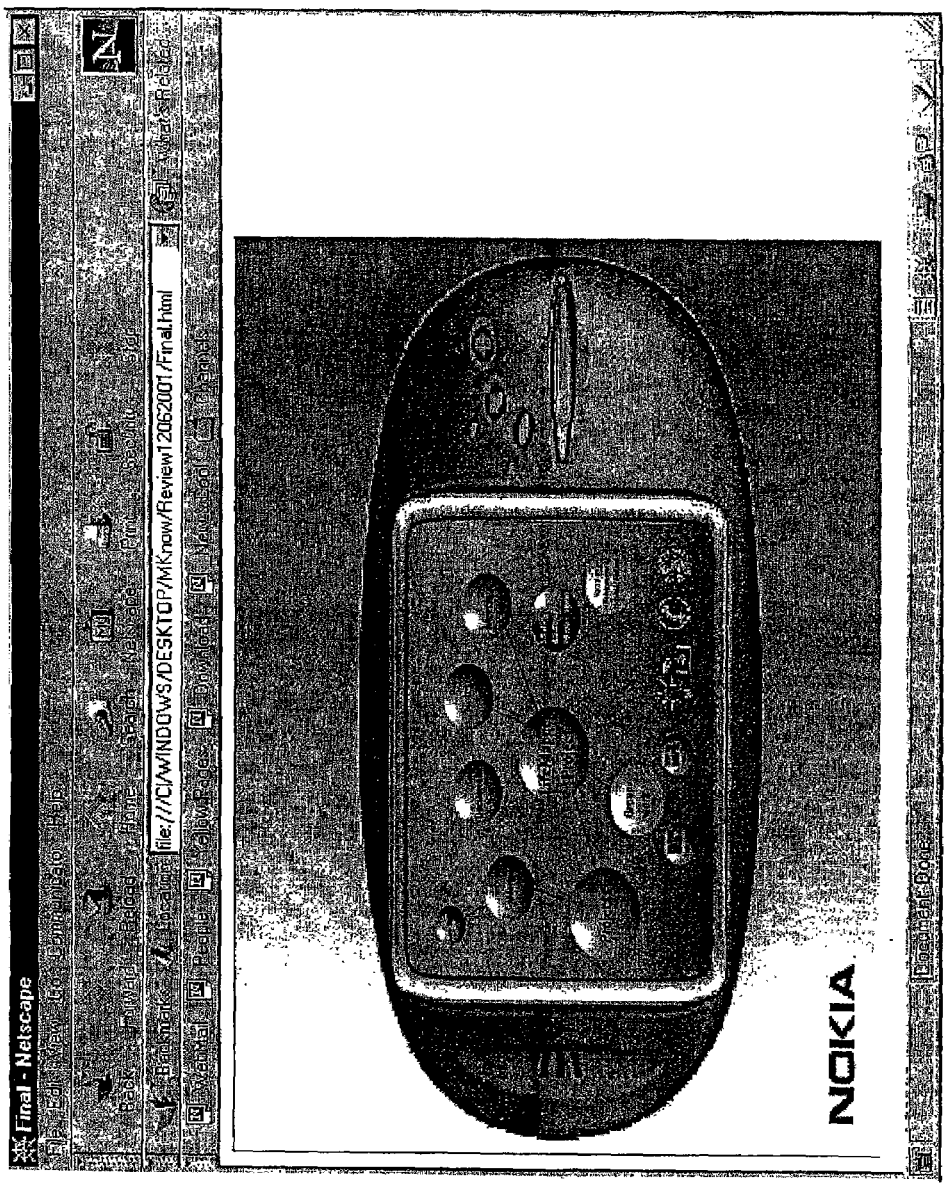
Figure 6A:
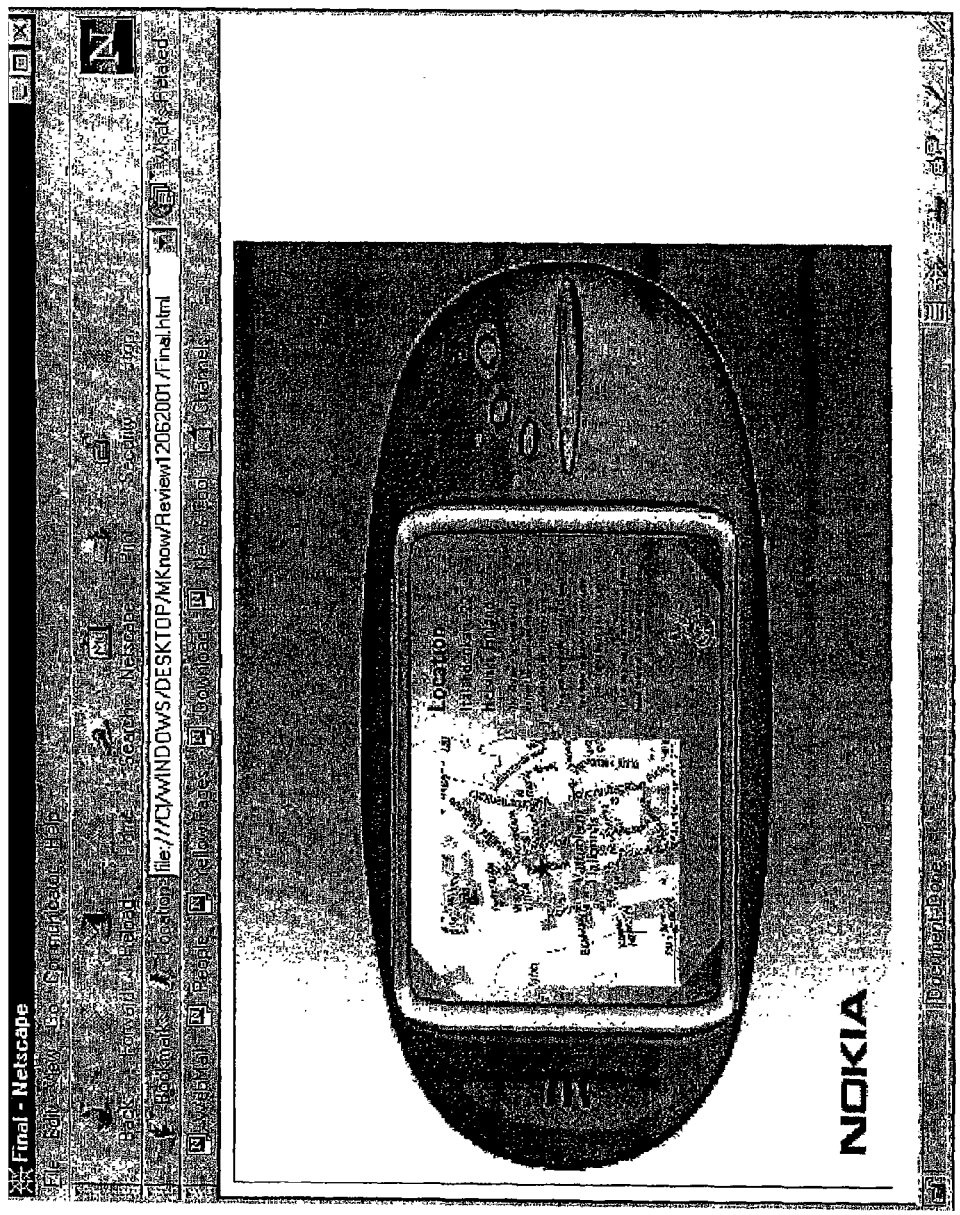

FIG. 6Z displays the result, where the new time entry is associated to the "Review" node. If the user subsequently clicks on the area designating that particular time in his calendar, the "Mapper" moves the node where the time entry was associated to the display, as shown in FIGS. 6AA-6AE, which display the user's map.

The user selects the "Schedule" node by a pointing device on FIG. 6AA. The "Mapper" then displays his calendar for that day, as shown in FIG. 6AB. The user then selects the time zone between 13:00 and 14:00 by means of a pointing device, as shown in FIG. 6AC. The "Mapper" then moves the node where that time entry was made to the display, as shown in FIG. 6AD. This reminds the user that the time entry in his calendar was associated to the child node "Meetings" of the "Mapper Project", and that its location is "Itälahdenkatu 22". This is another illustration of how the "Mapper" allows the user to customize his UI so that it directly reflects associations in his thinking.

The user may also select the location node of the meeting, depicted in FIG. 6AE. Now the "Mapper" tells him the distance between his present location and the meeting location, the current speed at which the user is moving, the time after which he has to leave from the present location to the meeting location to get there on time—both in the case of taking public transport or driving by his own car or taking a taxi. Further, in the case of public transport, the "Mapper" instructs which bus number or subway to take. All these functionalities are possible when a terminal has a GPS system for determining the location of the terminal, or it is identified by means of WLAN or Bluetooth.

FIGS. 7A-7D illustrating the exemplary actions that may be performed on the maps, in addition to creating nodes.

FIG. 7A illustrates one exemplary process of deleting an existing node from a map. To delete a node from a map, the user points at it by a pointing device, as shown in box 705. In step 710, the user drags the selected node to the node deletion symbol illustrated on the display and drops it thereupon. In step 715, the node is deleted and erased from display. The submap of which that node is the root is also deleted. Each node uniquely defines a submap for the purposes of deletion, because maps that are graphs can be resolved into trees as described below, and each node of a tree uniquely defines the subtree whose root the node is. It should be noted that deleting a node that has been identified with another node, which is not a part of the deleted submap results in deletion of only the former occurrence but not the latter, unless the user decides to delete both. He is asked when this kind of situation occurs.

FIG. 7B illustrates one exemplary process of moving a submap to another location in a map. To move a submap—the limiting case is a single node submap—to another place in a map, the user points at the root of the submap by a pointing device, in step 720. In step 725, the root is dragged to the node to which the user wants to associate the dragged node, and drops it thereupon. In step 730, the dragged root node becomes a child of the destination node. As with deletion, each node uniquely defines a submap for the purposes of copying, because maps that are graphs are resolved into trees as described below. The display is modified to reflect the moved node or submap.

FIG. 7C illustrates one exemplary process of navigating a map manually. The user navigates a map manually by repeatedly selecting nodes, and thus moving the visible area of the map on the display device. In step 735, the user clicks on a node symbol on a given map. As a result, in step 740, the map is redrawn so that the clicked node symbol is moved to the center of the display. The immediately related nodes are then drawn around the node moved to the center. The children of the child nodes are drawn around the child nodes. This process is repeated recursively as long as all the nodes continue to be accommodated in the display. Selecting a node that is in the center of the display activates it for inspection or editing. For example, as described above, selecting an attachment node that is in the center of the display opens the attachment.

FIG. 7D illustrates one exemplary process of editing or displaying the name of a relationship. In step 745, the user clicks on the edge that depicts a relationship on the terminal. In step 750, the system displays the name of the relationship, if a name exits. In step 755, the user may Edit-in-place (i.e., add, remove, modify) the name of the relationship, or just leave it as it is for display.

FIG. 8 illustrates the logical structure of one embodiment of a calendar 800 that may be constructed using the present invention. The inner most circle 810 represents the year in the calendar, while the surrounding circle 820 represents the month. The next circle 830 represents the day, which is followed by the hours circles 840, 850, each of which is divided into twelve equal numbered compartments. The first hours circle 840 has twelve equal numbered compartments from 00:00 to 12:00, while the second hours circle 850 has twelve equal numbered compartments from 12:00 to 24:00.

FIG. 9 illustrates one exemplary flow for constructing the calendar in accordance with the present invention. In step 900, the system checks to determine if the user clicked the center of the calendar. If the user did click the center of the calendar, then in step 905 the user is allowed to enter the desired year for the calendar. Next, in step 910, the user may select the month option for entering the value for the month. In one embodiment, upon highlighting the month, the selected month becomes colored. Once the month's value has been entered, in step 915, the system redisplays the day ring 830 that contains the number of days in accordance with the value of the month as well as the year.

Next, in step 920, the user may select the appropriate day for the calendar. Upon selection, the selected day becomes colored. In step 925, the two time rings 840, 850 are redisplayed, with available/busy time of hours being dependent on the day. The busy hours may optionally be shown in red color, while the available hours may be shown in green color.

In step 900, if the system determines that the user did not click the center of the calendar, then the calendar retains the current year in step 930. From step 930, the flow proceeds to step 910 and continues as described above.

FIG. 10 illustrates one embodiment of the resolution of a graph into a tree. The present invention resolves the displayed representation of maps that contain cycles into trees if the user chooses so. This is because trees are sometimes more intuitive to grasp and can always be displayed in outline form on terminals without a graphical display.

A cycle, and hence a graph that needs to be resolved into a tree, can only be created by giving a new node a name that already occurs in the map. In this circumstance, the "Mapper" asks the user whether the same thing is denoted by both occurrences of the name. If the user answers positively, the two nodes are identified internally so that a change to one of the nodes is propagated to the other occurrence on the display. The first created occurrence is displayed normally. Providing another circle around the displayed node, which indicates that there exists another identical node in the map, identifies the second occurrence. If any of the two nodes is thereafter updated, the changes are also displayed at the other occurrence. Thus cycles may never be shown to the user, although they may exist (as shown by the dashed line in FIG. 10) in the underlying map structure. This resolution method also allows a node to uniquely determine a submap in deleting or copying a submap. The determination is carried out on the basis of the resolved representation.

Such a method of resolving a graph into a tree can be illustrated by the simplest possible example, as shown in FIG. 10. Initially, as shown in the (a) scenario, the map has nodes "A", "B", and "C", which is to be extended with a new node.

The new node has the name "B", as shown in (b), and the name "B" already exists in the map. The user intends them to denote the same node, which transforms the tree into a graph, as shown in (c). This graph may be resolved into the tree (shown in (b)) when it is displayed. The resolution simply displays the tree (shown in (b)) where the same node ("B") occurs at two different places. Any changes made by the user to one of the occurrences will automatically be propagated to the other occurrence, except deletion. Moreover, node "A" is the uniquely determined root of the submap of (c), because it was initially the root of the tree that was transformed into a graph by adding a second occurrence of node "B".

When the terminal in use has a graphical display, the present invention may also display cycles in graphs. To enter or exit this graph display mode, the user may select a special button in the UI by means of a pointing device. In a terminal without a graphical display, information is always displayed in outline form, which is a linear representation of tree form, irrespective of whether the user has switched into graph display mode or not. Graphs are then resolved to trees throughout. This is always possible like the display of a Unix file system as a tree structure despite symbolic links that form graphs of a kind.

Thus, as will be evident, the present invention allows two different visual structures that the user may switch between depending on preference. In graph display mode, the UI displays graphs, and otherwise trees. In graph display mode, the user may choose a two- or three-dimensional display for graphs if he is using a terminal with a graphical display. The three-dimensional display may make complex graph structures easier to grasp.

Thus, in summary, herein is disclosed a method, system and apparatus for enabling users to create customized user interfaces. The user interface is logically structured as a node map, wherein nodes may be added to the node map in accordance with the user's needs. The nodes may be connected there-between to define relationships between the different nodes. The nodes may have an attachment, an action, an application and/or the like associated therewith. The user may perform a variety of other functions to customize, alter or expand the information depicted on their user interface.

Although illustrative embodiments have been described herein in detail, it should be noted and understood that the descriptions have been provided for purposes of illustration only and that other variations both in form and detail can be made thereupon without departing from the spirit and scope of this invention. The terms and expressions have been used as terms of description and not terms of limitation. There is no limitation to use the terms or expressions to exclude any equivalents of features shown and described or portions thereof and this invention shown be defined with the claims that follow.

We claim:

1. A method, comprising:
   receiving a user instruction via a user interface in a computing device for initiating creation of a new node in the user interface, the user interface including at least a display component configured to display a node map wherein multiple child nodes are visually displayed as coupled to a parent node;
   receiving node information from the user via the user interface in the computing device, the node information including at least node linkage information and node name information;
   generating, in the computing device, a new node in the node map based on the received user node information; and
   displaying the new node in the node map on the display component.

2. The method of claim 1, further comprising creating an edge from the new node to a parent node, wherein said parent node is origination point for the new node.

3. The method of claim 2, further comprising adding information regarding the created edge to an edge list.

4. The method of claim 3, wherein the new node is named by a user.

5. The method of claim 1, further comprising determining existence of an earlier node having node information identical to said new node, after said receiving node information.

6. The method of claim 5, wherein said earlier node is identical to said new node.

7. The method of claim 6, further comprising identifying said earlier node and said new node having identical node information.

8. The method of claim 1, wherein said node information discloses node type of said new node.

9. The method of claim 8, wherein said node type indicates the presence of an attachment associated with said new node.

10. The method of claim 9, further comprising receiving indication of an attachment type from the user.

11. The method of claim 10, further comprising receiving content for attachment to said new node.

12. The method of claim 8, wherein said node type indicates presence of an action associated with said new node.

13. The method of claim 12, wherein said action is one of calling another human, printing, locating an object of interest, collaborating with others, text, chat and message.

14. The method of claim 8, wherein said node type indicates presence of an application associated with said new node.

15. The method of claim 8, wherein said node type indicates presence of an outlined entry associated with said new node.

16. The method of claim 15, wherein said outlined entry is one of contact, recipe, time, location, and message.

17. The method of claim 8, further comprising deleting said new node.

18. The method of claim 17, wherein said deleting is initiated when the user selects said new node and makes a selection to delete said new node is displayed on said user interface.

19. The method of claim 8, further comprising moving said new node to a new location on the map.

20. The method of claim 8, wherein said map is navigated recursively.

21. The method of claim 20, further comprising:
   a. receiving user selection for a first node;
   b. moving said first node to the center of the map;
   c. displaying first level children nodes of said first node in the center of the map;
   d. displaying children nodes of said first level children nodes;
   e. receiving user selection for a second node; and
   f. repeating steps (a)-(e) for said second node.

22. The method of claim 8, further comprising editing information on the map in response to a user selection.

23. The method of claim 1, wherein the node information pertains to personal user information.

24. The method of claim 1, wherein the newly created node is a child node of an existing parent node.

25. The method of claim 1, wherein the creation of the new node is initiated by a user action on an existing node.

26. A node map, comprising:
   a. at least a first individual node and a second individual node of the node map displayed on a display component of a user interface in a computing device; and
   b. a first node category and a second node category, said first node category comprising said first individual node therein and said second node category comprising said second individual node therein, said first individual node related to said first node category and said second individual node related to said second node category, wherein said first individual node is related to said second individual node, such that a user accesses information in said second individual node by beginning navigation from said first individual node using the user interface in the computing device.

27. The map of claim 26, wherein the user accesses information in said first node category by beginning navigation from said first individual node, or the user accesses information in said second node category by beginning navigation from said second individual node.

28. The map of claim 26, wherein the user accesses information in said first individual node by beginning navigation from said first node category, or the user accesses information in said second individual node by beginning navigation from said second node category.

29. The map of claim 26, wherein said first node category is related to said second node category, such that the user accesses information in said first node category by beginning navigation from said second node category, or the user accesses information in said second node category by beginning navigation from said first node category.

30. The map of claim 26, wherein said first individual node and said second individual node are classified in accordance with a task associated therewith.

31. The map of claim 30, wherein said task is one of an action, application initiation module, attachment and outlined entry.

32. The map of claim 31, wherein said map depicts the relationship between said first individual node and said second individual node in the form of an edge.

33. The map of claim 31, wherein said application initiation module is a link to an application, said application being external to said map.

34. The map of claim 31, wherein said file attachment is a second map, said second map being a submap of the map.

35. The map of claim 31, wherein said map is viewed in tree mode as well as in graph mode, said viewing dependent on user's preference of user interface.

36. The map of claim 31, wherein said map is displayed in a structural view.

37. The map of claim 31, wherein said map is displayed in a procedural view.

38. The map of claim 31, wherein said map is displayed in a temporal view.

39. The map of claim 31, wherein said map is displayed in a spatial view.

40. The map of claim 31, wherein said map is organized based on the user's physical location.

41. The map of claim 31, wherein said map is organized based on the user's societal role.

42. The map of claim 31, wherein said map depicts the relationship between said first individual node and said second node category in the form of an edge.

43. The map of claim 31, wherein said map depicts the relationship between said first node category and said second node category in the form of an edge.

44. The map of claim 26, wherein said first node category and said second node category are classified in accordance with a task associated therewith.

45. The map of claim 44, wherein said task is one of an action, application initiation module, attachment and outlined entry.

46. The map of claim 45, wherein said map depicts the relationship between said first individual node and said second individual node in the form of an edge.

47. The map of claim 45, wherein said application initiation module is a link to an application, said application being external to said map.

48. The map of claim 45, wherein said file attachment is a second map, said second map being a submap of the map.

49. The map of claim 45, wherein said map is viewed in tree mode as well as in graph mode, said viewing dependent on user's preference of user interface.

50. The map of claim 45, wherein said map is displayed in a structural view.

51. The map of claim 45, wherein said map is displayed in a procedural view.

52. The map of claim 45, wherein said map is displayed in a temporal view.

53. The map of claim 45, wherein said map is displayed in a spatial view.

54. The map of claim 45, wherein said map is organized based on the user's physical location.

55. The map of claim 45, wherein said map is organized based on the users societal role.

56. A system for creating a node in a node map for a user interface in a computing device, comprising:
   means for receiving a user instruction via a user interface in a computing device for initiating creation of a new node in the user interface, the user interface including at least a display component configured to display a node map wherein multiple child nodes are visually displayed as coupled to a parent node;
   means for receiving node information from the user via the user interface in the computing device, the node information including at least node linkage information and node name information;
   means for generating, in the computing device, a new node in the node map based on the received user node information; and
   means for displaying the new node in the node map on the display component.

57. The system of claim 56, further comprising means for creating an edge from the new node to a parent node, wherein said parent node is origination point for the new node.

58. The system of claim 57, further comprising means for adding information regarding the created edge to an edge list.

59. The system of claim 58, wherein the new node is named by a user.

60. The system of claim 56, further comprising means for determining existence of an earlier node having node information identical to said new node, after said receiving node information.

61. The system of claim 60, wherein said earlier node is identical to said new node.

62. The system of claim 61, further comprising means for identifying said earlier node and said new node having identical node information.

63. The system of claim 56, wherein said node information discloses node type of said new node.

64. The system of claim 63, wherein said node type indicates the presence of an attachment associated with said new node.

65. The system of claim 64, further comprising means for receiving indication of an attachment type from the user.

66. The system of claim 65, further comprising means for receiving content for attachment to said new node.

67. The system of claim 63, wherein said node type indicates presence of an action associated with said new node.

68. The system of claim 67, wherein said action is one of calling another human, printing, locating an object of interest, collaborating with others, text, chat and message.

69. The system of claim 63, wherein said node type indicates presence of an application associated with said new node.

70. The system of claim 63, wherein said node type indicates presence of an outlined entry associated with said new node.

71. The system of claim 70, wherein said outlined entry is one of contact, recipe, time, location, and message.

72. The system of claim 63, further comprising means for deleting said new node.

73. The system of claim 72, wherein said deleting is initiated when the user selects said new node and makes a selection to delete said new node is displayed on said user interface.

74. The system of claim 73, further comprising means for moving said new node to a new location on the map.

75. The system of claim 63, wherein said map is navigated recursively.

76. The system of claim 75, further comprising:
   a. means for receiving user selection for a first node;
   b. means for moving said first node to the center of the map;
   c. means for displaying first level children nodes of said first node in the center of the map;
   d. means for displaying children nodes of said first level children nodes;
   e. means for receiving user selection for a second node; and f means for repeating steps (a)-(e) for said second node.

77. The system of claim 63, further comprising means for editing information on the map in response to a user selection.

78. A system for creating a node in a node map for a user interface in a computing device, comprising:
   a. a memory; and
   b. a processing unit in communication with said memory, said processing unit configured for:
      receiving a user instruction for initiating creation of the new node via a user interface, the user interface including a node map wherein multiple child nodes are visually coupled to a parent node;
      receiving node information from the user; generating a new node in the node map with the received node information; and
      displaying the new node in the node map.

79. The system of claim 78, wherein said processing unit is further configured for creating an edge from the new node to a parent node, wherein said parent node is origination point for the new node.

80. The system of claim 79, wherein said processing unit is further configured for adding information regarding the created edge to an edge list.

81. The system of claim 80, wherein the new node is named by a user.

82. The system of claim 78, wherein said processing unit is further configured for determining existence of an earlier node having node information identical to said new node, after said receiving node information.

83. The system of claim 82, wherein said earlier node is identical to said new node.

84. The system of claim 83, wherein said processing unit is further configured for identifying said earlier node and said new node having identical node information.

85. The system of claim 78, wherein said node information discloses node type of said new node.

86. The system of claim 85, wherein said node type indicates the presence of an attachment associated with said new node.

87. The system of claim 86, wherein said processing unit is further configured for receiving indication of an attachment type from the user.

88. The system of claim 85, wherein said processing unit is further configured for receiving content for attachment to said new node.

89. The system of claim 85, wherein said node type indicates presence of an action associated with said new node.

90. The system of claim 89, wherein said action is one of calling another human, printing, locating an object of interest, collaborating with others, text, chat and message.

91. The system of claim 85, wherein said node type indicates presence of an application associated with said new node.

92. The system of claim 85, wherein said node type indicates presence of an outlined entry associated with said new node.

93. The system of claim 92, wherein said outlined entry is one of contact, recipe, time, location, and message.

94. The system of claim 85, wherein said processing unit is further configured for deleting said new node.

95. The system of claim 94, wherein said deleting is initiated when the user selects said new node and makes a selection to delete said new node is displayed on said user interface.

96. The system of claim 95, wherein said processing unit is further configured for moving said new node to a new location on the map.

97. The system of claim 85, wherein said map is navigated recursively.

98. The system of claim 97, wherein said processing unit is further configured for:
   a. means for receiving user selection for a first node;
   b. means for moving said first node to the center of the map;
   c. means for displaying first level children nodes of said first node in the center of the map;
   d. means for displaying children nodes of said first level children nodes;
   e. means for receiving user selection for a second node; and
   f. means for repeating steps (a)-(e) for said second node.

99. The system of claim 85, wherein said processing unit is further configured for editing information on the map in response to a user selection.

100. A method, comprising:
   receiving a user instruction via a user interface in a computing device for initiating creation of a new node as a child node of an existing node, the user interface including at least a display component configured to display a node map wherein multiple child nodes are visually displayed as coupled to a parent node;
   receiving node information from the user via the user interface in the computing device regarding at least one node linkage, node name, and whether the new node pertains to an attachment, an action, an application or an outlined entry;
   generating, in the computing device, a new node in the node map based on the received user node information; and
   displaying the new node in the node map on the display component.

101. A method, comprising:
   establishing a user interface in a computing device, the user interface including at least a display component configured to display a node map wherein multiple child nodes are visually displayed as coupled to a parent node;
   receiving a user instruction via the user interface for initiating creation of a new node in the node map;
   receiving node information from the user via the user interface in the computing device for the new node in the node map, the node information including at least node linkage information and node name information;
   generating, in the computing device, the new node in the node map based on the received user node information; and
   displaying the new node in the node map on the display component.

102. A system for a customizable user interface for a computing device, comprising:
   a computer for establishing a user interface, the user interface including a node map wherein multiple child nodes are visually coupled to a parent node;
   an input coupled to the computer to receive a user instruction for initiating creation of a new node in the node map;
   an input coupled to the computer to receive node information from the user for the new node in the node map;
   said computer generating the new node in the node map with the received node information; and
   a display coupled to the computer for displaying the new node in the node map.

103. A system for creating a node in a node map for a user interface in a computing device, comprising:
- a. a memory in a computing device; and
- b. a processing unit in communication with said memory, said processing unit configured for:

establishing a user interface in the computing device, the user interface including a node map wherein multiple child nodes are visually coupled to a parent node;

receiving a user instruction for initiating creation of a new node in the node map;

receiving node information from the user for the new node in the node map;

generating the new node in the node map with the received node information; and displaying the new node in the node map.

104. A customizable node map displayed in a user interface in a computing device, comprising:

a node map in a user interface in a computing device, wherein multiple child nodes are visually coupled to a parent node;

a first individual node in the node map displayed in the user interface;

a first node category displayed in the user interface and related to the first node;

a second node category displayed in the user interface; and a new individual node in the node map for display in the user interface, defined by node information received from the user;

said node information received from the user further defining said new individual node as related to said second node category;

said node information received from the user further defining said first individual node is related to said new individual node, such that a user accesses information in said new individual node by beginning navigation from said first individual node.

* * * * *